US009645612B1

(12) United States Patent
Hayashi

(10) Patent No.: US 9,645,612 B1
(45) Date of Patent: May 9, 2017

(54) IMAGE-READING APPARATUS AND IMAGE-READING AUXILIARY APPARATUS

(71) Applicant: PFU LIMITED, Ishikawa (JP)

(72) Inventor: Ryo Hayashi, Ishikawa (JP)

(73) Assignee: PFU LIMITED, Ishikawa (JP)

( * ) Notice: Subject to any disclaimer, the term of this patent is extended or adjusted under 35 U.S.C. 154(b) by 0 days.

(21) Appl. No.: 15/159,261

(22) Filed: May 19, 2016

(30) Foreign Application Priority Data

Feb. 4, 2016 (JP) ................................ 2016-020078

(51) Int. Cl.
*G06F 1/16* (2006.01)
*H04N 5/235* (2006.01)
*H04N 1/00* (2006.01)

(52) U.S. Cl.
CPC ............ *G06F 1/1632* (2013.01); *G06F 1/166* (2013.01); *G06F 1/1679* (2013.01); *G06F 1/1686* (2013.01); *H04N 1/00519* (2013.01); *H04N 5/2354* (2013.01)

(58) Field of Classification Search
CPC .. H04N 1/00519; H04N 5/2354; G06F 1/166; G06F 1/1632; G06F 1/1679; G06F 1/1686
USPC .......... 348/370, 373–376; 361/679.4–679.44
See application file for complete search history.

(56) References Cited

U.S. PATENT DOCUMENTS 6,064,062 A * 5/2000 Bohn .................. H04N 1/0315 250/208.1
9,225,865 B2 * 12/2015 Matsui ............... H04N 1/00997
9,473,653 B2 * 10/2016 Hayashi ............. H04N 1/00519
2015/0092253 A1 4/2015 Kasahara et al.

FOREIGN PATENT DOCUMENTS

JP 2005-005830 A 1/2005
JP 2005-323188 A 11/2005
JP 2012-042902 A 3/2012
JP 2015-070572 A 4/2015

OTHER PUBLICATIONS

Office Action issued in corresponding Japanese Patent Application No. 2016-020078, dated Mar. 7, 2017.

* cited by examiner

*Primary Examiner* — Adrian S Wilson
(74) *Attorney, Agent, or Firm* — McDermott Will & Emery LLP

(57) ABSTRACT

An image-reading apparatus includes a housing having an opening, an image capturing unit that captures an image of a medium disposed at the opening, a plurality of light sources that are disposed inside the housing and emit light toward the opening, and an angle holding mechanisms. Two inclined cover units of the housing can be switched between an opened state and a folded state. Two coupling cover units of the housing are deformed with respect to the two inclined cover units when the two inclined cover units are in the folded state, and the angle holding mechanisms hold the two inclined cover units so that ends of the two inclined cover units on the opening side are separated away from each other when the two inclined cover units is in the opened state.

5 Claims, 37 Drawing Sheets

41 41 40 28 28 20 (15) 20 (15) 27 21 23 26 22 D 35 35 D 24 28 32 31 30 (15) 31 32 28

IMAGE-READING APPARATUS AND IMAGE-READING AUXILIARY APPARATUS

CROSS-REFERENCE TO RELATED APPLICATION

The present application claims priority to and incorporates by reference the entire contents of Japanese Patent Application No. 2016-020078 filed in Japan on Feb. 4, 2016.

FIELD

The embodiments discussed herein are related to an image-reading apparatus and an image-reading auxiliary apparatus.

BACKGROUND

When an image of a subject is captured with an image capturing apparatus, image capturing is performed by receiving light reflected from the subject with the image capturing apparatus. However, when the image capturing apparatus receives light regularly reflected from the subject or light reflected from an object other than the subject, the image of the subject cannot be appropriately captured in some cases. To address this problem, some of image capturing apparatuses in the related art are configured not to receive light other than the light used for appropriately capturing the image of the subject by covering a periphery of a light receiving lens of the image capturing apparatus with a lens hood (for example, refer to Japanese Patent Application Laid-open No. 2012-42902). A size of a light shielding member such as a lens hood that covers the periphery of the light receiving lens tends to be large, so that portability of the light shielding member may be reduced even when the size of the image capturing apparatus is portable. To address this problem, the lens hood disclosed in Japanese Patent Application Laid-open No. 2012-42902 is foldable to secure the portability.

Even when an image of a medium is captured to read an image by capturing the image and the like printed on a paper medium and the like, the image of the medium and the like is read by reflecting light emitted onto the medium from the surrounding of the medium by the medium and receiving the light with the image capturing apparatus. However, when the image of the medium is captured under environmental light, the quality of the read image may vary depending on an amount, a color, a direction, and the like of the environmental light. Thus, it has been very difficult to read the image while securing portability of the entire apparatus for reading the image including the light shielding member and appropriately securing a photographing range photographed by the image capturing apparatus.

SUMMARY

According to an aspect of the embodiments, an image-reading apparatus includes a housing that shields environmental light and has an opening on a bottom face; an image capturing unit that captures an image of a medium exposed to inside of the housing at the opening; and a plurality of light sources that are disposed inside the housing and emit light toward the opening to be emitted onto different regions of a horizontal plane at the opening, wherein the opening is formed in a rectangular shape, the housing includes at least four cover units corresponding to sides of the opening, the four cover units include two inclined cover units that are inclined from a side on which the opening is positioned toward an opposite end in a direction in which the two inclined cover units get closer to each other and two coupling cover units that couple the two inclined cover units to each other, the two inclined cover units include a first inclined cover unit and a second inclined cover unit, the two inclined cover units are switchable between an opened state in which the first inclined cover unit moves relatively to the second inclined cover unit based on an end opposite to a side on which the opening is positioned and ends of the two inclined cover units on the opening side are separated away from each other, and a folded state in which the two inclined cover units are adjacent to each other in parallel, the two coupling cover units are coupled to the two inclined cover units in a deformable manner, and deformed with respect to the two inclined cover units to enter a space between the two inclined cover units when the two inclined cover units are in the folded state, and the image-reading apparatus further comprises an angle holding mechanism that holds the two inclined cover units so that the ends of the two inclined cover units on the opening side are separated away from each other when the two inclined cover units are in the opened state.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Preferred embodiments of the present invention will be explained with reference to accompanying drawings.

[a] First Embodiment

Figure 1:
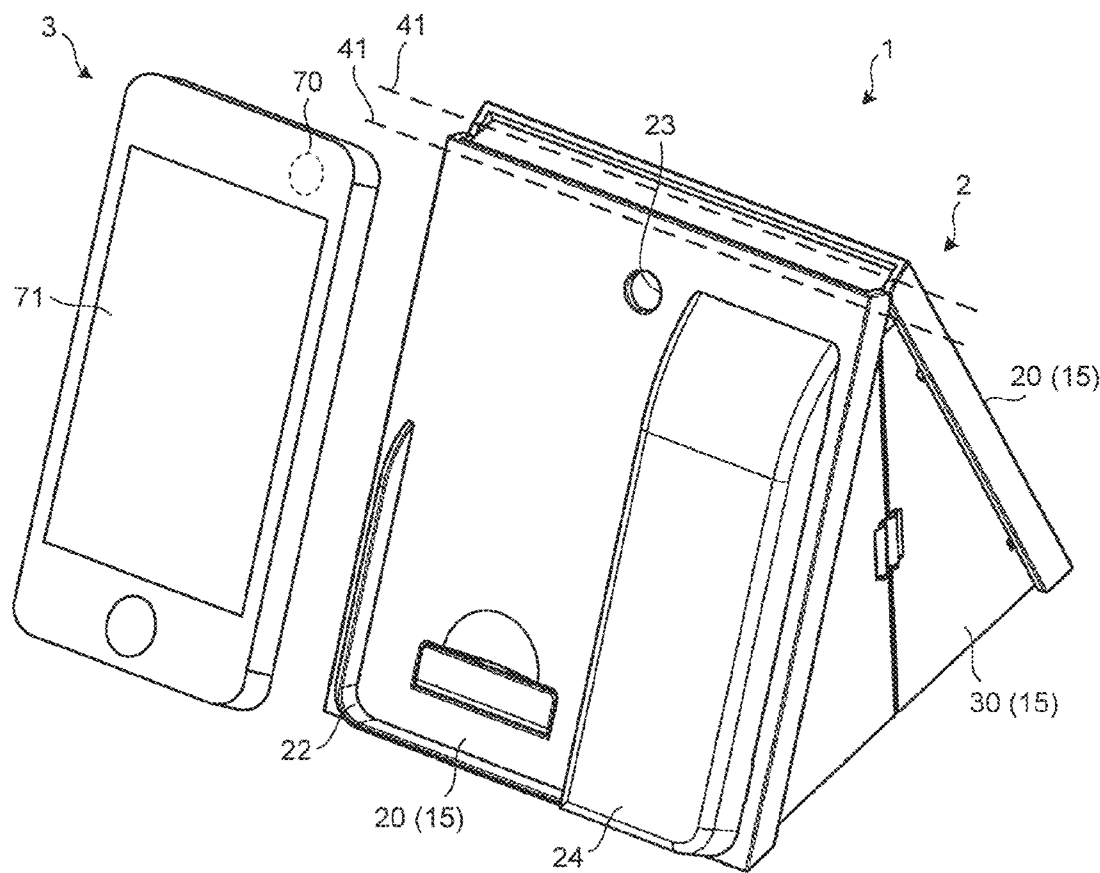
FIG. 1 is an outline drawing of an image-reading apparatus according to a first embodiment.
Figure 1:
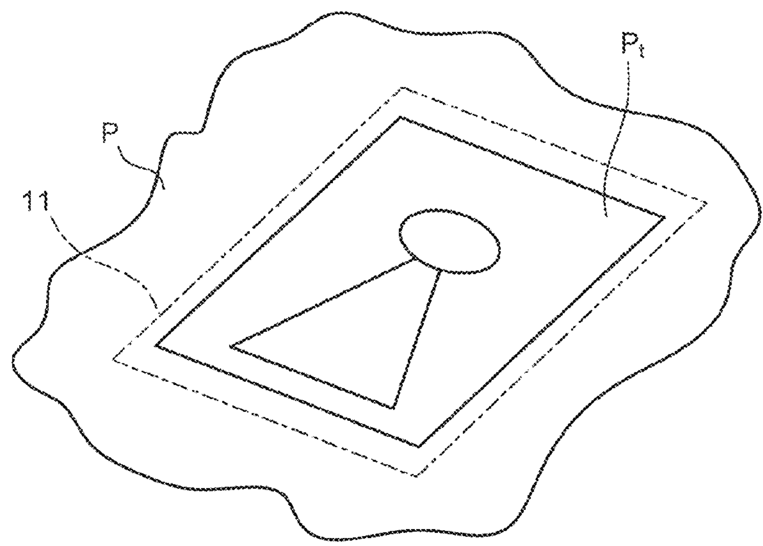
Figure 2:
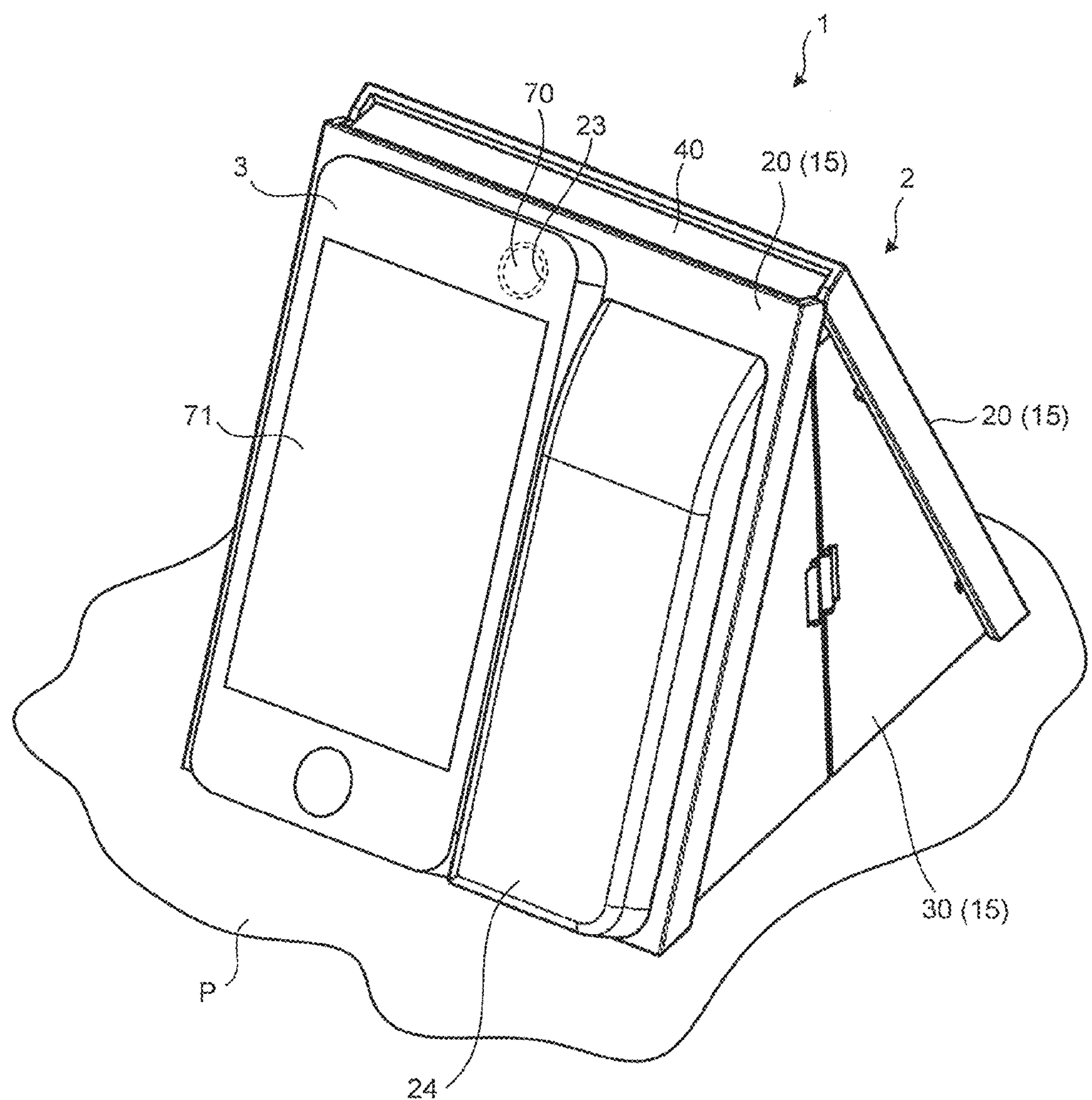
FIG. 2 is a diagram illustrating a use state of the image-reading apparatus according to the first embodiment.

FIG. 1 is an outline drawing of an image-reading apparatus according to a first embodiment. FIG. 2 is a diagram illustrating a use state of the image-reading apparatus according to the first embodiment. An image-reading apparatus 1 according to the first embodiment has a size that can be carried by hand, and captures an image of a medium P with an image capturing unit 70 to generate image data corresponding to the medium P as illustrated in FIGS. 1 and 2. The image-reading apparatus 1 according to the first embodiment assumes a photograph book in which film photos and printed photos are collected to be a medium P, and reads a single photo in the photograph book as a reading target region Pt to generate image data corresponding to the single photo in the photograph book.

A use application of the image-reading apparatus 1 in the first embodiment is not limited to the above description. The image-reading apparatus 1 can be used for any medium on which a user desires to generate image data such as an image on a plain sheet, not limited to a case of generating image data corresponding to glossy paper (a single film photo, a single printed photo, a magazine, and the like).

As illustrated in FIG. 1, the image-reading apparatus 1 includes a housing 2 and an external device 3. The external device 3 includes the image capturing unit 70 that captures an image of a subject and a display unit 71 that displays arbitrary information. The image capturing unit 70 and the display unit 71 are disposed on surfaces opposite to each other on the external device 3. That is, the image capturing unit 70 is disposed on a surface opposite to a surface on which the display unit 71 is disposed in the external device 3. The external device 3 is used such that a reading application corresponding to a function as the image-reading apparatus 1 is preinstalled therein, or the reading application is read (or downloaded) from a recording medium to be installed therein. The external device 3 according to the first embodiment is a portable terminal such as a smartphone and a tablet having a telephone function and an Internet connecting function, for example, and has a function as the image-reading apparatus 1 as part of the functions.

The housing 2 can hold the external device 3, and is formed to be adapted to the external device 3 the external shape of which and a position of the image capturing unit 70 are specified, or adapted to the external device 3 the external shape of which and the position of the image capturing unit 70 are within a certain range. For example, the housing 2 is formed to be adapted to external devices 3 of the same series. In reading the reading target region Pt of the medium P with the image-reading apparatus 1, the external device 3 is held by the housing 2.

Figure 3:
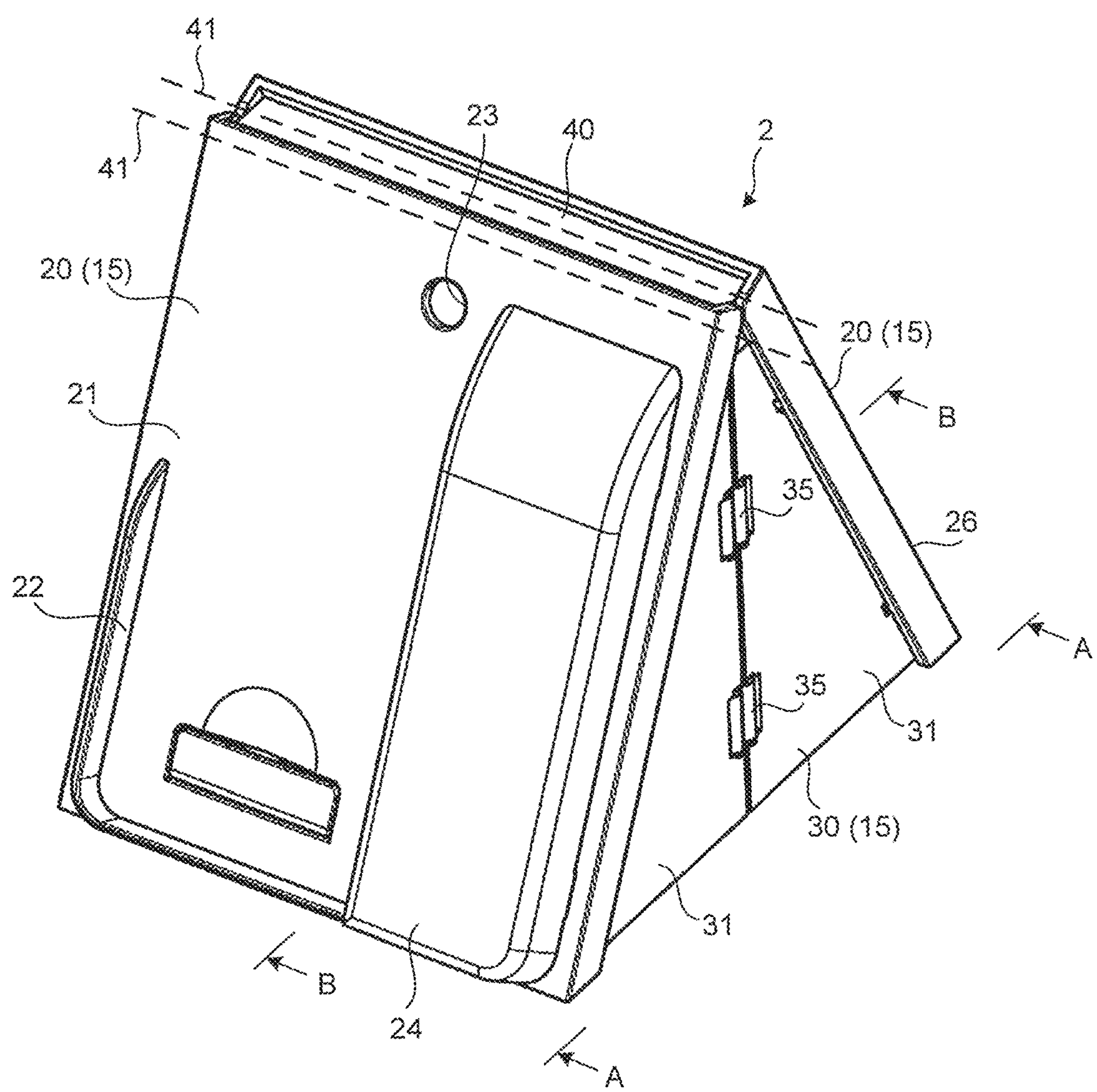
FIG. 3 is a perspective view of a housing illustrated in FIG. 1.
Figure 4:
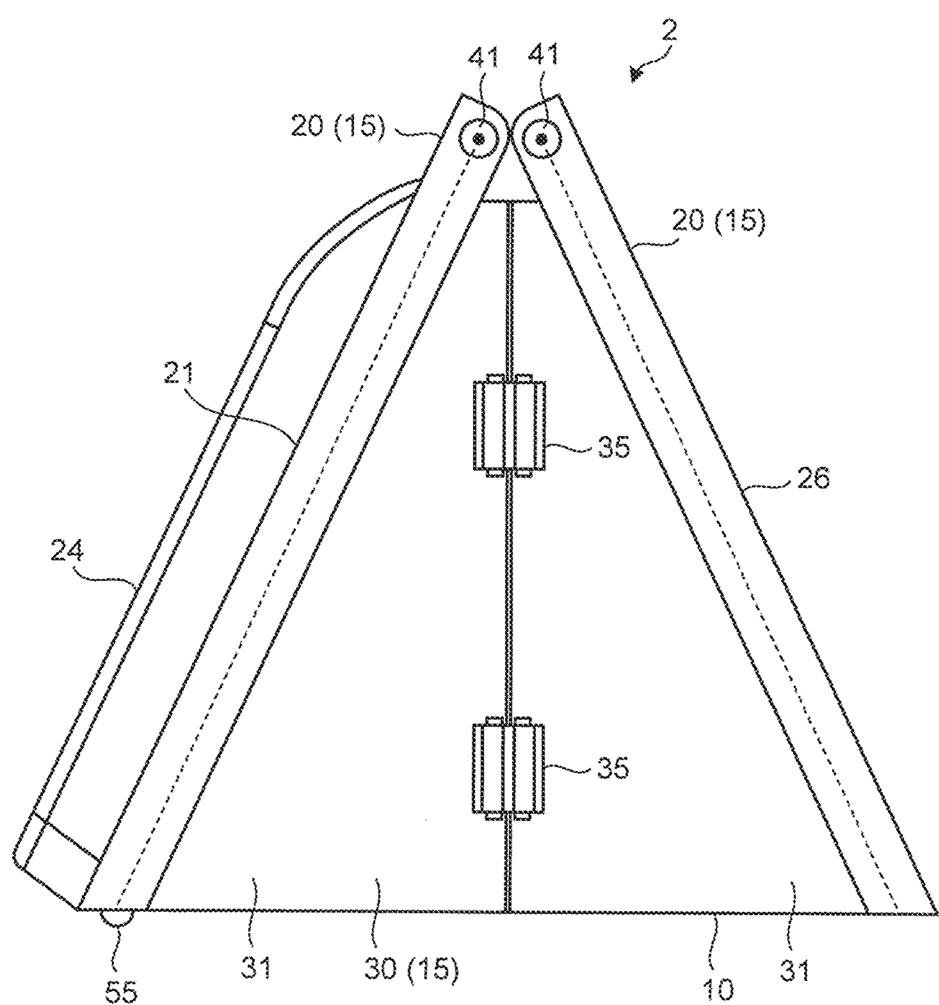
FIG. 4 is a diagram viewed from an arrow direction of line A-A in FIG. 3.
Figure 5:
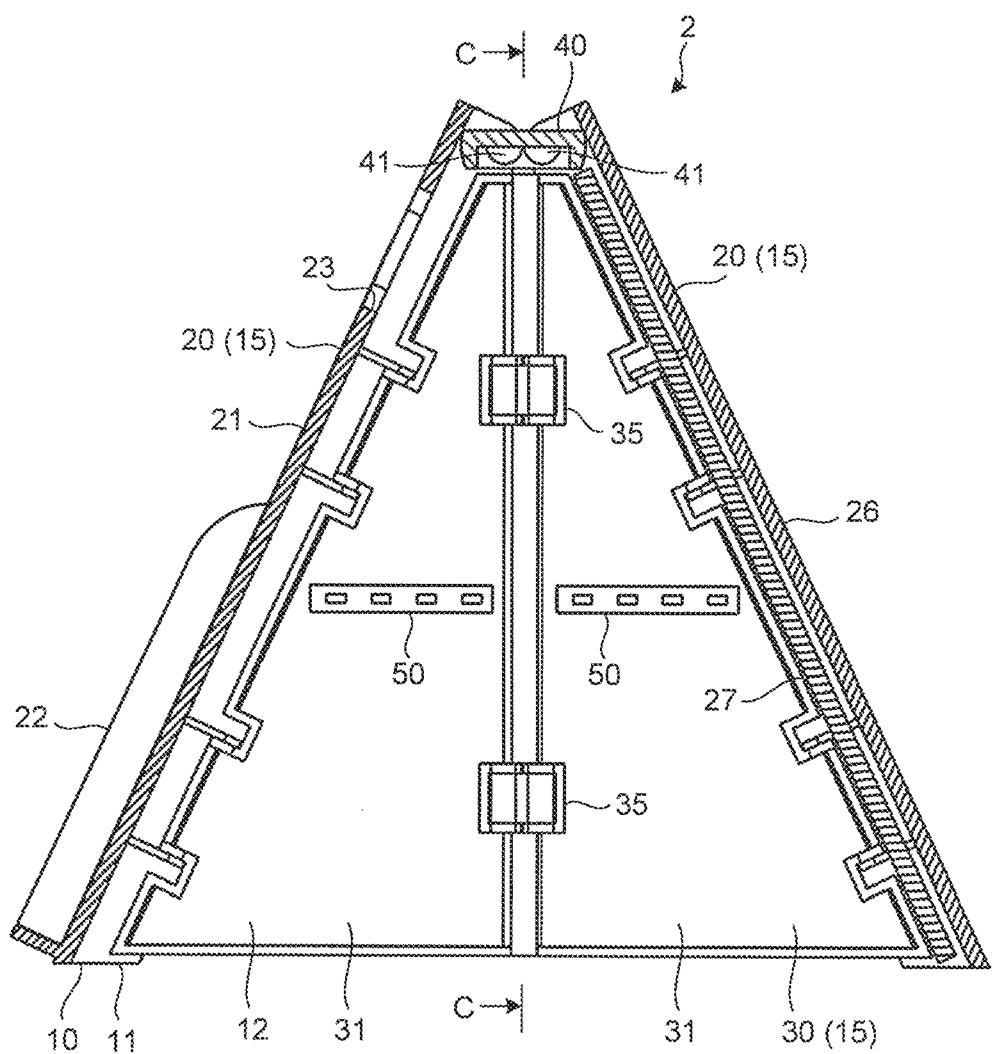
FIG. 5 is a cross-sectional view along line B-B in FIG. 3.

FIG. 3 is a perspective view of the housing illustrated in FIG. 1. FIG. 4 is a diagram viewed from an arrow direction of line A-A in FIG. 3. FIG. 5 is a cross-sectional view along line B-B in FIG. 3. The housing 2 is formed to have a substantially triangular column shape. One of three rectangular side surfaces constituting the triangular column is opened, and this opened portion is an opening 11 formed to have a rectangular shape. The opening 11 is formed to have an area in which at least an L-size (89 mm×127 mm) photograph can be fit. Considering image processing described later, the opening 11 preferably has an area to form a gap between an outer edge of the opening 11 and an outer edge of the photograph in a state of causing the center of the L-size photograph to agree with the center of the opening 11, for example, about 102 mm×140 mm.

In using the image-reading apparatus 1, the opening 11 of the housing 2 is positioned on a lower side to open downward. In other words, the housing 2 has the opening 11 on a bottom face 10. The housing 2 has the opening 11 on the bottom face 10, and the opening 11 opens downward, so that environmental light emitted to the housing 2 from the surroundings of the housing 2 can be shielded not to enter the housing 2.

In the housing 2 thus formed, of the three side surfaces constituting the triangular column shape of the housing 2, the two side surfaces other than the bottom face 10 and two triangular bottom faces constituting the triangular column are formed as cover units 15. The four cover units 15 correspond to four sides of the rectangular opening 11, and are arranged as light shielding members for shielding environmental light emitted to the housing 2 from the surroundings of the housing 2 not to enter the housing 2.

In the four cover units 15, one of two sets of the cover units 15 opposed to each other includes inclined cover units 20 that are inclined from a side on which the opening 11 is positioned toward the opposite end in a direction in which the cover units 15 get closer to each other. That is, the inclined cover units 20 are configured of two side surfaces other than the bottom face 10 of the three side surfaces constituting the triangular column shape of the housing 2.

Of the two inclined cover units 20, a first inclined cover unit 21 as one of the inclined cover units 20 includes an external device holding unit 22 that holds the external device 3, an image capturing opening 23 for image capturing as an opening used when the external device 3 captures the image of the medium P, and a power supply housing unit 24 in which a power supply 56 (refer to FIG. 9) such as a battery (not illustrated) is housed. Among these, the image capturing opening 23 is a hole passing through the first inclined cover unit 21, and passes through the first inclined cover unit 21 from the outer face toward the inner face of the housing 2.

The external device holding unit 22 is formed on the outer face side of the housing 2 on the first inclined cover unit 21 such that the external device 3 can be held at a position on the outer face side of the housing 2 on the first inclined cover unit 21 so that the image capturing unit 70 included in the external device 3 is positioned at a portion where the image capturing opening 23 is formed. For example, the external device holding unit 22 is formed to project from the first inclined cover unit 21 so as to be able to support a lower end portion of the external device 3 from the lower side and support a lateral portion of the external device 3 from a side in a state in which the image capturing unit 70 of the external device 3 is positioned at the portion where the image capturing opening 23 is formed. When the external device 3 is held by the external device holding unit 22, the image capturing unit 70 is positioned at a position at which the image capturing opening 23 is formed, so that the external device 3 can capture the image of the medium P exposed to the inside of the housing 2 through the opening 11 with the image capturing unit 70.

With the image-reading apparatus 1, communication can be performed between the housing 2 and the external device 3, and a light source 50 (FIG. 5) can be lit. The power supply housing unit 24 can house the power supply 56 such as a battery that supplies electric power used for the above operation.

The first inclined cover unit 21 includes a ground sensor 55 serving as a blockage detection unit that detects blockage of the opening 11. The ground sensor 55 is disposed on the bottom face 10 side of the first inclined cover unit 21 as a mechanical sensor that detects blockage of the opening 11 when the bottom face 10 of the housing 2 is in closely contact with the medium P and the opening 11 is blocked by the medium P because an arm is deformed to be ON by the medium P.

A second inclined cover unit 26 as the other one of the two inclined cover units 20 includes a mirror 27 disposed on a surface corresponding to the inner face side of the housing 2. That is, the mirror 27 is disposed on a surface of the second inclined cover unit 26 opposed to the first inclined cover unit 21. In this way, the mirror 27 is disposed on the inner face side of the second inclined cover unit 26 to reflect the medium P exposed to an inside 12 of the housing through the opening 11 and cause a reflected mirror image to be captured by the image capturing unit 70.

A positional relation among the mirror 27, the image capturing unit 70 of the external device 3 in a state of being held by the external device holding unit 22, and the opening 11 is set so that an image capturing region S (refer to FIG. 10) of the image capturing unit 70 via the mirror 27 is the same as the opening 11 or larger than the opening 11. Due to this, in a state in which the image capturing unit 70 is positioned at the position of the image capturing opening 23 while the external device 3 is held by the external device holding unit 22, the image capturing unit 70 can capture the image of the entire region of the medium P exposed to the inside 12 of the housing through the opening 11.

Of the four cover units 15, the other one of the two sets of the cover units 15 opposed to each other includes coupling cover units 30 that couple the two inclined cover units 20 to each other. The coupling cover unit 30 is configured of two bottom faces constituting the triangular column shape of the housing 2. The shape of the housing 2 viewed from the front surface of the coupling cover unit 30 is a substantially isosceles triangle the base of which is a side of the coupling cover unit 30 on the opening 11 side. Thus, an angle x° formed by one of the inclined cover units 20 and the side of the coupling cover unit 30 on the opening 11 side is substantially the same as an angle x° formed by the other one of the inclined cover units 20 and the side of the coupling cover unit 30 on the opening 11 side.

In the cover units 15, a positional relation between the inclined cover units 20 can be switched such that one of the inclined cover units 20 moves relatively to the other one of the inclined cover units 20 based on the end opposite to the side on which the opening 11 is positioned. Specifically, when one of the inclined cover units 20 moves relatively to the other one of the inclined cover units 20, the two inclined cover units 20 can be switched between an opened state (FIG. 3) in which ends of both inclined cover units 20 on the opening 11 side are separated away from each other and a folded state (refer to FIGS. 15 and 16) in which both inclined cover units 20 are adjacent to each other in parallel.

Specifically, rotating axes 41 extending in a direction across the coupling cover units 30 at two positions are disposed at the ends of the two inclined cover units 20 opposite to the side on which the opening 11 is positioned. The inclined cover units 20 can rotate about the respective rotating axes 41. The two inclined cover units 20 rotate about the respective rotating axes 41 as described above to move relatively to each other. Accordingly, the two inclined cover units 20 can be switched between the opened state and the folded state.

The coupling cover unit 30 is configured such that one coupling cover unit 30 includes a plurality of rotating members 31 that are rotatably coupled to each other. Specifically, each of the two coupling cover units 30 is divided into two parts with a line orthogonal to the base of the isosceles triangle as the shape of the coupling cover unit 30 from a vertical angle toward the base thereof, and the divided parts are the respective rotating members 31. Coupling members 35 that can rotate about each of the rotating members 31 are disposed between the two rotating members 31 included in one coupling cover unit 30, and the two rotating members 31 are rotatably coupled to each other with the coupling members 35.

Additionally, the two rotating members 31 included in each coupling cover unit 30 are rotatably coupled to different inclined cover units 20. That is, each coupling cover unit 30 couples the two inclined cover units 20 to each other such that the two rotating members 31 are rotatably coupled to each other with the coupling members 35, and the respective rotating members 31 are rotatably coupled to different inclined cover units 20.

The two coupling cover units 30 are coupled to the inclined cover units 20 in a deformable manner such that the rotating members 31 are rotatably coupled to each other, and also rotatably coupled to the inclined cover units 20. Due to this, the coupling cover units 30 are deformed with respect to the two inclined cover units 20 when the inclined cover units 20 are in the folded state, and can enter the space between the inclined cover units 20.

In other words, the coupling cover unit 30 is coupled to the inclined cover unit 20 in a deformable manner with respect to the inclined cover unit 20 such that the rotating members 31 are rotated relatively to each other when the two inclined cover units 20 are in the folded state. Due to this, when the two inclined cover units 20 are in the folded state, the coupling cover unit 30 can enter the space between the inclined cover units 20 such that the rotating members 31 are rotated relatively to each other and the coupling cover unit 30 becomes parallel with the two inclined cover units 20.

A plurality of light sources 50 are disposed in the inside 12 of the housing. The light sources 50 are arranged to be able to emit light onto different regions of a horizontal plane at the opening 11. In this way, the light sources 50 are disposed in the inside 12 of the housing on the inner face side of the housing 2 on the coupling cover unit 30, and are disposed on the respective two rotating members 31 included in the coupling cover unit 30. That is, the light sources 50 are disposed at four positions in the inside 12 of the housing.

Figure 6:
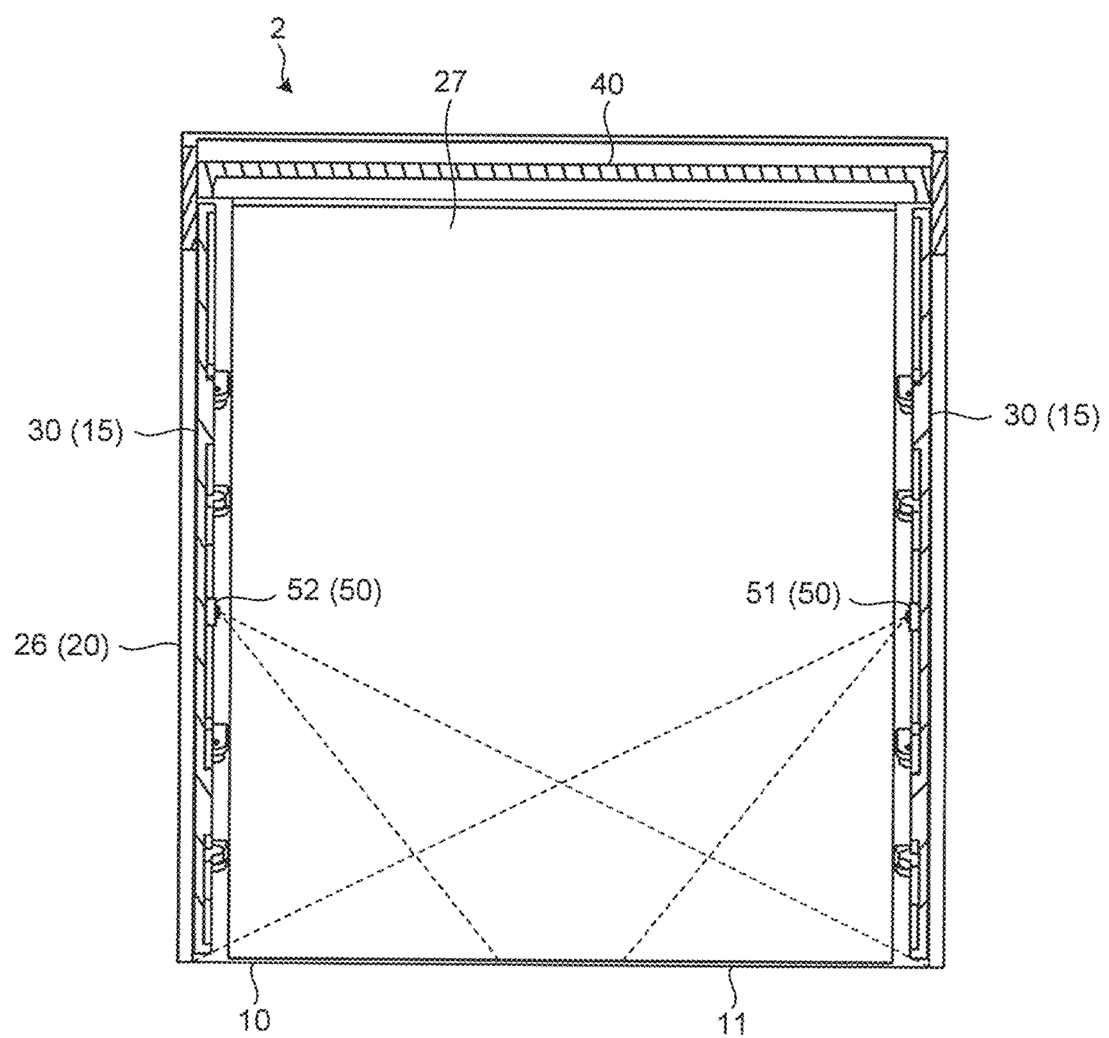
FIG. 6 is a cross-sectional view along line C-C in FIG. 5.

FIG. 6 is a cross-sectional view along line C-C in FIG. 5. Specifically, the light sources 50 include a first light source 51 disposed on one of the two coupling cover units 30 and a second light source 52 disposed on the other one of the coupling cover units 30. The first light source 51 is disposed on each of the two rotating members 31 included in the coupling cover unit 30 on which the first light source 51 is disposed, and the second light source 52 is disposed on each of the two rotating members 31 included in the coupling cover unit 30 on which the second light source 52 is disposed. The light source 50 disposed on each rotating member 31 is a light emitting module in which a plurality of light emitting elements such as light emitting diodes (LEDs) and laser diodes (LDs) are disposed in a band shape, and can be lit by electric power supplied from the power supply 56 (refer to FIG. 9) to emit light.

The first light source 51 and the second light source 52 have an amount of light sufficient for capturing the image of the entire region (the region including the reading target region Pt) of the medium P exposed to the inside 12 of the housing through the opening 11. The first light source 51 and the second light source 52 are configured to be able to emit light onto different regions of the horizontal plane at the opening 11. Specifically, the first light source 51 can emit light onto a position at the opening 11 close to the coupling cover unit 30 on which the second light source 52 is disposed, and the second light source 52 can emit light onto a position at the opening 11 close to the coupling cover unit 30 on which the first light source 51 is disposed. That is, the first light source 51 and the second light source 52 have main irradiation regions different from each other.

The main irradiation region herein means a region irradiated with light that is obtained when light emitted from the first light source 51 and the second light source 52 is regularly reflected from the medium P, and the regularly reflected light is further reflected from the mirror 27 to be in a state of entering the image capturing unit 70. The region means a region of generated image data in which the light emitted from the first light source 51 and the second light source 52 is regularly reflected from the medium P and an image in a region of the medium P corresponding to the region where the regular reflection is caused cannot be identified.

Figure 7:
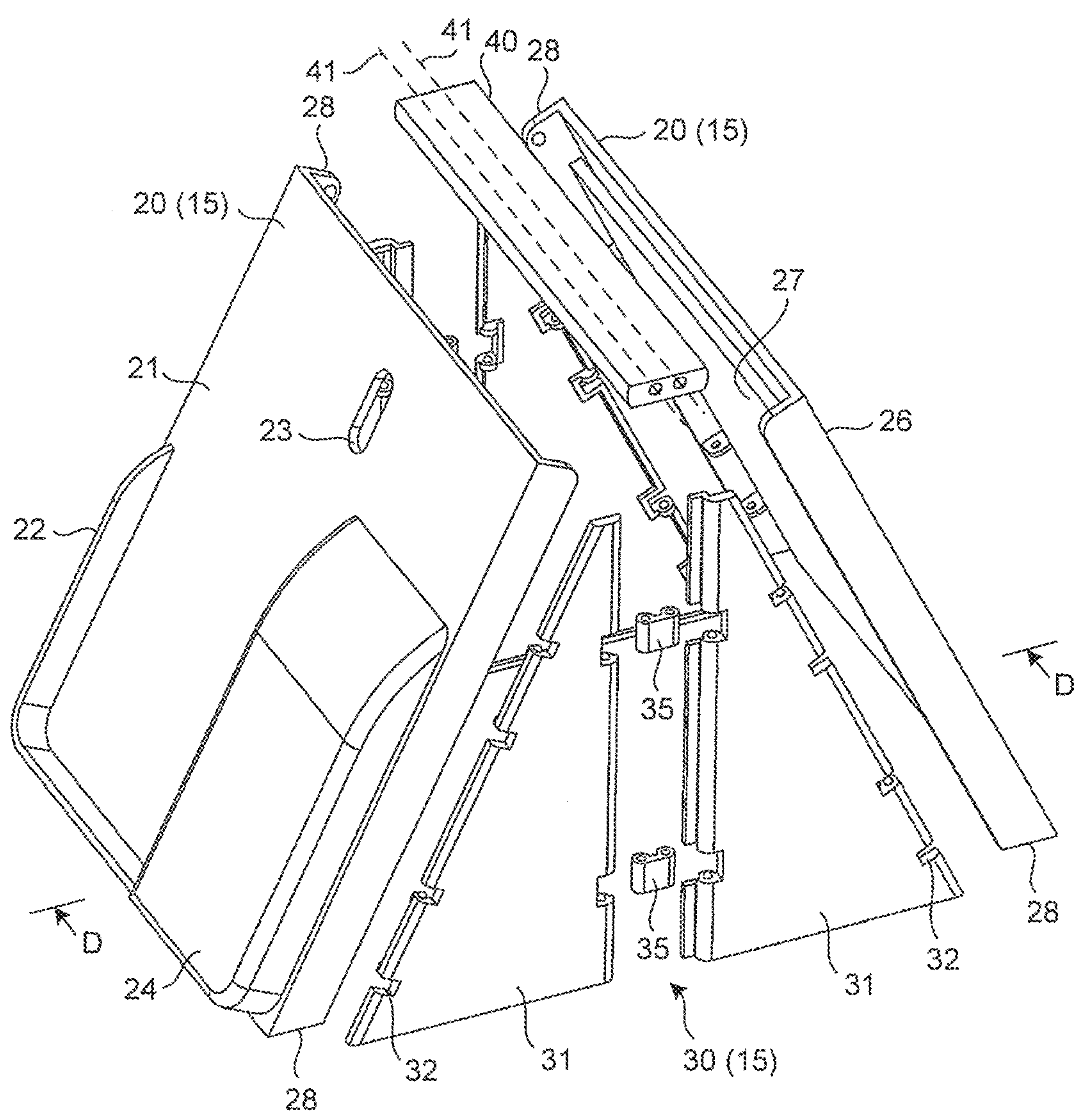
FIG. 7 is an exploded perspective view of the housing illustrated in FIG. 3.
Figure 8:
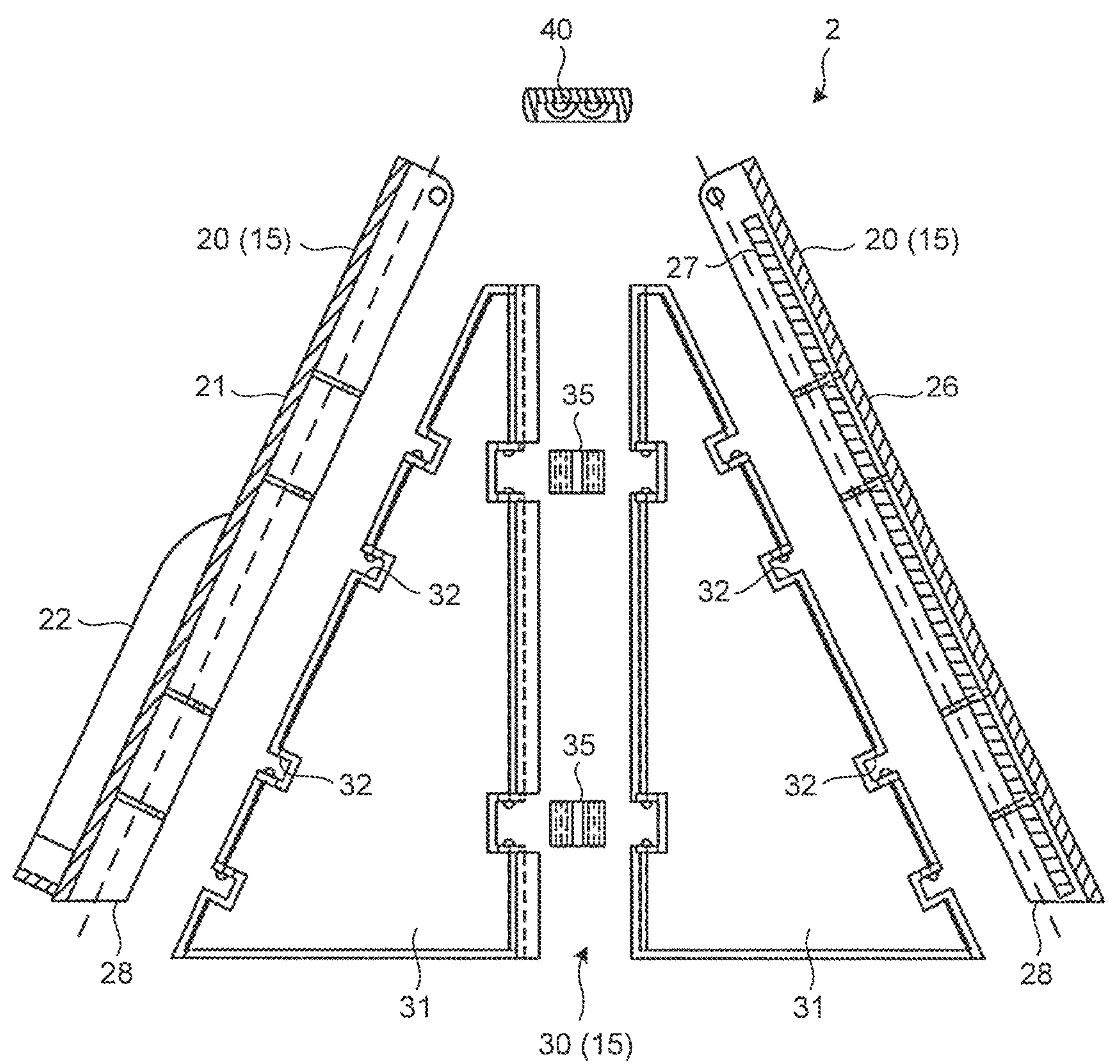
FIG. 8 is a cross-sectional view along line D-D in FIG. 7.

FIG. 7 is an exploded perspective view of the housing illustrated in FIG. 3. FIG. 8 is a cross-sectional view along line D-D in FIG. 7. The housing 2 includes a rotating cover unit 40 in addition to the inclined cover unit 20 and the coupling cover unit 30, and the rotating cover unit 40 is disposed on the end of the inclined cover unit 20 opposite to the side on which the opening 11 is positioned. At this position, the rotating cover unit 40 extends from the side on which one of the coupling cover units 30 is positioned to the side on which the other one of the coupling cover units 30 is positioned. The ends of the two inclined cover units 20 opposite to the side on which the opening 11 is positioned are rotatably coupled to the rotating cover unit 40, and the rotating axes 41 of the inclined cover units 20 are configured such that the inclined cover units 20 are rotatably coupled to the rotating cover unit 40. That is, the rotating axis 41 is a virtual center axis used when the inclined cover unit 20 rotates.

The following describes a coupling portion between the inclined cover unit 20 and the rotating cover unit 40. Folded parts 28 are formed on the respective two inclined cover units 20, the folded parts 28 being obtained such that both ends of each inclined cover unit 20 in an extending direction of the rotating cover unit 40 are folded toward a side on which the other inclined cover unit 20 is positioned. The inclined cover unit 20 covers the rotating cover unit 40 from both ends in the extending direction thereof by positioning the rotating cover unit 40 between the folded parts 28.

The folded part 28 includes a projecting part projecting in the extending direction of the rotating cover unit 40 formed thereon, and a hole into which the projecting part formed on the folded part 28 is inserted is formed at an end of the rotating cover unit 40. When the projecting part formed on the folded part 28 is inserted into the hole formed on the rotating cover unit 40, the projecting part and the center axis of the hole function as the rotating axis 41, and the inclined cover unit 20 is rotatably coupled to the rotating cover unit 40. The projecting part and the hole may be replaced with each other between the folded part 28 of the inclined cover unit 20 and the rotating cover unit 40. Any coupling form may be employed so long as the inclined cover unit 20 is rotatably coupled to the rotating cover unit 40 about the rotating axis 41.

Each coupling cover unit 30 includes the two coupling members 35 disposed thereon, and the two rotating members 31 included in one coupling cover unit 30 are rotatably coupled to each other at two positions via the two coupling members 35. The rotating member 31 also includes a plurality of rotary coupling units 32 formed at portions coupled to the inclined cover unit 20. The rotary coupling unit 32 has a projecting part projecting in a direction along a side of the rotating member 31 to be coupled to the inclined cover unit 20, and the inclined cover unit 20 includes, at the folded part 28, a member having a hole into which the projecting part is inserted. When the projecting part formed on the rotary coupling unit 32 is inserted into the hole formed on the member disposed on the folded part 28, the rotating member 31 is rotatably coupled to the inclined cover unit 20. The projecting part and the hole may be replaced with each other between the rotary coupling unit 32 and the folded part 28 of the inclined cover unit 20. Any coupling form may be employed so long as the rotating member 31 is rotatably coupled to the inclined cover unit 20.

Figure 9:
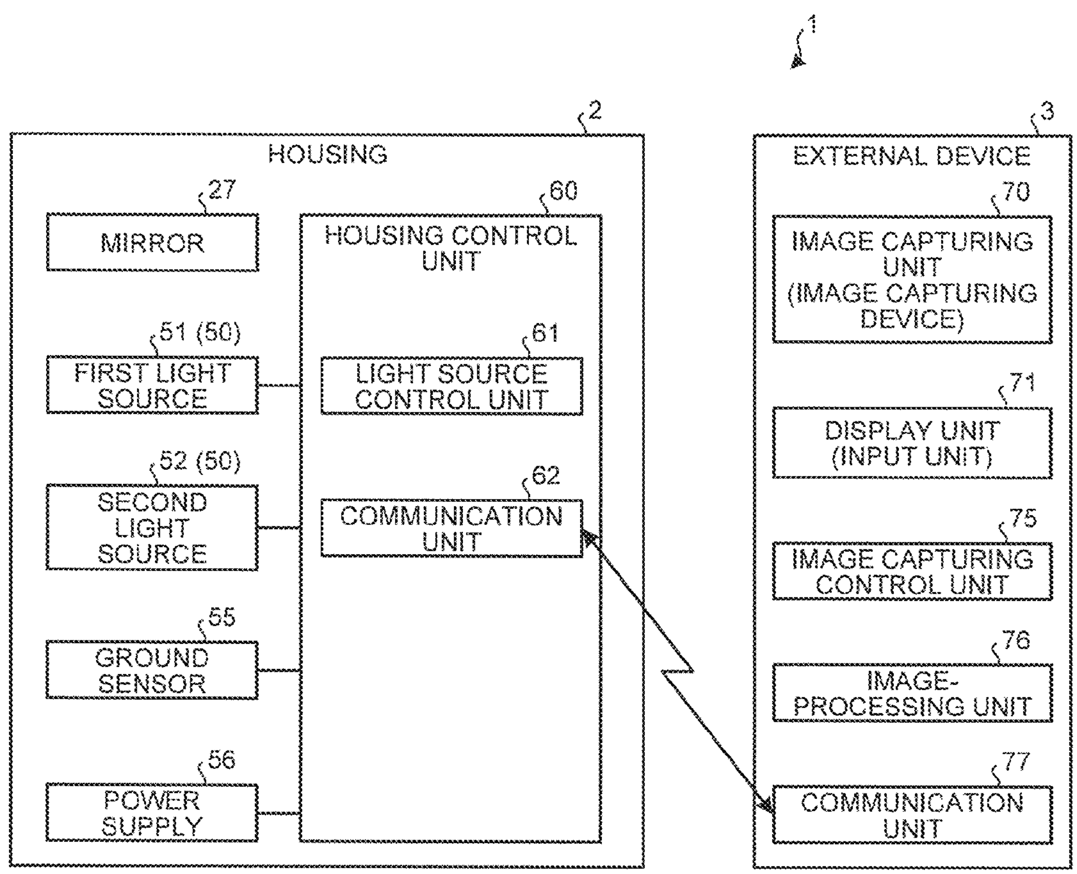
FIG. 9 is a functional block diagram of the image-reading apparatus illustrated in FIG. 1.

FIG. 9 is a functional block diagram of the image-reading apparatus illustrated in FIG. 1. The housing 2 constituting the image-reading apparatus 1 together with the external device 3 includes the mirror 27, the first light source 51, the second light source 52, the ground sensor 55, the power supply 56, and a housing control unit 60. A hardware configuration of the housing control unit 60 included in the housing 2 includes a central processing unit (CPU) that mainly performs arithmetic processing, a memory (RAM, ROM) that stores a computer program and information, an input/output interface, and the like. The configuration is the same as that of a known control device, so that detailed description thereof will not be provided.

The first light source 51 and the second light source 52, that is, the light sources 50 and the ground sensor 55 are electrically connected to the housing control unit 60. Accordingly, the light sources 50 can be controlled to be turned on or off by the housing control unit 60, and a detection result obtained by the ground sensor 55 can be received by the housing control unit 60. Specifically, the housing control unit 60 has a function as a light source control unit 61 that controls an ON state of the light source 50, and the housing control unit 60 can control the amount of light and lighting-on or lighting-off timing of the light sources 50. In this case, the light source control unit 61 can control the ON state of the light sources 50 by referring to the detection result obtained by the ground sensor 55.

The power supply 56 housed in the power supply housing unit 24 is also electrically connected to the housing control unit 60, and components included in the housing 2 to be activated by electric power can be activated by electric power supplied from the power supply 56. As the power supply 56 that supplies the electric power for activating the components of the housing 2, for example, a battery such as a primary battery or a secondary battery is used.

The housing control unit 60 further includes a communication unit 62 that can communicate with the external device 3. The communication unit 62 performs, for example, wireless communication via Bluetooth (registered trademark). The communication with the external device 3 may be performed using a method other than Bluetooth (registered trademark). Any method such as near field communication (NFC) or infrared communication may be used so long as wireless communication can be performed between the housing 2 and the external device 3 held by the external device holding unit 22, for example.

The external device 3 includes the image capturing unit 70, the display unit 71, an image capturing control unit 75, an image-processing unit 76, and a communication unit 77. Additionally, the external device 3 includes a power supply unit (not illustrated) and a storage unit (not illustrated). Among these, the image capturing unit 70 is disposed on the back surface of the external device 3 (a surface opposite to the surface on which the display unit 71 is disposed), and includes image capturing devices such as a CCD image sensor and a CMOS image sensor driven by the electric power from the power supply unit of the external device 3 disposed in a plane form. The image capturing unit 70 is configured to capture the image of the subject in an image capturing range at a time with the image capturing devices disposed in a plane form.

The display unit 71 can display an arbitrary image, and can also display an image captured by the image capturing unit 70. The display unit 71 is disposed on the front surface of the external device 3, and is a display such as a liquid crystal display or an organic EL display driven by electric power from the power supply unit of the external device 3. The display unit 71 is also a touch panel display having a function as an input unit in addition to a function as an output unit of the external device 3. Thus, when a user touches an arbitrary position on the display unit 71, the display unit 71 can output an electric signal corresponding to the position, so that the user can perform an arbitrary input operation on the external device 3.

The image capturing control unit 75, the image-processing unit 76, and the communication unit 77 are provided as functions of a control unit included in the external device 3. A hardware configuration of the control unit having the functions as the image capturing control unit 75 and the like includes a CPU that mainly performs arithmetic processing, a memory (RAM, ROM) that stores a computer program and information, an input/output interface, and the like. The configuration is the same as that of a known smartphone and the like, so that detailed description thereof will not be provided.

Among these, the image capturing control unit 75 can control the image capturing unit 70, and performs control related to image capturing such as adjustment of timing for image capturing and exposure time with the image capturing unit 70, and focusing. The image-processing unit 76 can process the image captured by the image capturing unit 70. That is, when the image is captured by the image capturing unit 70, each image capturing device included in the image capturing unit 70 outputs an image signal based on an output value corresponding to incident light to the image-processing unit 76 for each exposure process, and the image-processing unit 76 performs image processing such as generating a piece of image data based on the image signal.

The communication unit 77 can communicate with the communication unit 62 of the housing 2 via Bluetooth (registered trademark) and the like. The housing 2 can wirelessly communicate with the external device 3 via the communication units 62 and 77.

Figure 10:
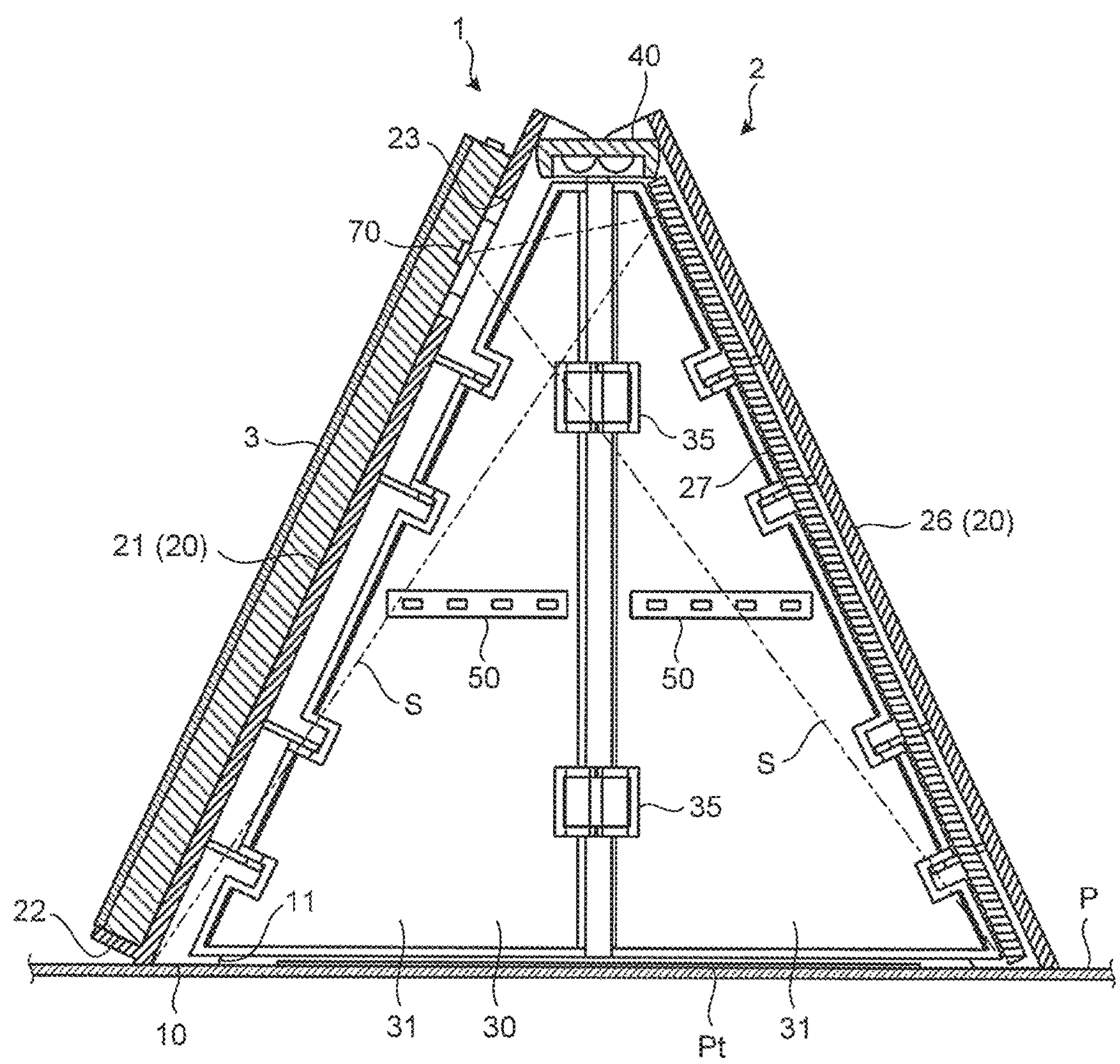
FIG. 10 is an explanatory diagram in a case in which the image-reading apparatus illustrated in FIG. 1 reads an image.

The image-reading apparatus 1 according to the first embodiment has the configuration as described above. The following describes advantageous effects thereof. FIG. 10 is an explanatory diagram in a case in which the image-reading apparatus illustrated in FIG. 1 reads an image. To read the medium P with the image-reading apparatus 1, the housing 2 is caused to be in the opened state, and the housing 2 in the opened state is placed on the medium P so that the reading target region Pt of the medium P is positioned within the opening 11. When the housing 2 is placed on the medium P, the ground sensor 55 disposed on the bottom face 10 is brought into contact with the medium P to be deformed, and detects blockage of the opening 11. When the ground sensor 55 detects the blockage of the opening 11, the light source control unit 61 causes both of the first light source 51 and the second light source 52 to be lit. The state in which both of the first light source 51 and the second light source 52 are lit continues over a certain period of time, the light source control unit 61 may control the light sources 50 to turn off both of the first light source 51 and the second light source 52.

When the housing 2 is placed on the medium P, the external device 3 is held by the external device holding unit 22 so that the image capturing unit 70 is opposed to the image capturing opening 23. Due to this, the image capturing unit 70 can capture the image of the inside of the housing 2 via the image capturing opening 23, and can read the image of the medium P reflected from the mirror 27 in the housing 2.

In this way, when the external device 3 is held by the external device holding unit 22, the external device 3 is held by the external device holding unit 22 in a state in which a reading application corresponding to a function as the image-reading apparatus 1 is activated so that the medium P can be read using the reading application. When the reading application is executed, the display unit 71 of the external device 3 displays an image being currently captured by the image capturing unit 70 based on an image data signal output from the image-processing unit 76. Thus, when the reading application is executed in a state in which the external device 3 is held by the external device holding unit 22, the display unit 71 displays the image of the medium P that is reflected from the mirror 27 and currently captured by the image capturing unit 70.

When the reading application is executed, the display unit 71 of the external device 3 displays a shutter as an icon. With the reading application, when the user presses the shutter by touching the shutter icon, the image capturing control unit 75 outputs, to the image capturing unit 70, an image capturing instruction signal for instructing the image capturing unit 70 to capture the image, and the image is read based on the image captured by the image capturing unit 70. That is, to store the image data in the storage unit, desired image processing is performed on the image data captured by the image capturing unit 70 to be stored in the storage unit included in the external device 3.

To read the image by executing the reading application, a state in which only one of the first light source 51 and the second light source 52 is lit is continued by controlling the light sources 50 with the light source control unit 61. That is, the housing 2 can wirelessly communicate with the external device 3 via the communication unit 62 of the housing 2 and the communication unit 77 of the external device 3, and cooperative control is performed by exchanging signals between the housing 2 and the external device 3 in a case of reading the medium P by capturing the image with the image capturing unit 70 of the external device 3. In reading the image, not only the image capturing unit 70 but also the light sources 50 are controlled through this cooperative control, and the following states are executed successively: a state in which the second light source 52 is turned off and only the first light source 51 is lit; and a state in which the first light source 51 is turned off and only the second light source 52 is lit.

In this case, the image capturing control unit 75 causes the image capturing unit 70 to capture the image of the medium P once at the time when only the first light source 51 is lit, and once at the time when only the second light source 52 is lit. That is, in each image capturing process performed by the image capturing unit 70, lit is the light source 50 different from the light source 50 lit at a previous image capturing process among a plurality of light sources 50, and the image capturing unit 70 captures an image every time the light source 50 is lit.

Figure 11:
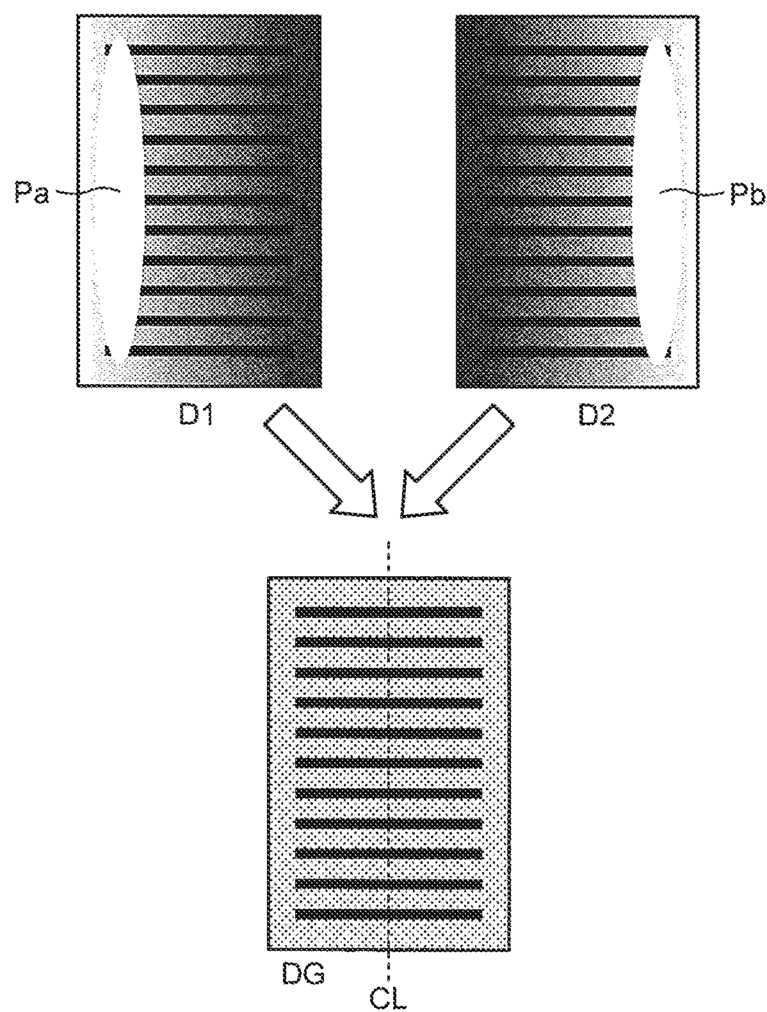
FIG. 11 is an explanatory diagram in a case of synthesizing image data captured by an image capturing unit.

FIG. 11 is an explanatory diagram in a case of synthesizing the image data captured by the image capturing unit. When the image is captured by the image capturing unit 70, the image-processing unit 76 generates image data (synthesized image data DG) obtained by synthesizing image data (first image data D1) generated by capturing an image with the image capturing unit 70 when only the first light source 51 is lit, and image data (second image data D2) generated by capturing an image with the image capturing unit 70 when only the second light source 52 is lit. The first image data D1 is captured when only the first light source 51 is lit, so that when the light emitted from the first light source 51 is regularly reflected from the medium P, a reflection Pa of the first light source 51 is generated in a region corresponding to the main irradiation region of the first light source 51, and the image in the corresponding region of the medium P cannot be identified. The second image data D2 is captured when only the second light source 52 is lit, so that when the light emitted from the second light source 52 is regularly reflected from the medium P, a reflection Pb of the second light source 52 is generated in a region corresponding to the main irradiation region of the second light source 52, and the image in the corresponding region of the medium P cannot be identified.

In this case, the reflections Pa and Pb are generated at different positions of the image data. This is because the first light source 51 and the second light source 52 emit light onto different regions of the horizontal plane at the opening 11. Thus, in the first image data D1, the image in the region of the medium P corresponding to the region of the reflection Pb can be identified. In the second image data D2, the image in the region of the medium P corresponding to the region of the reflection Pa can be identified.

The image-processing unit 76 extracts the region in which the image in the region of the medium P can be identified from both pieces of image data D1 and D2 to generate the synthesized image data DG. Thus, the image-processing unit 76 according to the first embodiment sets a center line CL of both pieces of image data D1 and D2 as a boundary, the center line CL being positioned between both reflections Pa and Pb in both pieces of image data D1 and D2. The image-processing unit 76 extracts a region opposite to the side on which the reflection Pa is generated based on the center line CL from the first image data D1, extracts a region opposite to the side on which the reflection Pb is generated based on the center line CL from the second image data D2, and synthesizes the image data corresponding to the two extracted regions to generate the synthesized image data DG. Accordingly, the generated synthesized image data DG includes only regions having high image quality of both pieces of image data D1 and D2.

The image-processing unit 76 further performs various corrections on the generated synthesized image data DG such as smoothing the boundary, correcting mirror inversion, trapezoid correction, rectangle cropping, and gamma correction. After the image-processing unit 76 corrects the synthesized image data DG, the corrected synthesized image data DG is stored in the storage unit of the external device 3 to read the image of the medium P.

Figure 12:
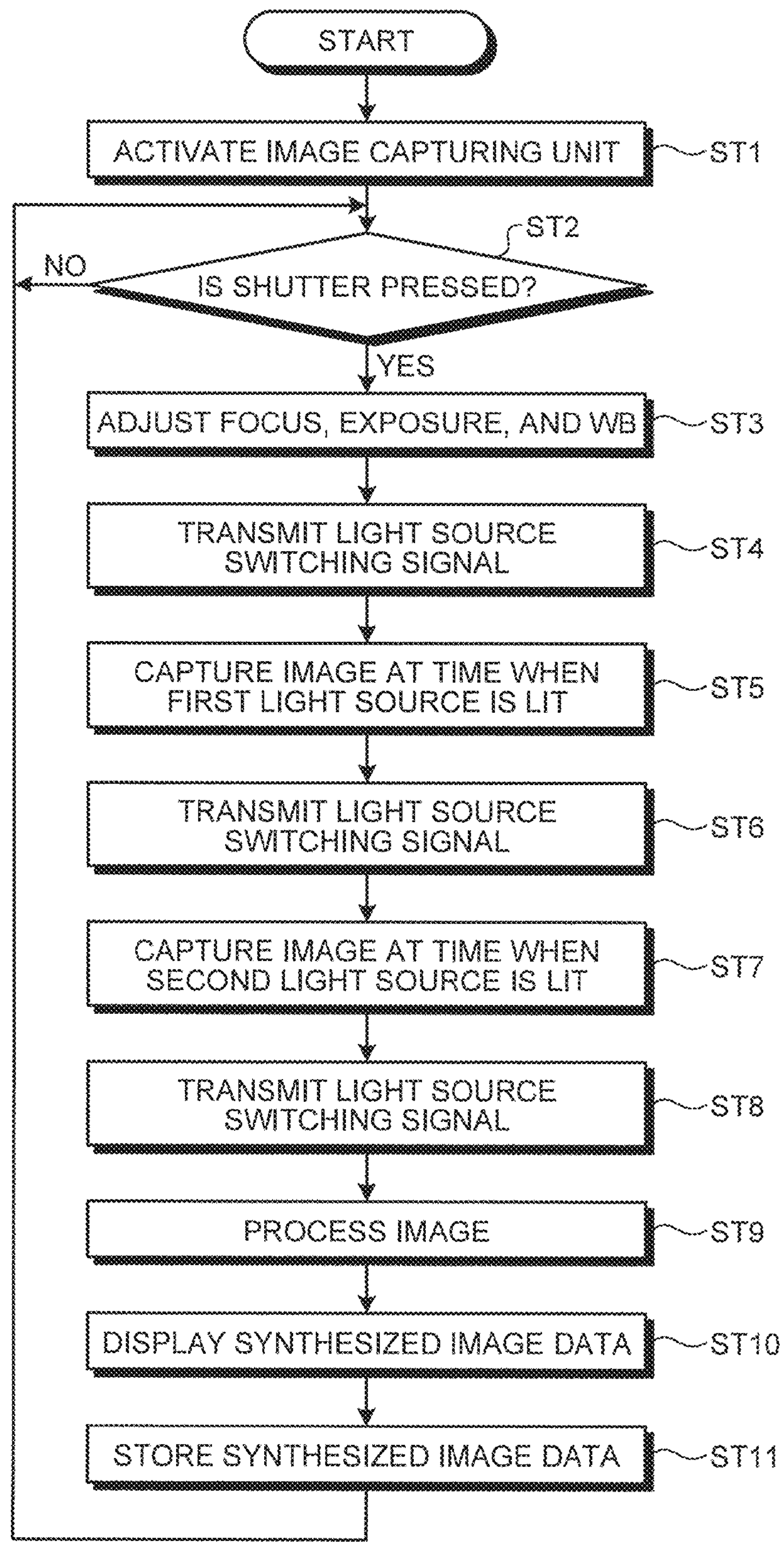
FIG. 12 is a flowchart illustrating a processing procedure in an external device in a case of performing a reading operation with the image-reading apparatus according to the first embodiment.

The following describes reading of the medium P performed by the image-reading apparatus 1 according to the first embodiment. FIG. 12 is a flowchart illustrating a processing procedure in the external device in a case of performing a reading operation with the image-reading apparatus according to the first embodiment. The image-reading apparatus 1 reads the medium P in a state in which the external device 3 is attached to the housing 2. First, the external device 3 activates the image capturing unit 70 based on an instruction for executing the reading application of the external device 3 from the user (Step ST1). The instruction for executing the reading application is given such that, for example, the user operates the display unit 71 to cause the display unit 71 to display an icon of an activation button corresponding to the reading application, and presses the activation button. Accordingly, the image capturing unit 70 is activated to continue to capture the image at the opening 11, image signals are sequentially output to the image-processing unit 76, the image-processing unit 76 sequentially generates image data, and images based on the generated image data are sequentially displayed on the display unit 71.

Next, the external device 3 determines whether the shutter is pressed (Step ST2). Specifically, when the reading application is executed, the shutter is displayed as an icon on the display unit 71 together with the image, so that the external device 3 determines whether the shutter displayed on the display unit 71 is pressed. If it is determined that the shutter is not pressed (No at Step ST2), the external device 3 repeats this determination until the shutter is pressed, and stands by until the shutter is pressed.

Figure 13:
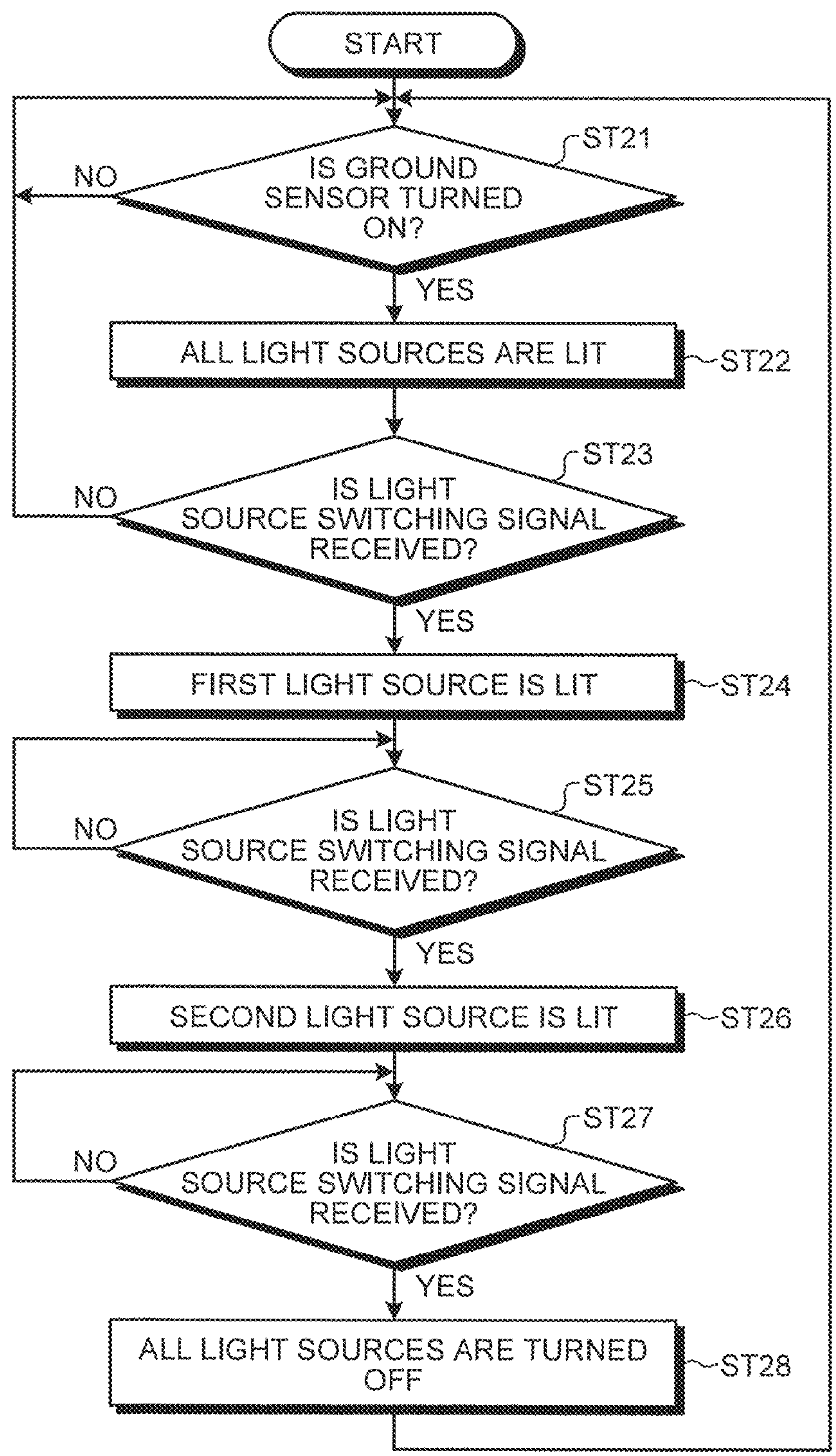
FIG. 13 is a flowchart illustrating a processing procedure in the housing in a case of performing a reading operation with the image-reading apparatus according to the first embodiment.

FIG. 13 is a flowchart illustrating a processing procedure in the housing in a case of performing the reading operation with the image-reading apparatus according to the first embodiment. In reading the medium P with the image-reading apparatus 1, the housing 2 first determines whether the ground sensor 55 is turned ON (Step ST21). That is, to read the medium P, the user checks the medium P to be read, and positions the image-reading apparatus 1 with respect to the medium P with hand so that the opening 11 is opposed to the reading target region Pt of the medium P. At this point, a plurality of light sources 50 are in the lighting-off state. The ground sensor 55 is turned ON when the bottom face 10 of the housing 2 is brought into contact with the medium P to be in a state in which the medium P can be read, so that the housing control unit 60 determines whether the ground sensor 55 is in the ON state to determine whether the opening 11 is blocked to be in the state in which the medium P can be read. If it is determined that the ground sensor 55 is not in the ON state (No at Step ST21), the external device 3 repeats this determination process until it is determined that the ground sensor 55 is in the ON state, and stands by until the ground sensor 55 is turned ON.

If it is determined that the ground sensor 55 is turned ON (Yes at Step ST21), and the bottom face 10 of the housing 2 can be determined to be in closely contact with the medium P or a surface on which the medium P is placed, all the light sources 50 are lit (Step ST22). That is, before the bottom face 10 of the housing 2 is in closely contact with the medium P or a surface on which the medium P is placed, the light sources 50 are in the lighting-off state, so that the inside 12 of the housing is pitch-black. Although the external device 3 sequentially captures images of the medium P blocking the opening 11 with the image capturing unit 70, the image in the corresponding reading target region Pt of the medium P cannot be recognized in the sequentially generated image data because the inside 12 of the housing is pitch-black, which leads to insufficient amount of light. Thus, if it is determined that the ground sensor 55 is turned ON and the opening 11 can be determined to be blocked by the medium P or a surface on which the medium P is placed, the light source control unit 61 causes all the light sources 50 to be lit. Accordingly, light from a plurality of light sources 50 is emitted into the inside 12 of the housing, and the light from the light sources 50 is emitted onto the medium P blocking the opening 11 directly or via the mirror 27.

The display unit 71 sequentially displays the images of the medium P based on the image data sequentially captured by the image capturing unit 70. When the light from the light sources 50 is emitted onto the medium P, the user can recognize the image in the reading target region Pt. Accordingly, the user can adjust a positional relation between the medium P and the opening 11 based on the image displayed on the display unit 71, and cause the reading target region Pt to be within the opening 11. Although the reflections Pa and Pb may be generated in the image data depending on material of the medium P, the positional relation between the medium P and the opening 11 can be recognized even if the reflections Pa and Pb are generated.

After all of the light sources 50 are lit, the external device 3 determines whether a light source switching signal is received (Step ST23). If it is determined that the light source switching signal is not received (No at Step ST23), the external device 3 repeats the determination process until receiving the light source switching signal, and stands by until receiving the light source switching signal. That is, if it is determined that the shutter is pressed (Yes at Step ST2) (refer to FIG. 12), the external device 3 adjusts a focus, exposure, and white balance (WB) (Step ST3). That is, the image capturing control unit 75 sets an image capturing condition for the image capturing unit 70 in accordance with environment of the inside 12 of the housing. Specifically, the image capturing control unit 75 performs such adjustment so that optimum image quality can be obtained for the regions opposite to the side on which the reflections Pa and Pb are generated in both pieces of image data D1 and D2.

After performing such adjustment, the external device 3 then transmits the light source switching signal (Step ST4). That is, the external device 3 transmits a first light source lighting signal serving as the light source switching signal for lighting only the first light source 51 to the light source control unit 61 of the housing 2 via the communication unit 77 of the external device 3 and the communication unit 62 of the housing 2. When receiving the first light source lighting signal, the housing control unit 60 determines that the light source switching signal is received (Yes at Step ST23) (refer to FIG. 13). If it is determined that the light source switching signal is received, the light source control unit 61 lights only the first light source 51 based on the received first light source lighting signal (Step ST24).

After lighting only the first light source 51, the light source control unit 61 determines again whether the light source switching signal is received (Step ST25). If it is determined that the light source switching signal is not received (No at Step ST25), the light source control unit 61 repeats this determination process until receiving the light source switching signal, and stands by until receiving the light source switching signal while keeping the lighting of the first light source 51.

After transmitting the first light source lighting signal, the external device 3 captures an image with the image capturing unit 70 at the time when only the first light source 51 is lit (Step ST5) (refer to FIG. 12). In this case, the image-processing unit 76 generates the first image data D1 in which the reflection Pa corresponding to the first light source 51 is not addressed. At the time of generating the first image data D1, the display unit 71 may display an image based on the first image data D1.

After capturing the image at the time when only the first light source 51 is lit, the external device 3 then transmits the light source switching signal (Step ST6). That is, the external device 3 transmits a second light source lighting signal serving as the light source switching signal for lighting only the second light source 52 to the light source control unit 61 of the housing 2 via the communication unit 77 of the external device 3 and the communication unit 62 of the housing 2. When receiving the second light source lighting signal, the housing control unit 60 determines that the light source switching signal is received (Yes at Step ST25) (refer to FIG. 13). If it is determined that the light source switching signal is received, the light source control unit 61 turns off the first light source 51 based on the received second light source lighting signal, and lights only the second light source 52 (Step ST26).

After lighting only the second light source 52, the light source control unit 61 determines again whether the light source switching signal is received (Step ST27). If it is determined that the light source switching signal is not received (No at Step ST27), the light source control unit 61 repeats this determination process until receiving the light source switching signal, and stands by until receiving the light source switching signal while keeping the lighting of the second light source 52.

After transmitting the second light source lighting signal, the external device 3 captures an image with the image capturing unit 70 at the time when only the second light source 52 is lit (Step ST7) (refer to FIG. 12). In this case, the image-processing unit 76 generates the second image data D2 in which the reflection Pb corresponding to the second light source 52 is not addressed. At the time of generating the second image data D2, the display unit 71 may display an image based on the second image data D2.

After capturing the image at the time when only the second light source 52 is lit, the external device 3 then transmits the light source switching signal (Step ST8). That is, the external device 3 transmits a turn-off signal for all light sources serving as the light source switching signal for turning off the second light source 52 to the light source control unit 61 of the housing 2 via the communication unit 77 of the external device 3 and the communication unit 62 of the housing 2. When receiving the turn-off signal for all light sources, the housing control unit 60 determines that the light source switching signal is received (Yes at Step ST27) (refer to FIG. 13). If it is determined that the light source switching signal is received, the light source control unit 61 turns off the second light source 52 based on the received turn-off signal for all light sources, and turns off all of the light sources 50 (Step ST28).

Figure 14:
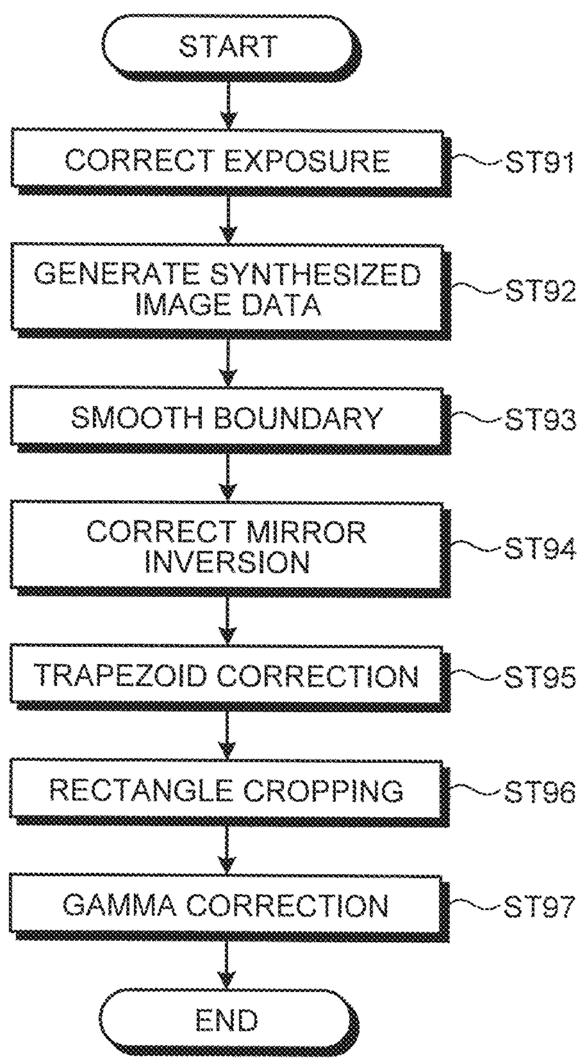
FIG. 14 is a flowchart illustrating a processing procedure of image processing in a case of performing a reading operation with the image-reading apparatus according to the first embodiment.

After transmitting the turn-off signal for all light sources, the external device 3 performs image processing (Step ST9) (refer to FIG. 12). The image processing is performed with the image-processing unit 76 included in the external device 3. FIG. 14 is a flowchart illustrating a processing procedure of image processing in a case of performing a reading operation with the image-reading apparatus according to the first embodiment. The image-processing unit 76 mainly generates the synthesized image data DG and corrects the synthesized image data DG. To perform image processing with the image-processing unit 76, first, exposure of the image data is corrected (Step ST91). Specifically, the image-processing unit 76 corrects the exposure of at least one of the pieces of image data D1 and D2 so that a difference in brightness between the pieces of image data D1 and D2 is reduced. Accordingly, the difference in brightness caused across the center line CL can be prevented in the synthesized image data DG generated from both pieces of image data D1 and D2.

Next, the image-processing unit 76 generates the synthesized image data DG (Step ST92). That is, the image-processing unit 76 generates the synthesized image data DG from the pieces of image data D1 and D2 the exposure of which is corrected. After generating the synthesized image data DG, the image-processing unit 76 then smoothes the boundary (Step ST93). The image-processing unit 76 performs at least one of pieces of smoothing processing known in the art such as rectangle synthesis processing and feathering processing on the boundary between the image data D1 and the image data D2 in the synthesized image data DG, that is, pixel data around the center line CL to smooth the vicinity of the center line CL. Accordingly, the synthesized image data DG can be prevented from being recognized as data generated by synthesizing two pieces of image data D1 and D2 across the center line CL of the synthesized image data DG.

After smoothing the boundary, the image-processing unit 76 corrects mirror inversion (Step ST94). That is, the image capturing unit 70 captures the image of the medium P via the mirror 27, so that the image data generated by the image-processing unit 76 is based on a mirror image, which is reversed upside down. Thus, the image-processing unit 76 corrects mirror inversion known in the art to turn the synthesized image data DG upside down.

After correcting mirror inversion, the image-processing unit 76 then performs trapezoid correction (Step ST95). That is, a distance between the mirror 27 and the opening 11 varies depending on the position of the opening 11, so that the opening 11 seems to be a trapezoid in the image captured by the image capturing unit 70 via the mirror 27 even if the opening 11 has a rectangular shape. Thus, a rectangular image on the medium P becomes a trapezoid in the image data generated by the image-processing unit 76. For example, the image-processing unit 76 sets a deformation amount of an image corresponding to the image data regarding the image on the medium P based on a positional relation among the image capturing unit 70, the mirror 27, and the opening 11, and performs trapezoid correction known in the art based on the deformation amount.

After performing trapezoid correction, the image-processing unit 76 then performs rectangle cropping (Step ST96). For example, the image-processing unit 76 performs rectangle cropping known in the art for extracting a region corresponding to the reading target region Pt based on a difference in brightness and the like between the region corresponding to the reading target region Pt and the other region in the synthesized image data DG. Due to this, the image-processing unit 76 generates the synthesized image data DG including only the region corresponding to the reading target region Pt.

After performing rectangle cropping, the image-processing unit 76 then performs gamma correction (Step ST97). That is, the image-processing unit 76 performs gamma correction known in the art on the synthesized image data DG in accordance with a characteristic of the display unit 71 of the external device 3 or a characteristic of a standard display unit.

In this way, after performing image processing with the image-processing unit 76, the external device 3 causes the display unit 71 to display the image based on the synthesized image data DG (Step ST10) (refer to FIG. 12). That is, the display unit 71 displays the image based on the synthesized image data DG on which various pieces of processing are performed. Next, the synthesized image data DG is stored (Step ST11). That is, the synthesized image data DG on which various pieces of processing are performed is stored in the storage unit by causing the storage unit of the external device 3 to store the synthesized image data DG. After the synthesized image data DG is stored, the process returns to Step ST2, and the external device 3 determines whether the shutter is pressed to stand by until the next reading instruction is given.

An execution instruction and various settings for smoothing the boundary and performing respective corrections and rectangle cropping in the image processing can be preferably performed by operating the icon displayed on the display unit 71 due to the reading application. Preferably, the user instructs to store the synthesized image data DG, that is, to cause the storage unit to store the synthesized image data DG by operating the icon displayed on the display unit 71 due to the reading application.

Figure 15:
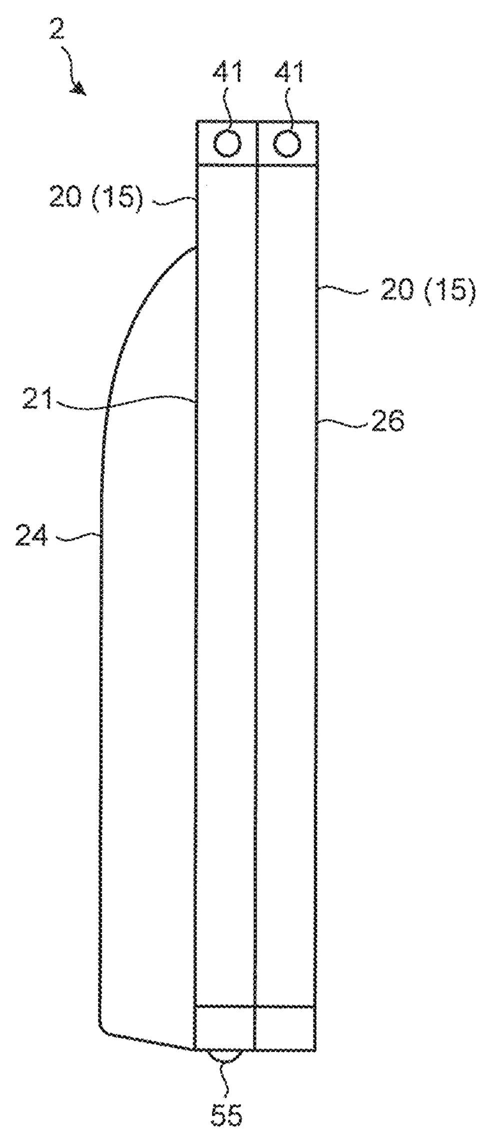
FIG. 15 is a side view of the housing in a folded state.
Figure 16:
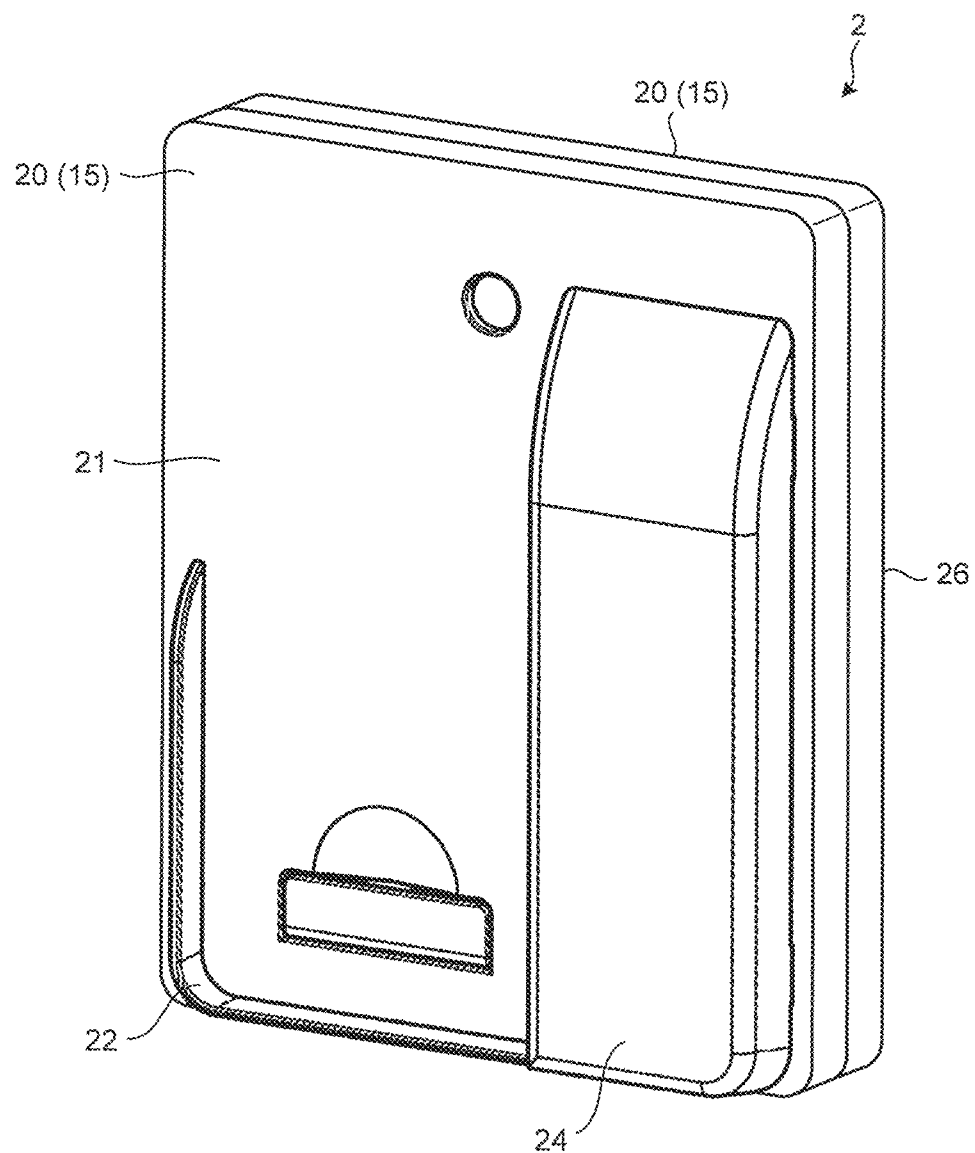
FIG. 16 is a perspective view of the housing illustrated in FIG. 15.

In this way, the image-reading apparatus 1 reads the image of the medium P to be stored in the storage unit of the external device 3. When the medium P is not read, that is, at the time when the image-reading apparatus 1 is not used, the housing 2 can be folded. FIG. 15 is a side view of the housing in a folded state. FIG. 16 is a perspective view of the housing illustrated in FIG. 15. To fold the housing 2, the two inclined cover units 20 are brought close to each other by rotating the inclined cover units 20 about the rotating axes 41 to be moved relatively to each other. In this case, the coupling cover unit 30 positioned between the inclined cover units 20 and coupled to both of the inclined cover units 20 is deformed with respect to the inclined cover units 20 to enter the space therebetween.

That is, in folding the housing 2, the two inclined cover units 20 are rotated about the rotating axes 41 in a direction in which ends of the two inclined cover units 20 on the side on which the opening 11 is positioned are brought close to each other. This operation reduces a distance between the coupling portions of the coupling cover unit 30 being coupled to the two inclined cover units 20.

Specifically, the two rotating members 31 of the coupling cover unit 30 are rotatably coupled to the two respective inclined cover units 20, and the two rotating members 31 are also rotatably coupled to each other via the coupling members 35. Accordingly, when the distance between the coupling portions of the coupling cover unit 30 with respect to the inclined cover unit 20 is reduced, the coupling cover unit 30 enters the space between the inclined cover units 20 such that the rotating member 31 is rotated relatively to the inclined cover unit 20 while the rotating members 31 are rotated relatively to each other. That is, in the coupling cover unit 30 as a whole, portions where the coupling members 35 are positioned are deformed in a state of being bent in a direction closer to the other coupling cover unit 30, and the coupling cover unit 30 enters the space between the two inclined cover units 20.

In this way, when the two inclined cover units 20 are rotated in the direction in which the inclined cover units 20 are brought close to each other to be in parallel, the rotating members 31 of the coupling cover unit 30 that enters the space between the inclined cover units 20 are also in parallel with the inclined cover units 20. Accordingly, the coupling cover unit 30 enters the space between the inclined cover units 20 and the two inclined cover units 20 are overlapped with each other, and the shape of the housing 2 as a whole becomes a substantially rectangular plate having a thickness obtained by adding thicknesses of the two inclined cover units 20 to each other. Due to this, the housing 2 is made compact.

In the image-reading apparatus 1 according to the first embodiment described above, the housing 2 includes the two inclined cover units 20 and the two coupling cover units 30, and the inclined cover units 20 are configured to be able to be switched between the opened state and the folded state such that the inclined cover unit 20 moves relatively to the other inclined cover unit 20 based on the end thereof opposite to the side on which the opening 11 is positioned. Due to this, when the inclined cover units 20 are in the opened state, environmental light emitted onto the medium P can be shielded by the four cover units 15, so that the external device 3 can read the image with stable image quality. When the inclined cover units 20 are in the folded state, the coupling cover unit 30 enters the space between the inclined cover units 20, so that the inclined cover units 20 are made adjacent to each other in parallel to be in a compact form in which the inclined cover units 20 are overlapped with each other. As a result, the image can be read while securing portability of the image-reading apparatus 1 and securing image quality. The housing 2 can be folded as described above, so that the image-reading apparatus 1 can be easily carried by being folded when it is not used, and can be stored while saving a space.

The opened state and the folded state of the two inclined cover units 20 are switched when the two inclined cover units 20 rotate about the respective rotating axes 41, so that any state can be obtained by rotating the two inclined cover units 20 about the respective rotating axes 41 more securely. As a result, portability can be secured, and the image can be read while keeping image quality, with higher reliability.

The coupling cover unit 30 is configured such that one coupling cover unit 30 includes a plurality of rotating members 31. When the inclined cover units 20 are in the folded state, the rotating members 31 rotate relatively to each other to be in parallel with the inclined cover units 20, so that the coupling cover unit 30 can enter the space between the inclined cover units 20 with higher reliability. As a result, the portability of the image-reading apparatus 1 can be improved with higher reliability.

[b] Second Embodiment

An image-reading apparatus 80 according to a second embodiment has substantially the same configuration as that of the image-reading apparatus 1 according to the first embodiment, but the length of the inclined cover unit 20 can be changed. Other components are the same as those in the first embodiment, so that description thereof will not be repeated, and the same component is denoted by the same reference numeral.

Figure 17:
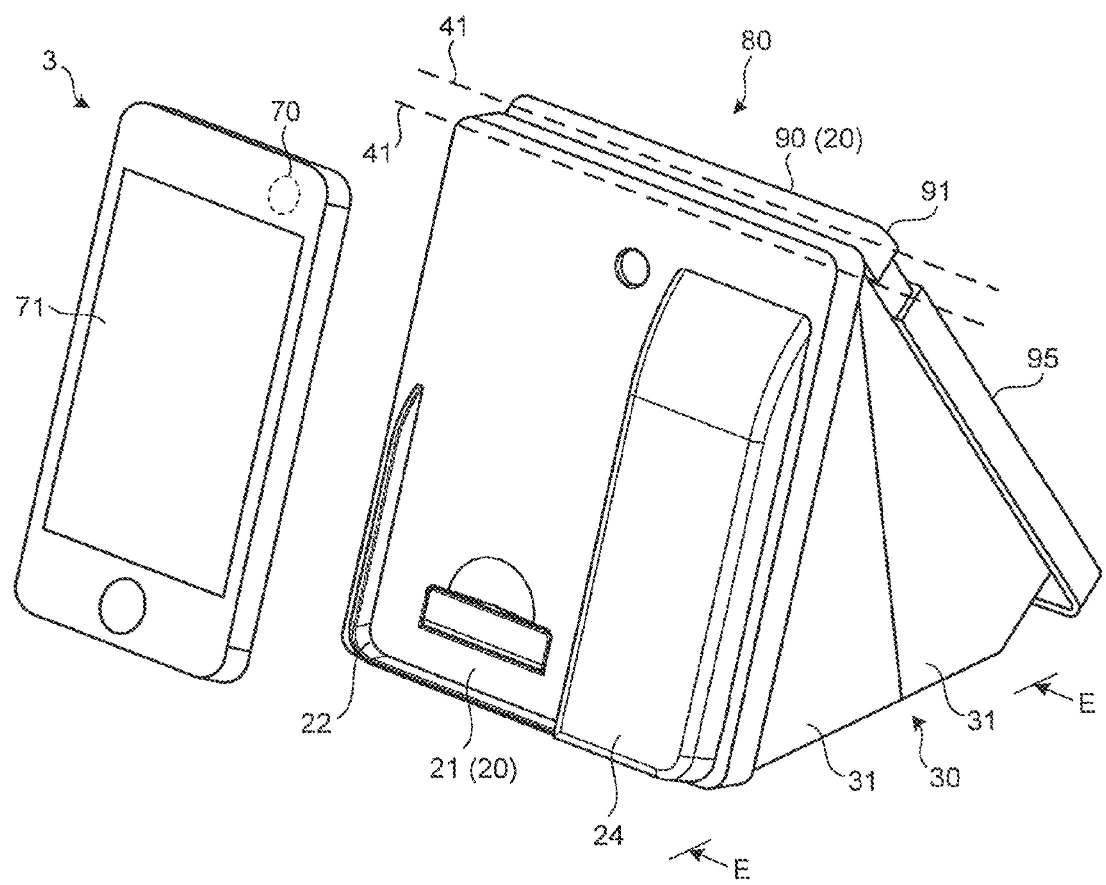
FIG. 17 is a perspective view of an image-reading apparatus according to a second embodiment.
Figure 18:
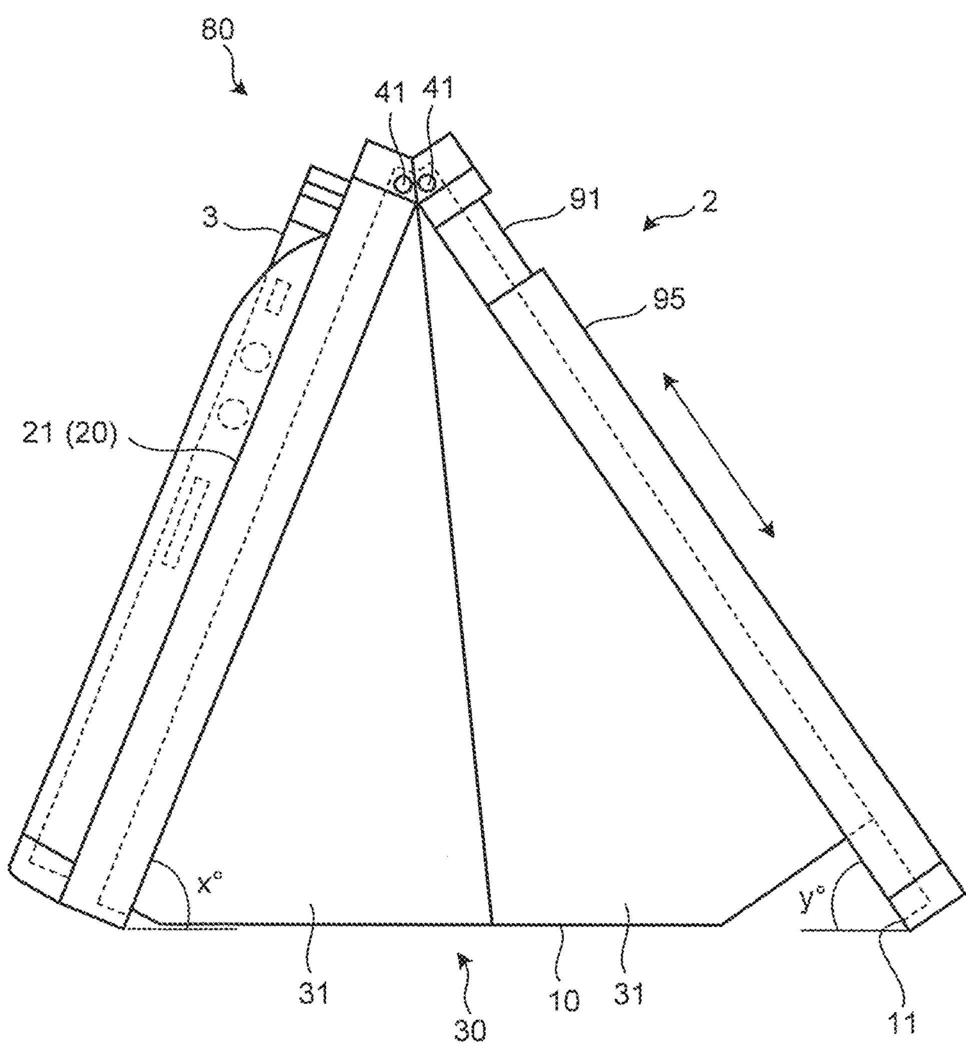
FIG. 18 is a diagram viewed from an arrow direction of line E-E in FIG. 17.

FIG. 17 is a perspective view of the image-reading apparatus according to the second embodiment. FIG. 18 is a diagram viewed from an arrow direction of line E-E in FIG. 17. Similarly to the image-reading apparatus 1 according to the first embodiment, the image-reading apparatus 80 according to the second embodiment includes the housing 2 and the external device 3. In reading the image of the medium P, the image is captured by the external device 3 in a state in which the external device 3 is held by the housing 2. The housing 2 includes the two inclined cover units 20 and the two coupling cover units 30, and the inclined cover units 20 can be rotated about the rotating axes 41 to be switched between the opened state for reading the image of the medium P and the folded state for being carried or stored.

The coupling cover units 30 each includes the two rotating members 31 that are rotatably coupled to each other, and the two rotating members 31 are rotatably coupled to the respective inclined cover units 20.

In the image-reading apparatus 80 according to the second embodiment, a length of a second inclined cover unit 90 of the two inclined cover units 20 included in the housing 2 can be changed, the length in a direction from the end on which the opening 11 is positioned toward the opposite end. The length of the second inclined cover unit 90 can be thus changed, so that the rotating member 31 coupled to the second inclined cover unit 90 among the rotating members 31 included in the coupling cover unit 30 is cut off at the end on the opening 11 side of a portion coupled to the second inclined cover unit 90 to absorb a change in the length of the second inclined cover unit 90.

In reading the image of the medium P with the image-reading apparatus 80, the length of the second inclined cover unit 90 in the direction from the end on which the opening 11 is positioned toward the opposite end is caused to be longer than the length of the first inclined cover unit 21. Thus, an angle y° formed by the second inclined cover unit 90 and the side of the coupling cover unit 30 on the opening 11 side is smaller than the angle x° formed by the first inclined cover unit 21 and the side of the coupling cover unit 30 on the opening 11 side.

Figure 19:
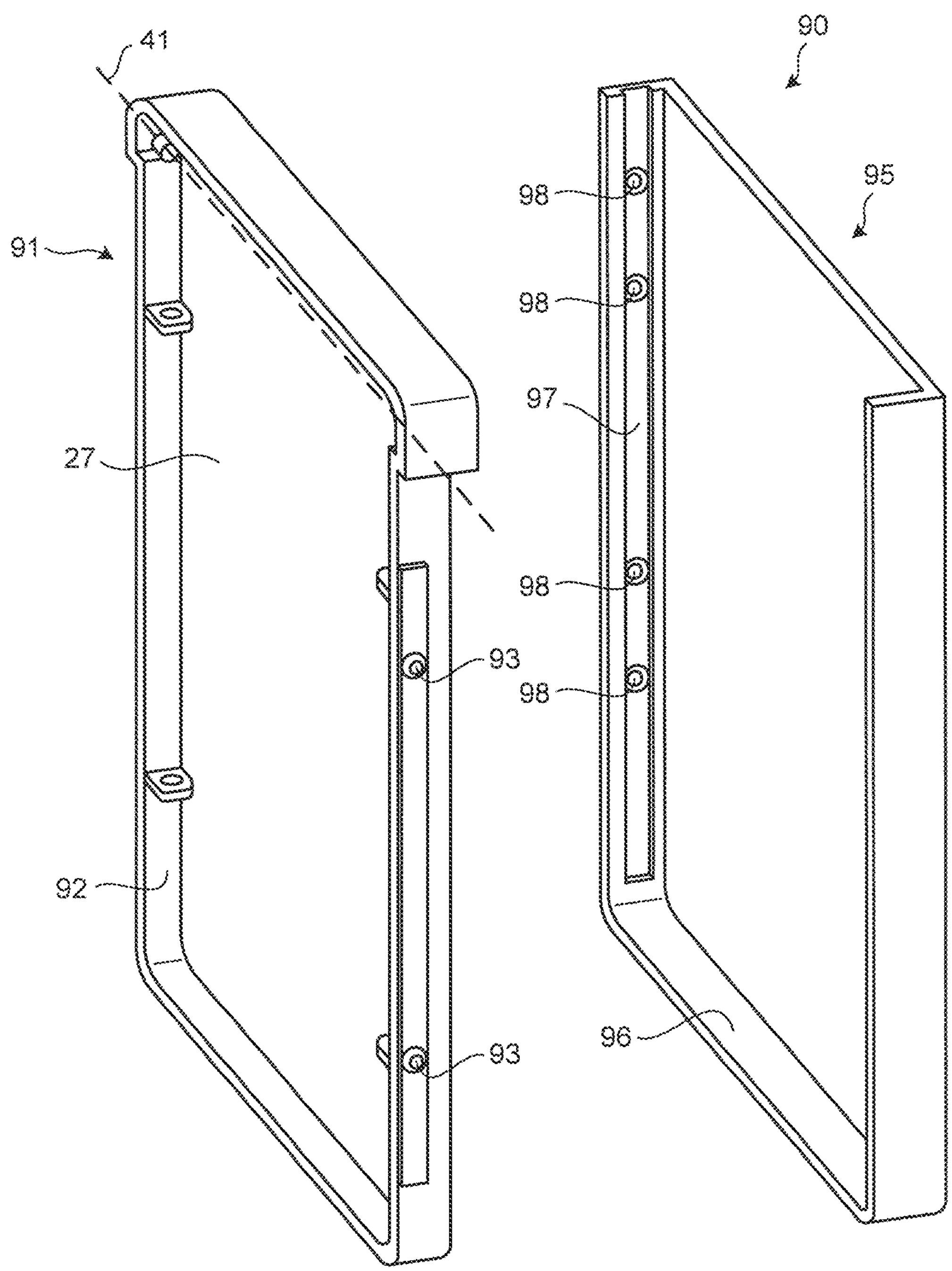
FIG. 19 is an exploded perspective view of a second inclined cover unit illustrated in FIG. 17.

FIG. 19 is an exploded perspective view of the second inclined cover unit illustrated in FIG. 17. The second inclined cover unit 90 the length of which can be changed includes a base unit 91 and a sliding unit 95. Among these, the base unit 91 is formed to have a substantially rectangular shape, and is coupled to the rotating cover unit 40 near one of the sides of the rectangular shape. That is, the base unit 91 is a member that is rotatably coupled to the rotating cover unit 40 about the rotating axis 41 in the second inclined cover unit 90. The base unit 91 thus coupled to the rotating cover unit 40 has a base unit frame 92 as a frame member surrounding a rectangular plate around a member having a substantially rectangular plate-shape, and the mirror 27 is disposed on the surface thereof opposite to the first inclined cover unit 21.

Projecting parts 93 projecting outward from the rectangle are disposed on an outer part of the base unit frame 92 corresponding to two of the four sides of the rectangle as the shape of the base unit 91 positioned on both ends of the direction in which the rotating axis 41 extends. A plurality of projecting parts 93 are disposed for each side on which the projecting parts 93 are disposed.

The sliding unit 95 is configured to have a member having a substantially rectangular plate shape the size of which is similar to that of the base unit 91, and have a sliding unit frame 96 as a frame member surrounding a rectangular plate disposed at a position corresponding to three sides of the member having a substantially rectangular plate shape. Specifically, the sliding unit frame 96 is disposed on three of the four sides forming the sliding unit 95 other than a side positioned on a side on which the rotating axis 41 is positioned in the base unit 91.

A groove 97 into which the projecting parts 93 disposed on the base unit frame 92 are inserted is formed on an inner part of the sliding unit frame 96 corresponding to the sides at which the projecting parts 93 are positioned in the base unit frame 92 disposed at four sides of the rectangle of the base unit 91. The groove 97 is formed along the sides at which the sliding unit frame 96 is disposed on which the groove 97 is formed. A plurality of engagement holes 98 into which the projecting parts 93 are inserted are formed in the groove 97. The engagement holes 98 are formed at positions at which the projecting parts 93 are inserted when the inclined cover units 20 are in the opened state, and at positions at which the projecting parts 93 are inserted when the inclined cover units 20 are in the folded state. Both of the base unit 91 and the sliding unit 95 are formed of a material having elasticity such as a resin material, are elastically deformed when a large force is applied to the sliding unit 95 and the base unit 91, and the projecting part 93 can be inserted into the engagement hole 98 or slip out of the engagement hole 98.

In the second inclined cover unit 90, the sliding unit 95 is overlapped with the surface of the base unit 91 opposite to the surface on which the mirror 27 is disposed, so that the base unit 91 and the sliding unit 95 are integrally formed. In this case, the base unit frame 92 and the sliding unit frame 96 are brought into a state in which the sliding unit frame 96 is positioned at the outside of the base unit frame 92, the base unit frame 92 and the sliding unit frame 96 are overlapped with each other in the direction in which the rotating axis 41 extends, and the projecting parts 93 of the base unit frame 92 are inserted into the groove 97 of the sliding unit frame 96.

Accordingly, the projecting parts 93 can be moved relatively to the groove 97 in a direction along which the groove 97 is formed, and the base unit frame 92 and the sliding unit frame 96 can be relatively moved in the direction along which the groove 97 is formed, that is, a direction across the end on which the opening 11 is positioned and the opposite end. Due to this, in the second inclined cover unit 90, the sliding unit 95 is coupled to the base unit 91 in a slidable manner.

The image-reading apparatus 80 according to the second embodiment has the configuration as described above. The following describes advantageous effects thereof. To read the image of the medium P with the image-reading apparatus 80, the housing 2 is caused to be in the opened state, and the sliding unit 95 of the second inclined cover unit 90 is slid with respect to the base unit 91 in a direction away from the rotating axis 41. In this way, when the sliding unit 95 is slid with respect to the base unit 91 in the direction away from the rotating axis 41, the projecting part 93 disposed on the base unit 91 is inserted into the engagement hole 98 among a plurality of engagement holes 98 disposed on the sliding unit 95 at a position where the projecting part 93 is inserted in the opened state, and the projecting part 93 is engaged with the engagement hole 98. Due to this, the sliding unit 95 is fixed at a desired position in a case in which the sliding unit 95 is slid in the direction away from the rotating axis 41.

In other words, some of the engagement holes 98 are formed at positions on the sliding unit 95 where the projecting parts 93 are inserted when the sliding unit 95 is slid and the length of the second inclined cover unit 90 in the direction across the end on which the opening 11 is positioned and the opposite end becomes appropriate for reading the image of the medium P. In this state, a relation among the image capturing unit 70 of the external device 3 held by the first inclined cover unit 21, the mirror 27, and the medium P can be caused to be more appropriate for image capturing, so that the image can be captured with higher image quality when the image of the medium P is captured by the image capturing unit 70 via the mirror 27.

Figure 20:
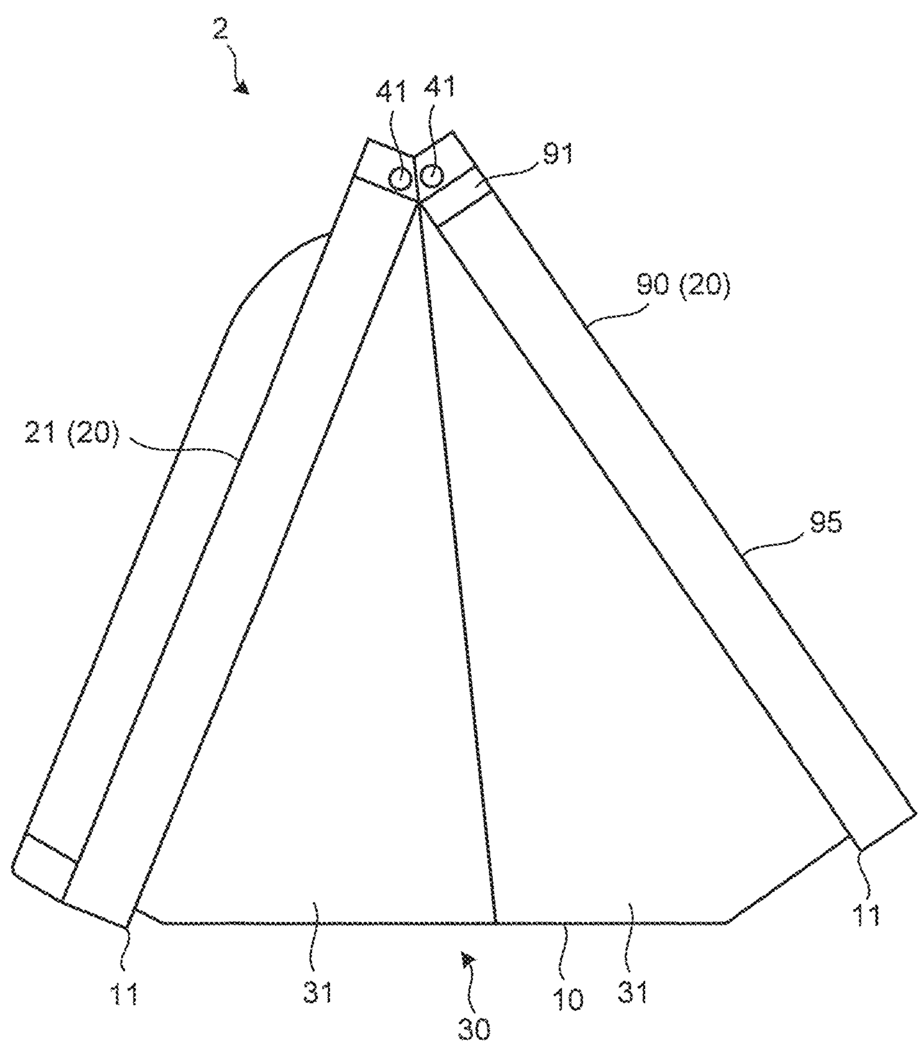
FIG. 20 is an explanatory diagram in a case of shortening the length of the second inclined cover unit illustrated in FIG. 17.

FIG. 20 is an explanatory diagram in a case of shortening the length of the second inclined cover unit illustrated in FIG. 17. To cause the inclined cover unit 20 to be in the folded state, first, the sliding unit 95 of the second inclined cover unit 90 is slid toward the side on which the rotating axis 41 is positioned, and the length of the second inclined cover unit 90 in the direction across the end on which the opening 11 is positioned and the opposite end is shortened. In this case, the rotating member 31 coupled to the second inclined cover unit 90 among the rotating members 31 included in the coupling cover unit 30 is cut off at the end on the opening 11 side of a portion coupled to the second inclined cover unit 90. Accordingly, the sliding unit 95 can be slid while the sliding unit frame 96 is not brought into contact with the rotating member 31.

In this way, when the sliding unit 95 is slid with respect to the base unit 91 in the direction closer to the rotating axis 41, the projecting part 93 disposed on the base unit 91 is inserted into the engagement hole 98 among a plurality of engagement holes 98 disposed on the sliding unit 95 at a position where the projecting part 93 is inserted in the folded state, and the projecting part 93 is engaged with the engagement hole 98. Due to this, the sliding unit 95 is fixed at a desired position in a case in which the sliding unit 95 is slid in the direction closer to the rotating axis 41.

Specifically, some of the engagement holes 98 are formed at positions on the sliding unit 95 where the projecting parts 93 are inserted when the sliding unit 95 is slid and the length of the second inclined cover unit 90 in the direction across the end on which the opening 11 is positioned and the opposite end becomes substantially the same as the length of the first inclined cover unit 21. Thus, when the sliding unit 95 is slid with respect to the base unit 91 in the direction closer to the rotating axis 41, the sliding unit 95 is fixed at the position where the length of the second inclined cover unit 90 is substantially the same as the length of the first inclined cover unit 21.

Figure 21:
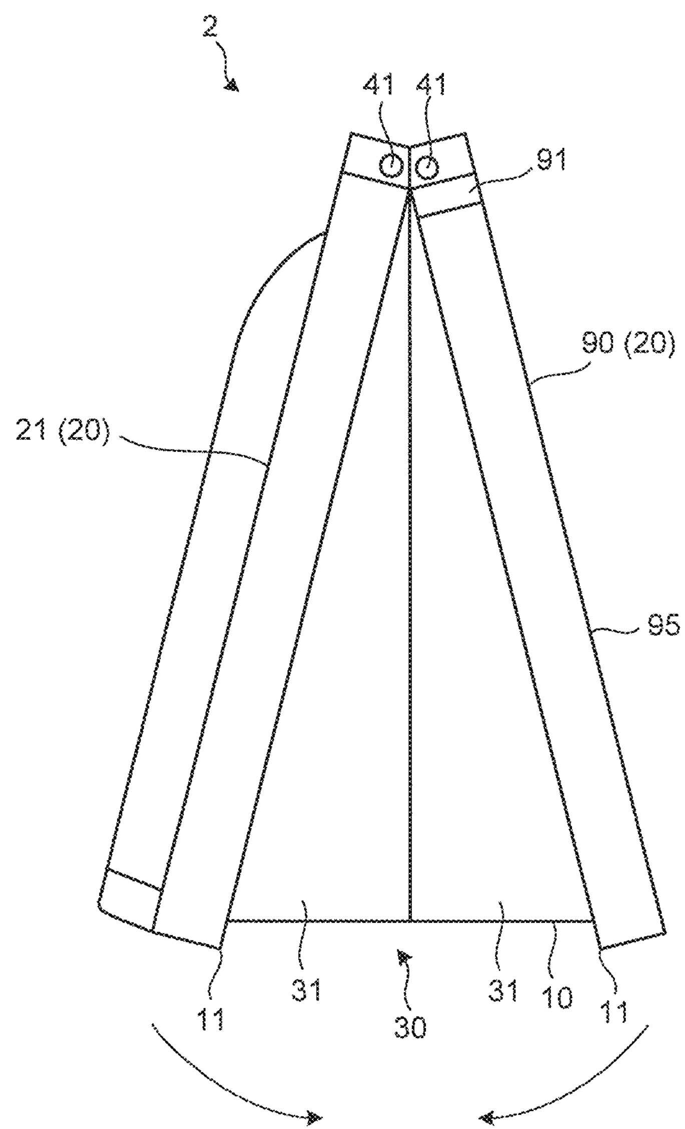
FIG. 21 is an explanatory diagram in a case of causing the inclined cover units illustrated in FIG. 20 to be in a folded state.
Figure 22:
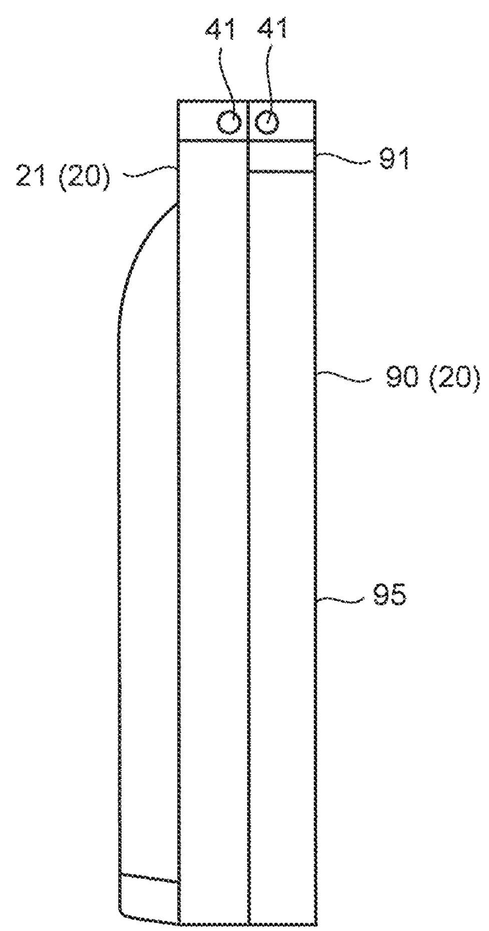
FIG. 22 is an explanatory diagram in a case in which the inclined cover units illustrated in FIG. 21 are in a folded state.

FIG. 21 is an explanatory diagram in a case of causing the inclined cover units illustrated in FIG. 20 to be in the folded state. FIG. 22 is an explanatory diagram in a case in which the inclined cover units illustrated in FIG. 21 are in the folded state. To cause the inclined cover units 20 included in the housing 2 to be in the folded state, the first inclined cover unit 21 and the second inclined cover unit 90 are rotated about the respective rotating axes 41 in a direction in which the first inclined cover unit 21 and the second inclined cover unit 90 get closer to each other. In this case, the coupling cover unit 30 that is positioned between the first inclined cover unit 21 and the second inclined cover unit 90 and coupled to both of them enters the space between the inclined cover units 20 when the rotating members 31 coupled to each other are rotated and the rotating members 31 are also rotated with respect to the inclined cover units 20.

Due to this, the first inclined cover unit 21 is overlapped with the second inclined cover unit 90 in parallel. In this case, the length of the second inclined cover unit 90 is substantially the same as the length of the first inclined cover unit 21 by sliding the sliding unit 95 in the direction getting closer to the rotating axis 41, so that, in the housing 2 in the folded state, the first inclined cover unit 21 and the second inclined cover unit 90 are overlapped with each other while having substantially the same shape in a plan view. Accordingly, the housing 2 as a whole becomes a substantially rectangular plate having a thickness obtained by adding the thicknesses of the two inclined cover units 20 to each other, and the housing 2 is made compact.

In the image-reading apparatus 80 according to the second embodiment described above, the length of the second inclined cover unit 90 can be changed, so that the length of the second inclined cover unit 90 can be caused to be appropriate for the opened state or the folded state of the inclined cover units 20. That is, while compactness of the inclined cover units 20 is secured in the folded state, the relation among the image capturing unit 70 of the external device 3, the mirror 27, and the medium P can be caused to be more appropriate for image capturing in the opened state. As a result, portability of the image-reading apparatus 80 can be secured, and the image can be read with higher image quality.

Modification

Figure 23:
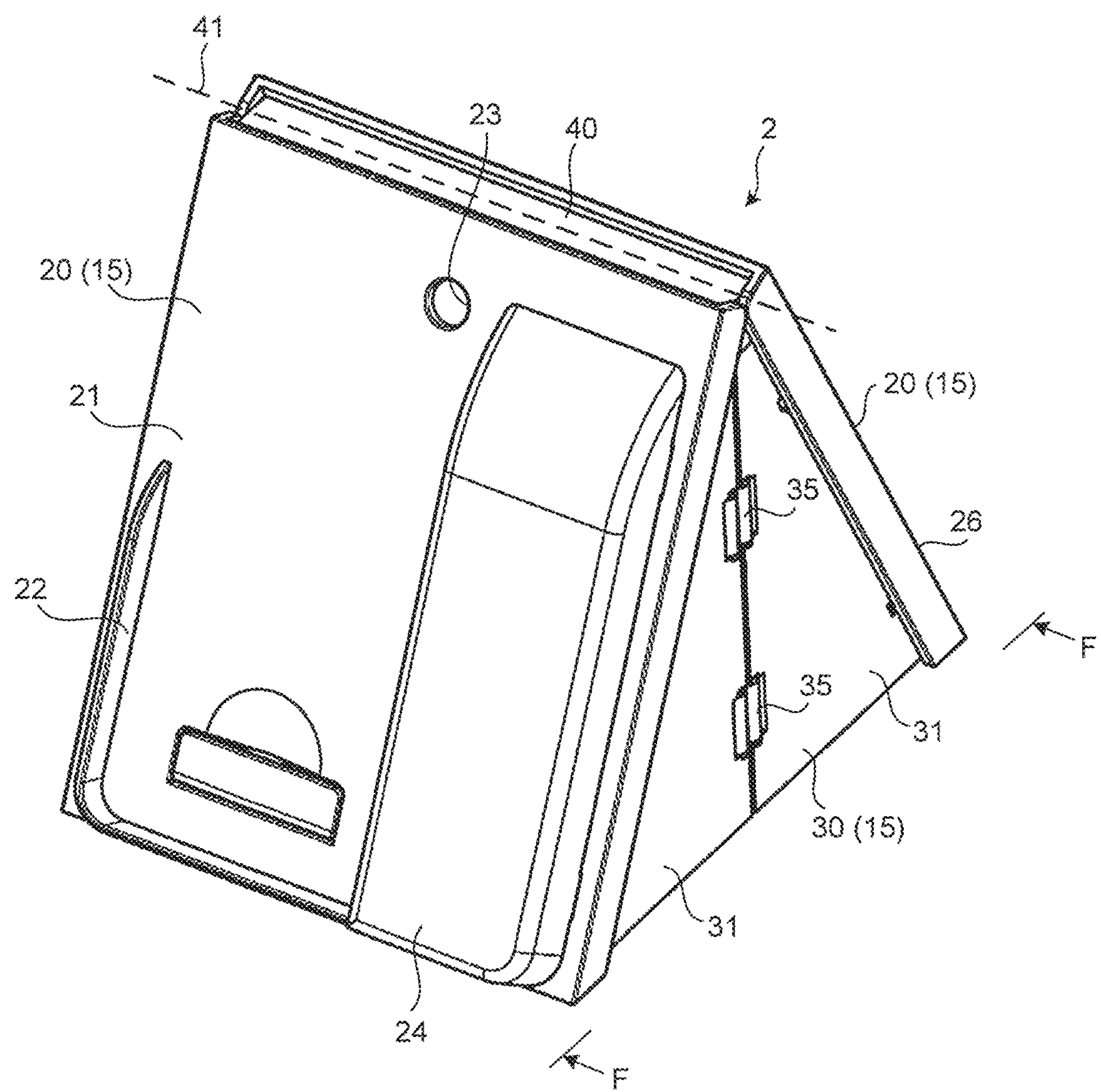
FIG. 23 is an explanatory diagram illustrating a modification of the image-reading apparatus according to the first embodiment, and is a perspective view of the housing including one rotating axis.
Figure 24:
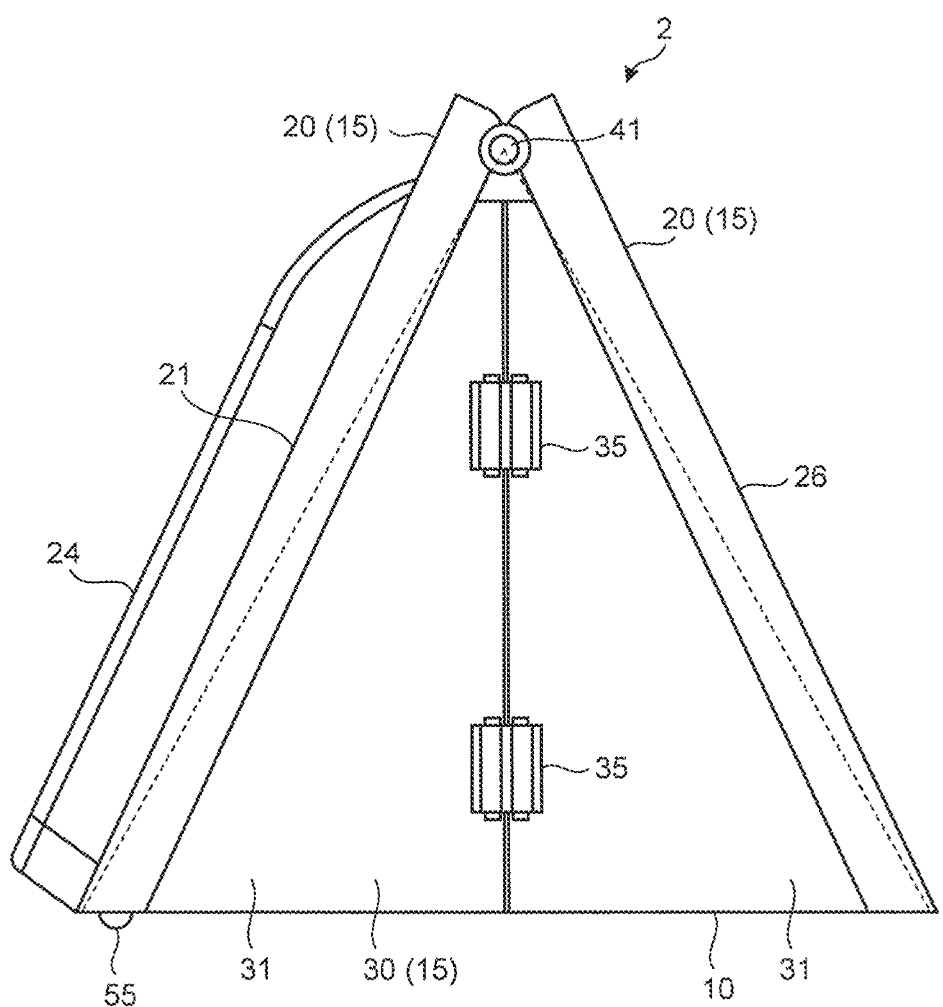
FIG. 24 is a diagram viewed from an arrow direction of line F-F in FIG. 23.

In the image-reading apparatus 1 according to the first embodiment, the two inclined cover units 20 included in the housing 2 can be rotated about the respective rotating axes 41. However, the rotating axis 41 of the inclined cover unit 20 is not necessarily provided for each inclined cover unit 20. FIG. 23 is an explanatory diagram illustrating a modification of the image-reading apparatus according to the first embodiment, and is a perspective view of the housing including one rotating axis. FIG. 24 is a diagram viewed from an arrow direction of line F-F in FIG. 23. As illustrated in FIGS. 23 and 24, the two inclined cover units 20 included in the housing 2 may be configured to be switched between the opened state and the folded state by being rotated together about a common rotating axis 41. That is, the two inclined cover units 20 may be coupled to one rotating cover unit 40 to be rotated about the common virtual rotating axis 41. By configuring the two inclined cover units 20 to be rotated about one rotating axis 41, a form of a portion related to the rotation of the inclined cover unit 20 can be simplified, which can reduce production cost.

Figure 25:
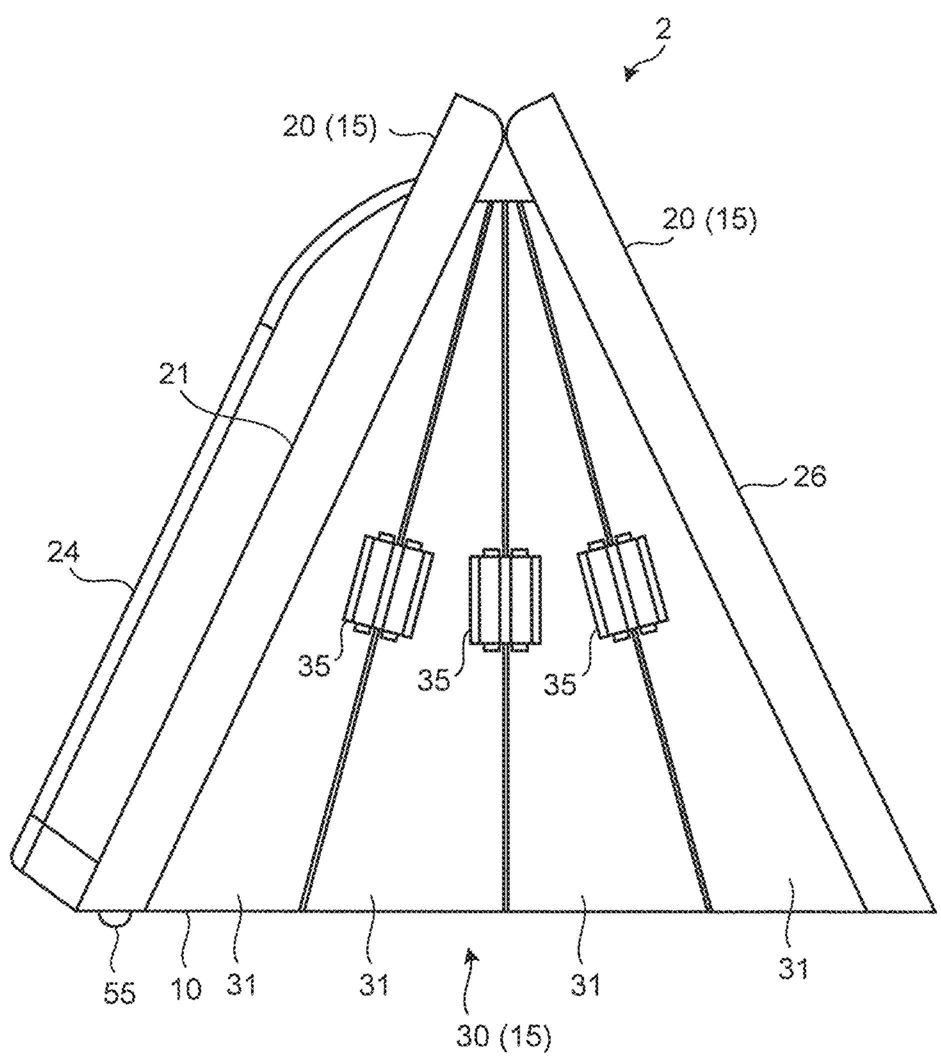
FIG. 25 is an explanatory diagram illustrating a modification of the image-reading apparatus according to the first embodiment, and is an explanatory diagram in a case in which a coupling cover unit includes four rotating members.

In the image-reading apparatus 1 according to the first embodiment, one coupling cover unit 30 includes the two rotating members 31. However, the number of the rotating members 31 included in one coupling cover unit 30 is not limited to two. FIG. 25 is an explanatory diagram illustrating a modification of the image-reading apparatus according to the first embodiment, and is an explanatory diagram in a case in which the coupling cover unit includes four rotating members. For example, as illustrated in FIG. 25, one coupling cover unit 30 may include four rotating members 31. In this case, the four rotating members 31 are arranged so that the four rotating members 31 are aligned with each other between the two inclined cover units 20 when the two inclined cover units 20 are caused to be in the opened state, and the rotating member 31 adjacent to the inclined cover unit 20 is rotatably coupled to the inclined cover unit 20. Adjacent rotating members 31 are rotatably coupled to each other via the coupling members 35. Also in this case, to cause the inclined cover unit 20 to be in the folded state, the coupling cover unit 30 is rotated with respect to the inclined cover unit 20 and the rotating members 31 are rotated relatively to each other, so that the coupling cover unit 30 enters the space between the inclined cover units 20 in parallel with the two inclined cover units 20.

In this way, when one coupling cover unit 30 includes the four rotating members 31, a width of one rotating member 31 in a direction between the inclined cover units 20 in the opened state is smaller than that of one rotating member 31 in a case in which one coupling cover unit 30 includes two rotating members 31. Accordingly, in a case in which the inclined cover units 20 are caused to be in the folded state and the rotating members 31 are caused to be in parallel with the inclined cover units 20, the width of the rotating member 31 in a direction between the coupling cover units 30 is smaller than that in a case in which one coupling cover unit 30 includes two rotating members 31.

Thus, when one coupling cover unit 30 includes four rotating members 31, a projecting amount of each of the two coupling cover units 30 in a direction toward the other coupling cover unit 30 in a case in which the inclined cover unit 20 is in the folded state is smaller than that in a case in which one coupling cover unit 30 includes two rotating members 31. Accordingly, the coupling cover units 30 are hardly brought into contact with each other when the inclined cover units 20 are in the folded state, so that a notch provided in a case in which the coupling cover units 30 are brought into contact with each other is not required.

That is, when the coupling cover units 30 are brought into contact with each other in a case in which one coupling cover unit 30 includes two rotating members 31 and the inclined cover units 20 are caused to be in the folded state, a contact portion needs to be notched to prevent the contact therebetween. If one coupling cover unit 30 includes four rotating members 31, such a notch is not required. Due to this, environmental light can be more reliably prevented from being emitted to the inside 12 of the housing when the inclined cover units 20 are in the opened state, and the image of the medium P can be more reliably read with stable image quality. The coupling cover units 30 are hardly brought into contact with each other when the inclined cover units 20 are in the folded state, so that the size of the housing 2 can be reduced, and the portability of the image-reading apparatus 1 can be improved more reliably.

Figure 26:
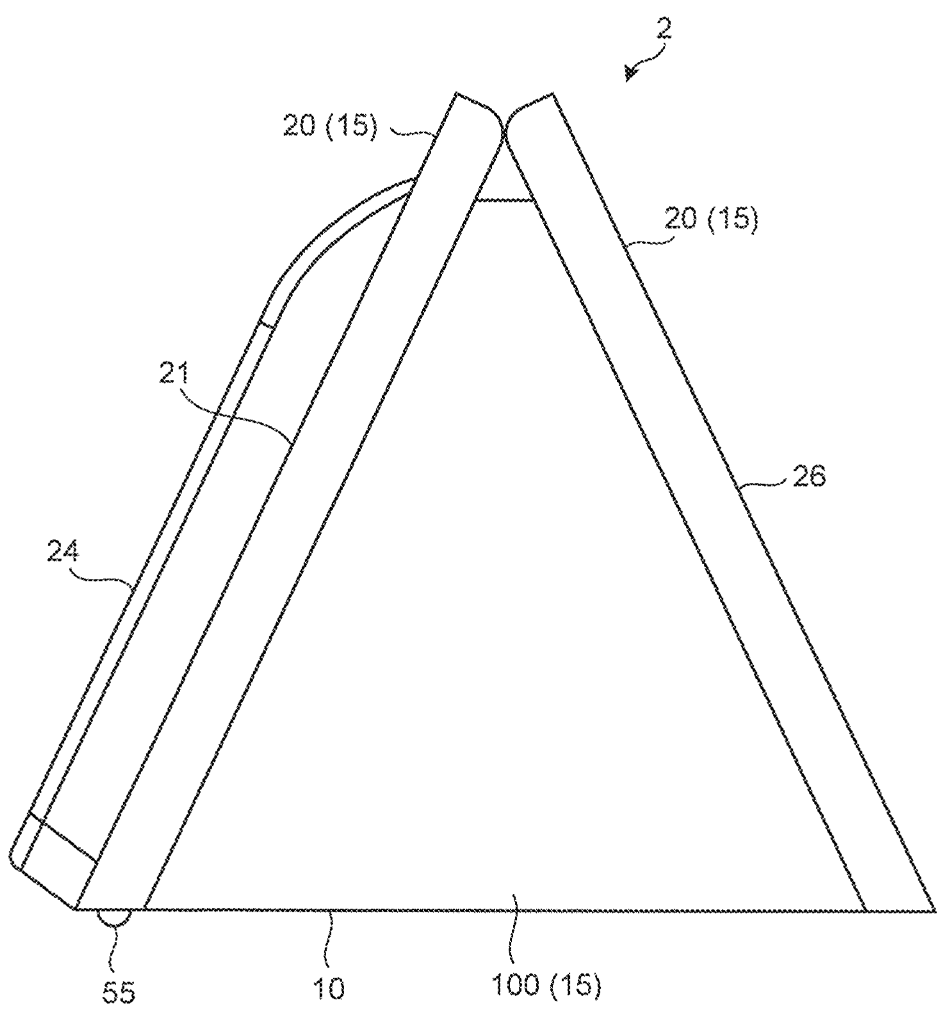
FIG. 26 is an explanatory diagram illustrating a modification of the image-reading apparatus according to the first embodiment, and is an explanatory diagram in a case in which the coupling cover unit is made of a soft member.

The coupling cover unit included in the housing 2 may have a configuration other than the configuration in which a plurality of rotating members 31 are rotatably coupled to each other. FIG. 26 is an explanatory diagram illustrating a modification of the image-reading apparatus according to the first embodiment, and is an explanatory diagram in a case in which the coupling cover unit is made of a soft member. A coupling cover unit 100 may be made of, for example, a soft member such as a resin material or a rubber material. That is, the coupling cover unit 100 may be configured of one deformable member made of a soft material instead of being deformable by combining a plurality of members made of a hard material. When the coupling cover unit 100 is configured with such a soft member to enter the space between the inclined cover units 20 by being deformed with respect to the inclined cover unit 20 while the two inclined cover units 20 are in the folded state, the coupling cover unit 100 can be caused to be in parallel with the two inclined cover units 20 by being bent.

For example, when the two inclined cover units 20 are in the folded state, the coupling cover unit 100 is bent around the center in the direction between the inclined cover units 20 to be in parallel with the inclined cover units 20 and enter the space therebetween. That is, when the two inclined cover units 20 are in the folded state, the coupling cover unit 100 is bent at a portion corresponding to a portion at which the two rotating members 31 included in the coupling cover unit 30 are coupled to each other in the image-reading apparatus 1 according to the first embodiment, and the coupling cover unit 100 enters the space between the inclined cover units 20.

In this way, when the coupling cover unit 100 is configured of a soft member, the coupling cover unit 100 can be configured of one member, the coupling cover unit 100 to be deformed between the opened state and the folded state of the inclined cover units 20 and enter the space between the inclined cover units 20 in the folded state. Due to this, the number of components and man-hours for manufacture can be reduced, so that the production cost can be reduced.

Figure 27:
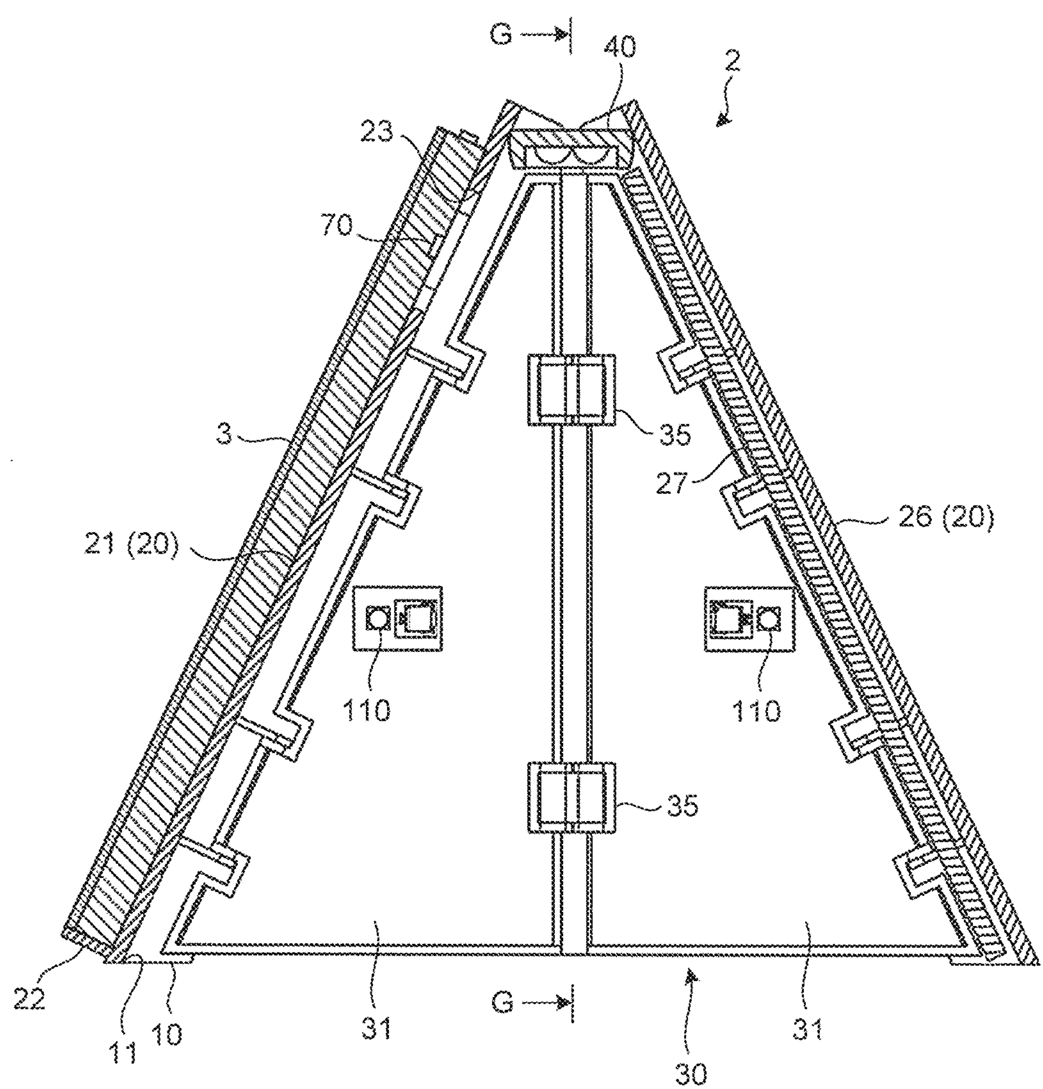
FIG. 27 is an explanatory diagram illustrating a modification of the image-reading apparatus according to the first embodiment, and is an explanatory diagram in a case in which a light source is configured of a point light source.
Figure 28:
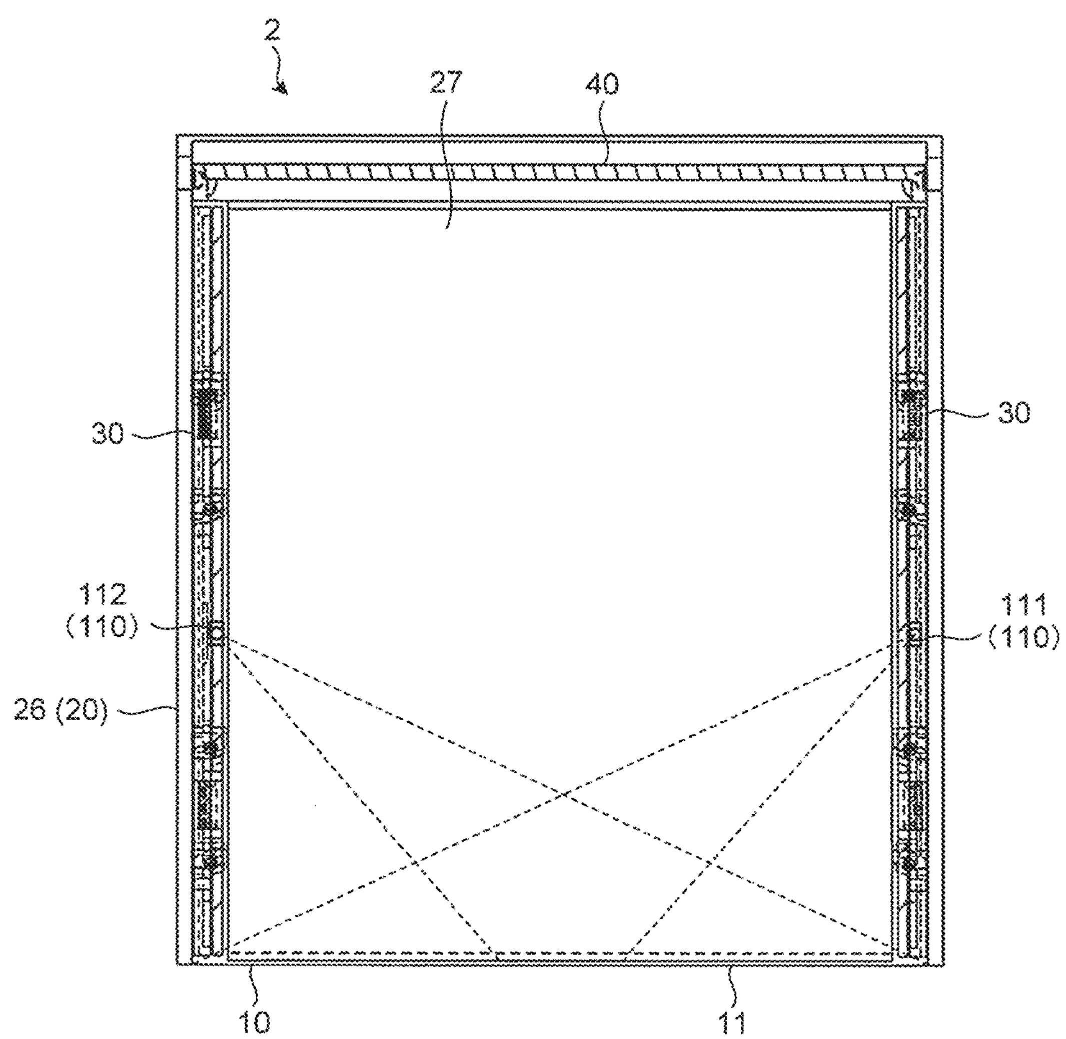
FIG. 28 is a cross-sectional view along line G-G in FIG. 27.

In the image-reading apparatus 1 according to the first embodiment, the light source disposed on the housing 2 is configured as the light emitting module in which a plurality of light emitting elements are disposed in a band shape. However, the light source may have another configuration. FIG. 27 is an explanatory diagram illustrating a modification of the image-reading apparatus according to the first embodiment, and is an explanatory diagram in a case in which the light source is configured of a point light source. FIG. 28 is a cross-sectional view along line G-G in FIG. 27. As illustrated in FIGS. 27 and 28, a light source 110 disposed on the inner face side of the housing 2 may be configured as a point light source. That is, one light source 110 may be configured of one light emitting element. Even when the light source 110 is configured as a point light source, the light source 110 includes a first light source 111 and a second light source 112. The first light source 111 is disposed on one of the two coupling cover units 30, and the second light source 112 is disposed on the other one of the two coupling cover units 30.

The first light source 111 and the second light source 112 are disposed on the respective two rotating members 31 included in one coupling cover unit 30. That is, the first light source 111 is disposed on each of the two rotating members 31 included in the coupling cover unit 30 on a side on which the first light source 111 is disposed, and the second light source 112 is disposed on each of the two rotating members 31 included in the coupling cover unit 30 on a side on which the second light source 112 is disposed.

The first light source 111 can emit light to a position closer to the coupling cover unit 30 on which the second light source 112 is disposed in the opening 11, and the second light source 112 can emit light to a position closer to the coupling cover unit 30 on which the first light source 111 is disposed in the opening 11. Due to this, in reading the medium P, even when the light emitted from the light source 110 is regularly reflected from the medium P and the regularly reflected light enters the image capturing unit 70, an image can be obtained without reflection of the light source 110 by combining an image captured by lighting only the first light source 111 and an image captured by lighting only the second light source 112. If an amount of light sufficient for appropriately reading the medium P can be secured even when the light source 110 is a point light source, the light source 110 may be configured of a point light source as described above.

Figure 29:
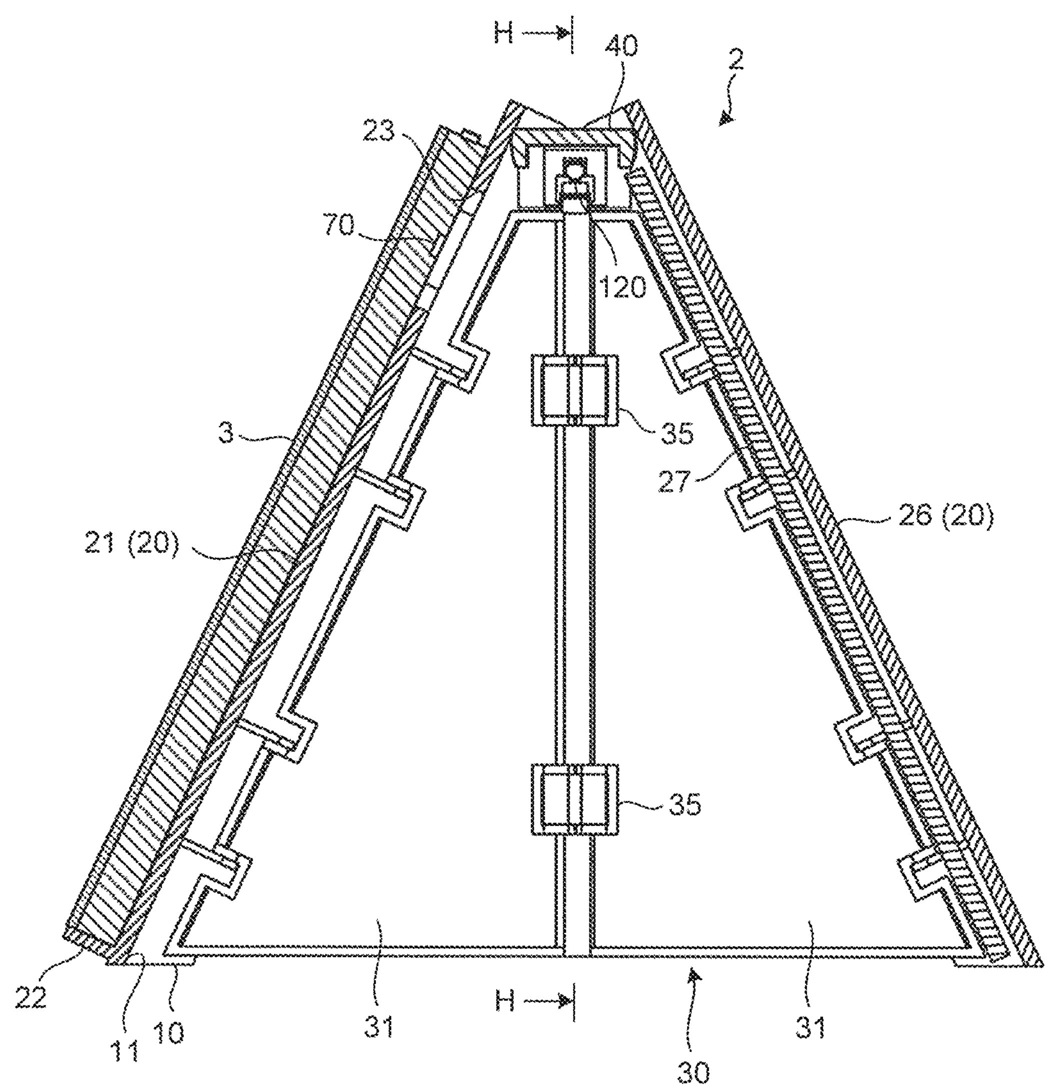
FIG. 29 is an explanatory diagram illustrating a modification of the image-reading apparatus according to the first embodiment, and is an explanatory diagram in a case in which the light source is disposed on a rotating cover unit.
Figure 30:
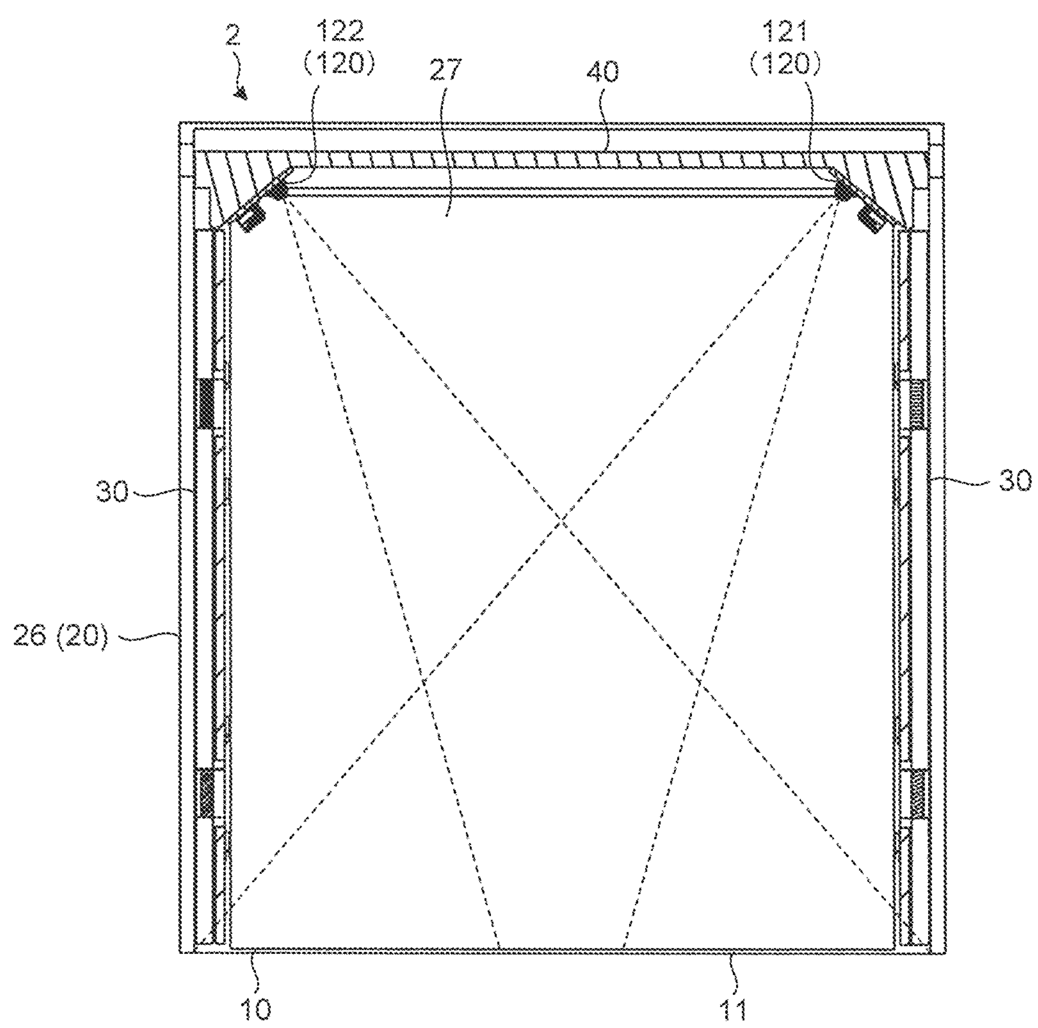
FIG. 30 is a cross-sectional view along line H-H in FIG. 29.

The light source included in the housing 2 may be disposed on a component other than the coupling cover unit 30. FIG. 29 is an explanatory diagram illustrating a modification of the image-reading apparatus according to the first embodiment, and is an explanatory diagram in a case in which the light source is disposed on the rotating cover unit. FIG. 30 is a cross-sectional view along line H-H in FIG. 29. A light source 120 disposed on the inner face side of the housing 2 may be disposed, for example, on the rotating cover unit 40 as illustrated in FIG. 29 and FIG. 30. Specifically, the light source 120 includes a first light source 121 and a second light source 122, and the first light source 121 and the second light source 122 are disposed on a lower face side of the rotating cover unit 40, that is, disposed near both ends of the rotating cover unit 40 on the inner face side of the housing 2. That is, the first light source 121 is disposed on one end of the rotating cover unit 40, and the second light source 122 is disposed on the other end of the rotating cover unit 40.

The first light source 121 and the second light source 122 have different irradiation directions. The first light source 121 can emit light to a position in the opening 11 closer to the coupling cover unit 30 positioned at the end on which the second light source 122 is disposed in the rotating cover unit

40. The second light source 122 can emit light to a position in the opening 11 closer to the coupling cover unit 30 positioned at the end on which the first light source 121 is disposed in the rotating cover unit 40.

In this way, by causing the irradiation directions to be different from each other between the first light source 121 and the second light source 122, an image can be obtained without reflection of the light source 120 in reading the medium P even when the light source 120 is disposed on the rotating cover unit 40. As described above, the light source 120 may be disposed at any position other than the coupling cover unit 30 so long as the image can be obtained without reflection of the light source 120.

In the first embodiment and the modification thereof, the light sources are disposed at two positions. Alternatively, the light sources may be disposed at three or more positions. In this case, the image capturing unit 70 captures the image of the medium P through the opening 11 every time each light source is lit, so that the number of pieces of generated image data is equal to the number of the light sources that are independently lit. The image-processing unit 76 preferably generates the synthesized image data DG by extracting regions in which reflection is not caused from among the respective pieces of image data. In the first embodiment described above, described is a case in which only one of a plurality of light sources 50 is lit each time when the image capturing unit 70 performs image capturing. Alternatively, a plurality of light sources 50 may be lit at the same time so long as the light sources 50 can emit light to different regions of the horizontal plane at the opening 11. In the first embodiment described above, described is a case in which all of a plurality of light sources 50 are lit when the ground sensor 55 is turned ON. However, it is sufficient that at least one light source 50 is lit when the ground sensor 55 is turned ON.

In the image-reading apparatus 1 according to the first embodiment, a battery such as a primary battery or a secondary battery is used as the power supply 56. Alternatively, the power supply 56 may be other than the battery. As the power supply 56, for example, a commercial power supply, a solar power generation system, and a power supply unit mounted on the external device 3 may be used so that electric power is supplied to each device of the housing 2 from an electric power source external to the housing 2.

The image-reading apparatus 80 according to the second embodiment is configured such that the length of the second inclined cover unit 90 can be changed. Alternatively, a component other than the second inclined cover unit 90 may be changed in length. The first inclined cover unit 21 may be configured to be able to be changed in length in the direction across the end on which the opening 11 is positioned and the opposite end. By configuring the inclined cover units 20 so that at least one of the two inclined cover units 20 can be changed in length, portability of the image-reading apparatus 80 can be secured and the image can be read with higher image quality.

[c] Third Embodiment

Figure 31:
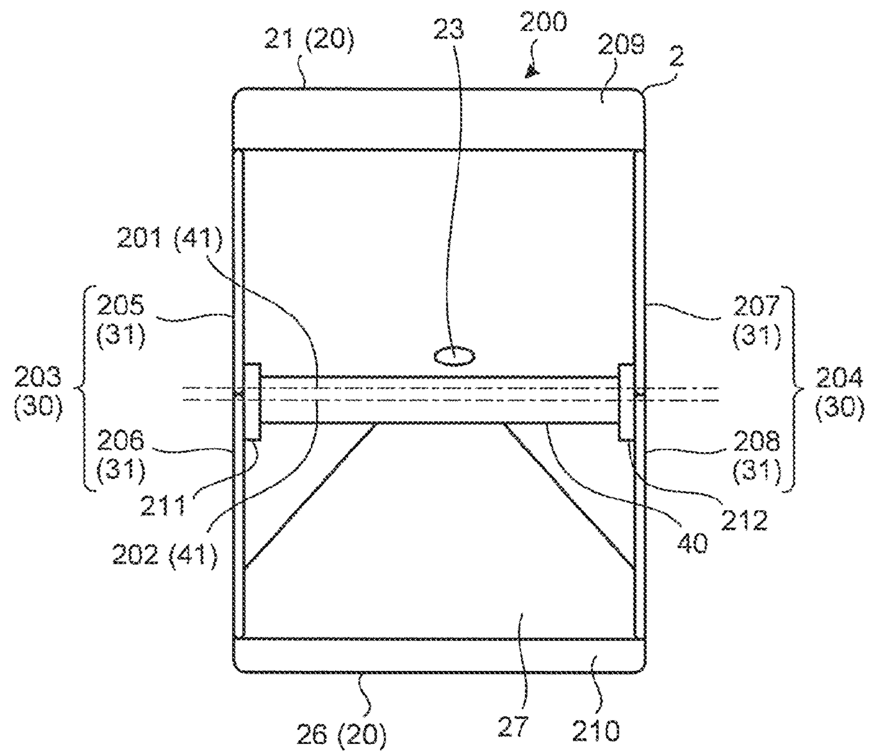
FIG. 31 is a bottom view illustrating an image-reading auxiliary apparatus according to a third embodiment.

The following describes the image-reading auxiliary apparatus according to a third embodiment disclosed herein with reference to the drawings. Hereinafter, the same component is denoted by the same reference numeral, and redundant description will not be provided. FIG. 31 is a bottom view illustrating the image-reading auxiliary apparatus according to the third embodiment. As illustrated in FIG. 31, an image-reading auxiliary apparatus 200 is obtained by eliminating the external device 3 from the image-reading apparatus 1 according to the first embodiment, and includes a first angle holding mechanism 211 and a second angle holding mechanism 212. That is, the image-reading auxiliary apparatus 200 includes the housing 2. The housing 2 includes the two inclined cover units 20, the two coupling cover units 30, and the rotating cover unit 40. The two inclined cover units 20 include the first inclined cover unit 21 and the second inclined cover unit 26. The first inclined cover unit 21 is formed to have a substantially rectangular plate shape, and the image capturing opening 23 is formed thereon. The image capturing opening 23 passes through the first inclined cover unit 21. The second inclined cover unit 26 is formed to have a substantially rectangular plate shape, and the mirror 27 is disposed on the inner face thereof.

Each of the two inclined cover units 20 is arranged so that an edge of one side thereof is parallel with the rotating cover unit 40. The two inclined cover units 20 are coupled to the rotating cover unit 40 so that the two inclined cover units 20 can rotate about the two rotating axes 41 respectively. More specifically, the two rotating axes 41 include a first rotating axis 201 and a second rotating axis 202. The first inclined cover unit 21 is coupled to the rotating cover unit 40 so that the first inclined cover unit 21 can rotate about the first rotating axis 201. The second inclined cover unit 26 is coupled to the rotating cover unit 40 so that the second inclined cover unit 26 can rotate about the second rotating axis 202. The second rotating axis 202 is parallel with the first rotating axis 201. Due to this, in the two inclined cover units 20, an opening-side end 209 of the first inclined cover unit 21 away from the rotating cover unit 40 and an opening-side end 210 of the second inclined cover unit 26 away from the rotating cover unit 40 can get closer to or move away from each other.

Similarly to the first inclined cover unit 21 in the image-reading apparatus 1 according to the first embodiment, the first inclined cover unit 21 further includes the external device holding unit 22 formed thereon, which is not illustrated in FIG. 31. The external device holding unit 22 is disposed on the outer surface of the first inclined cover unit 21. The external device holding unit 22 holds the external device 3 on the outer surface of the first inclined cover unit 21 so that the image capturing unit 70 of the external device 3 can capture the image of the inside of the housing 2 via the image capturing opening 23.

Each of the two coupling cover units 30 includes a plurality of rotating members 31. More specifically, the two coupling cover units 30 include a first coupling cover unit 203 and a second coupling cover unit 204. The first coupling cover unit 203 is formed to have a shape of substantially isosceles triangular plate. The first coupling cover unit 203 is arranged so that two edges thereof corresponding to two sides of the isosceles triangle other than the base are parallel with an edge of one side of the first inclined cover unit 21 and an edge of one side of the second inclined cover unit 26, respectively. The second coupling cover unit 204 is formed to have a shape of substantially isosceles triangular plate. The second coupling cover unit 204 is arranged so that two edges thereof corresponding to two sides of the isosceles triangle other than the base are parallel with an edge of the other side of the first inclined cover unit 21 and an edge of the other side of the second inclined cover unit 26, respectively.

The first coupling cover unit 203 is divided into a first rotating member 205 and a second rotating member 206. The second coupling cover unit 204 is divided into a third rotating member 207 and a fourth rotating member 208. The first angle holding mechanism 211 is disposed in a region in which the first rotating member 205 and the second rotating member 206 of the first coupling cover unit 203 are coupled to each other. The second angle holding mechanism 212 is disposed in a region in which the third rotating member 207 and the fourth rotating member 208 of the second coupling cover unit 204 are coupled to each other.

Figure 32:
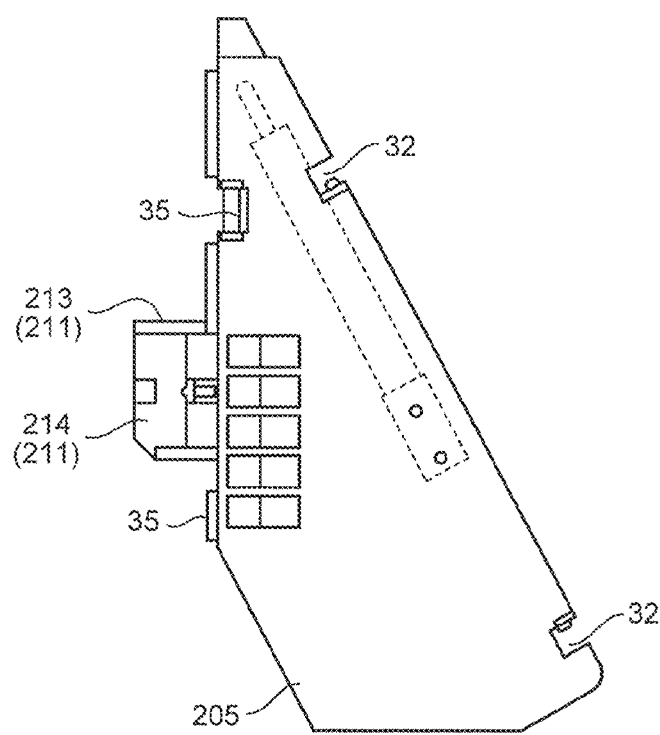
FIG. 32 is a diagram illustrating a first rotating member.

FIG. 32 is a plan view illustrating the first rotating member. As illustrated in FIG. 32, the first rotating member 205 is formed to have a shape of substantially right-angled triangle plate. The first rotating member 205 includes a plurality of rotary coupling units 32 disposed on an edge corresponding to a hypotenuse of the right-angled triangle, and is coupled to the first inclined cover unit 21 via the rotary coupling units 32 so that the first rotating member 205 can rotate about a straight line along the edge. The first rotating member 205 includes a plurality of coupling members 35 disposed on an edge on which the first angle holding mechanism 211 is disposed.

The first angle holding mechanism 211 includes a support member 213 and a magnetic plate 214. The support member 213 is formed as a resin plate. The support member 213 is arranged to be substantially aligned with a plane along the first rotating member 205 and to project from an edge of the first rotating member 205 on which the coupling members 35 are disposed, and is fixed to the first rotating member 205. The magnetic plate 214 is made of a magnetic material such as iron, and formed in a plate shape. The magnetic plate 214 is disposed on a surface of the support member 213 facing the outside of the housing 2, and fixed to the support member 213.

Figure 33:
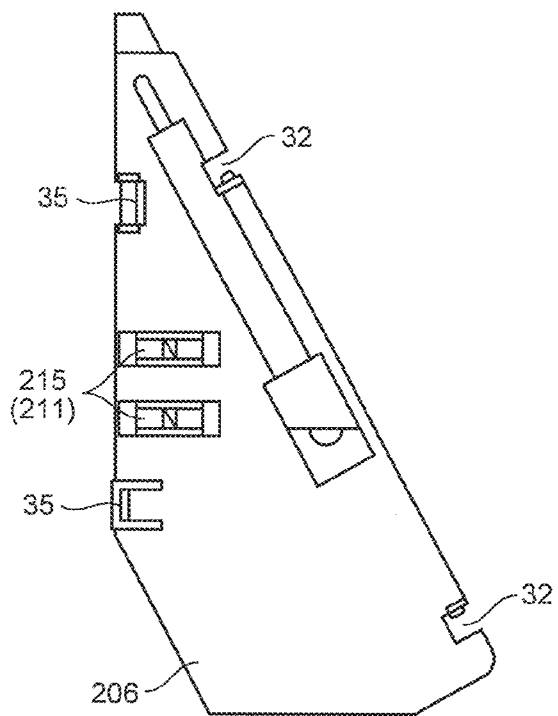
FIG. 33 is a diagram illustrating a second rotating member.

FIG. 33 is a plan view illustrating the second rotating member. As illustrated in FIG. 33, the second rotating member 206 is formed to have a shape of substantially right-angled triangle plate. The second rotating member 206 includes a plurality of rotary coupling units 32 disposed on an edge corresponding to a hypotenuse of the right-angled triangle, and is coupled to the second inclined cover unit 26 via the rotary coupling units 32 so that the second rotating member 206 can rotate about a straight line along the edge. The second rotating member 206 includes a plurality of coupling members 35 disposed on an edge on which the first angle holding mechanism 211 is disposed. The second rotating member 206 is coupled to the first rotating member 205 via the coupling members 35 so that the second rotating member 206 can rotate about a straight line along an edge on which the coupling members 35 are disposed.

The first angle holding mechanism 211 further includes a magnet 215. The magnet 215 is made of a permanent magnet. The magnet 215 is disposed on a surface of the second rotating member 206 facing the inside of the housing 2, and fixed to the second rotating member 206. In this case, the first angle holding mechanism 211 is formed so that, when the magnetic plate 214 is brought into close contact with the magnet 215 due to a magnetic force, the first rotating member 205 and the second rotating member 206 are disposed along the same plane.

The third rotating member 207 and the fourth rotating member 208 of the second coupling cover unit 204 are formed similarly to the first rotating member 205 and the second rotating member 206 of the first coupling cover unit 203. That is, the third rotating member 207 is rotatably coupled to the first inclined cover unit 21. The fourth rotating member 208 is rotatably coupled to the second inclined cover unit 26. The third rotating member 207 and the fourth rotating member 208 are rotatably coupled to each other. Similarly to the first angle holding mechanism 211, the second angle holding mechanism 212 includes a support member, a magnetic plate, and a magnet. The second angle holding mechanism 212 is formed so that, when the magnetic plate is brought into close contact with the magnet, the third rotating member 207 and the fourth rotating member 208 are disposed along the same plane.

The image-reading auxiliary apparatus 200 can be switched between a folded state and an opened state. The first coupling cover unit 203 can be folded such that a coupling portion between the first rotating member 205 and the second rotating member 206 enters inside the housing 2. The second coupling cover unit 204 can be folded such that a coupling portion between the third rotating member 207 and the fourth rotating member 208 enters inside the housing 2. When each of the first coupling cover unit 203 and the second coupling cover unit 204 is folded, the opening-side end 209 of the first inclined cover unit 21 gets closer to the opening-side end 210 of the second inclined cover unit 26, and the image-reading auxiliary apparatus 200 can be folded. The first inclined cover unit 21 and the second inclined cover unit 26 are switched to the folded state when a plane along the first inclined cover unit 21 and a plane along the second inclined cover unit 26 are folded to be parallel with each other.

The first coupling cover unit 203 can be spread so that both of the first rotating member 205 and the second rotating member 206 are parallel with the same plane. The second coupling cover unit 204 can be spread so that both of the third rotating member 207 and the fourth rotating member 208 are parallel with the same plane. When both of the first coupling cover unit 203 and the second coupling cover unit 204 are spread, the first inclined cover unit 21 and the second inclined cover unit 26 are opened so that the opening-side end 209 of the first inclined cover unit 21 is separated away from the opening-side end 210 of the second inclined cover unit 26. When the opening-side end 209 of the first inclined cover unit 21 is separated away from the opening-side end 210 of the second inclined cover unit 26 by a predetermined distance, the first inclined cover unit 21 and the second inclined cover unit 26 are switched to the opened state.

Similarly to the image-reading apparatus 1 according to the first embodiment, the image-reading auxiliary apparatus 200 includes a plurality of light sources 50, the ground sensor 55, the power supply 56, and the housing control unit 60 (not illustrated in FIG. 31).

The image-reading auxiliary apparatus 200 is switched to the folded state before being carried by the user, or before being stored by the user. When being switched to the folded state, the image-reading auxiliary apparatus 200 is made compact as compared with the image-reading auxiliary apparatus 200 switched to the opened state. Due to this, when being switched to the folded state, the image-reading auxiliary apparatus 200 can be easily carried, which improves portability thereof. When the image-reading auxiliary apparatus 200 is switched to the folded state, a space for storing the image-reading auxiliary apparatus 200 can be reduced.

Before the medium is read by using the external device 3, the image-reading auxiliary apparatus 200 is switched to the opened state. When the first coupling cover unit 203 is spread, the magnetic plate 214 of the first angle holding mechanism 211 gets closer to the magnet 215. When a distance between the magnetic plate 214 and the magnet 215 reaches a predetermined distance, the magnetic plate 214 of the first angle holding mechanism 211 is brought into close contact with the magnet 215 due to the magnetic force of the magnet 215. The first angle holding mechanism 211 fixes the first rotating member 205 and the second rotating member 206 so that the first rotating member 205 and the second rotating member 206 are disposed on the same plane due to close contact between the magnetic plate 214 and the magnet 215. The first angle holding mechanism 211 holds the first rotating member 205 and the second rotating member 206 to be fixed on the same plane so that the opening-side end 209 of the first inclined cover unit 21 is separated away from the opening-side end 210 of the second inclined cover unit 26 by a predetermined distance.

Similarly to the first angle holding mechanism 211, the second angle holding mechanism 212 fixes the third rotating member 207 and the fourth rotating member 208 so that the third rotating member 207 and the fourth rotating member 208 are disposed on the same plane when the second coupling cover unit 204 is spread. The second angle holding mechanism 212 holds the third rotating member 207 and the fourth rotating member 208 to be fixed on the same plane so that the opening-side end 209 of the first inclined cover unit 21 is separated away from the opening-side end 210 of the second inclined cover unit 26 by a predetermined distance. In the image-reading auxiliary apparatus 200, the two coupling cover units 30 and the two inclined cover units 20 are held as described above by the first angle holding mechanism 211 and the second angle holding mechanism 212, so that the opening 11 (refer to FIGS. 5 and 6) of the housing 2 is formed to have a predetermined shape.

In the image-reading auxiliary apparatus 200, the external device 3 is appropriately held by the external device holding unit 22 so that the image capturing unit 70 of the external device 3 can capture the image of the inside of the housing 2 via the image capturing opening 23. When the image-reading auxiliary apparatus 200 is switched to the opened state and the external device 3 is appropriately held by the external device holding unit 22, the external device 3 operates in accordance with the processing procedure illustrated in FIG. 12. When the external device 3 operates, the image-reading auxiliary apparatus 200 operates in accordance with the processing procedure illustrated in FIG. 13. Through such an operation, the external device 3 captures the image of the medium P disposed at the opening 11 of the image-reading auxiliary apparatus 200. In this case, the opening 11 of the housing 2 is formed in a predetermined shape, so that the image-reading auxiliary apparatus 200 can appropriately secure a photographing range photographed by the image capturing unit 70 on the medium P disposed at the opening 11.

Image-Reading Auxiliary Apparatus According to Comparative Example

Figure 34:
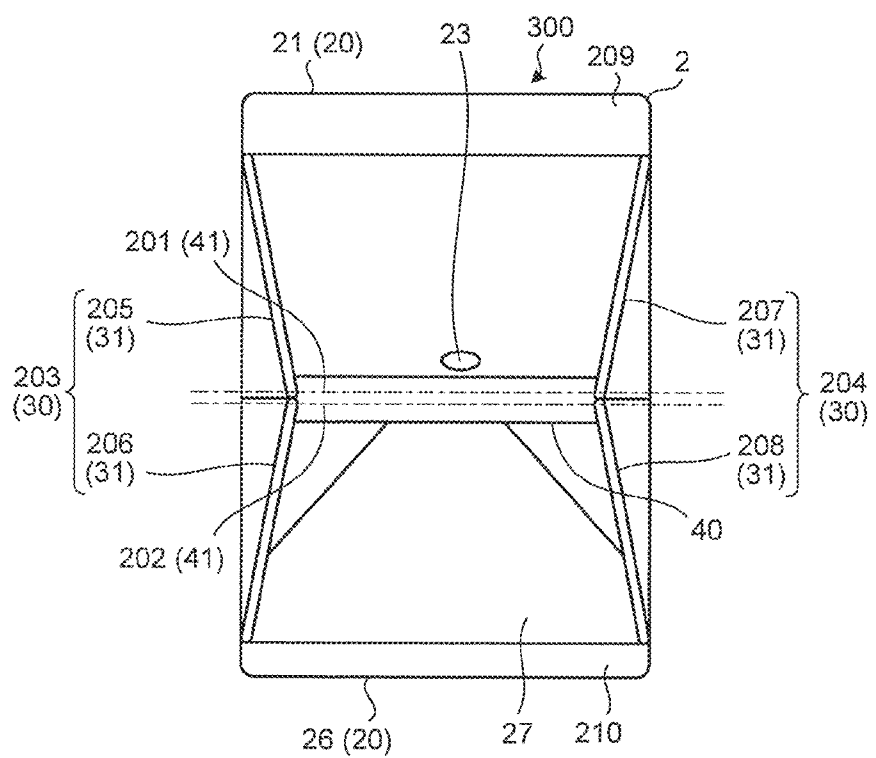
FIG. 34 is a bottom view illustrating an image-reading auxiliary apparatus according to a comparative example.

FIG. 34 is a bottom view illustrating the image-reading auxiliary apparatus according to a comparative example. As illustrated in FIG. 34, an image-reading auxiliary apparatus 300 according to the comparative example is obtained by eliminating the first angle holding mechanism 211 and the second angle holding mechanism 212 from the image-reading auxiliary apparatus 200. The image-reading auxiliary apparatus 300 does not include the first angle holding mechanism 211, so that the first rotating member 205 and the second rotating member 206 are not disposed on the same plane in some cases when the image-reading auxiliary apparatus 300 is switched to the opened state. In the image-reading auxiliary apparatus 300, when the first rotating member 205 and the second rotating member 206 are not disposed on the same plane, part of the first coupling cover unit 203 (especially, the coupling portion between the first rotating member 205 and the second rotating member 206) enters inside the housing 2. The image-reading auxiliary apparatus 300 does not include the second angle holding mechanism 212, so that the third rotating member 207 and the fourth rotating member 208 are not disposed on the same plane in some cases when the image-reading auxiliary apparatus 300 is switched to the opened state. In the image-reading auxiliary apparatus 300, when the third rotating member 207 and the fourth rotating member 208 are not disposed on the same plane, part of the second coupling cover unit 204 (especially, the coupling portion between the third rotating member 207 and the fourth rotating member 208) enters inside the housing 2. In the image-reading auxiliary apparatus 300, when part of the first coupling cover unit 203 and part of the second coupling cover unit 204 enter inside the housing 2, a distance between the opening-side end 209 and the opening-side end 210 may be equal to or smaller than a predetermined distance.

In the image-reading auxiliary apparatus 300, when part of the two coupling cover units 30 enters inside the housing 2 and the distance between the opening-side end 209 and the opening-side end 210 is equal to or smaller than a predetermined distance, the opening 11 is not appropriately formed in a predetermined shape in some cases. When the opening 11 is not formed in a predetermined shape, the image-reading auxiliary apparatus 300 cannot appropriately secure the photographing range photographed by the image capturing unit 70 on the medium P disposed at the opening 11 in some cases.

That is, the image-reading auxiliary apparatus 200 according to the present disclosure can more appropriately secure the photographing range photographed by the image capturing unit 70 on the medium P disposed at the opening 11 as compared with the image-reading auxiliary apparatus 300 according to the comparative example. As a result, the image-reading auxiliary apparatus 200 can cause the external device 3 to appropriately photograph the medium P disposed at the opening 11.

Advantageous Effects of Image-Reading Auxiliary Apparatus

As described above, the image-reading auxiliary apparatus 200 includes the housing 2 that shields environment light and has the opening 11, the external device holding unit 22 that holds the image capturing unit 70 for capturing the image of the medium P disposed at the opening 11, and a plurality of light sources 50 that are disposed inside the housing 2 and illuminate the medium P. The housing 2 includes at least four cover units corresponding to the sides of the opening 11. The four cover units include the two inclined cover units 20 that are inclined from the side on which the opening 11 is positioned toward the opposite end in a direction in which the two inclined cover units 20 get closer to each other and the two coupling cover units 30 that couple the two inclined cover units 20 to each other. The two inclined cover units 20 include the first inclined cover unit 21 and the second inclined cover unit 26. The two inclined cover units 20 can be switched between the opened state and the folded state when the first inclined cover unit 21 moves relatively to the second inclined cover unit 26 based on the end opposite to the side on which the opening 11 is positioned. In the opened state, the opening-side end 209 and the opening-side end 210 on the opening 11 side of the two inclined cover units 20 are separated away from each other. In the folded state, the two inclined cover units 20 are adjacent to each other in parallel. The two coupling cover units 30 are coupled to the two inclined cover units 20 in a deformable manner, and are deformed with respect to the two inclined cover units 20 when the two inclined cover units 20 are in the folded state. The image-reading auxiliary apparatus 200 further includes the first angle holding mechanism 211 that holds the two inclined cover units 20 so that the opening-side end 209 and the opening-side end 210 on the opening 11 side of the two inclined cover units 20 are separated away from each other when the two inclined cover units 20 are in the opened state.

Accordingly, in the image-reading auxiliary apparatus 200, the opening 11 can be appropriately formed by holding the two inclined cover units 20 so that the opening-side end 209 and the opening-side end 210 of the two inclined cover units 20 are appropriately separated away from each other in the opened state. By appropriately forming the opening 11, the image-reading auxiliary apparatus 200 can appropriately secure the image capturing range so that the image capturing range captured by the image capturing unit 70 is not smaller than a predetermined region.

The two coupling cover units 30 include the first coupling cover unit 203 and second coupling cover unit 204. The first coupling cover unit 203 includes a plurality of rotating members 31 (the first rotating member 205 and the second rotating member 206) that are rotatably coupled to each other. When the two inclined cover units 20 are in the folded state, the first coupling cover unit 203 enters the space between the two inclined cover units 20 by being deformed with respect to the two inclined cover units. The rotating members 31 move relatively to each other, the rotating members 31 are rotated relatively to each other to be parallel with the two inclined cover units 20. In this case, the first angle holding mechanism 211 fixes the rotating members 31 to each other when the two inclined cover units 20 are in the opened state. That is, by fixing the first rotating member 205 and the second rotating member 206 to each other, the first angle holding mechanism 211 holds the two inclined cover units 20 so that the opening-side end 209 and the opening-side end 210 are appropriately separated away from each other. When the first angle holding mechanism 211 fixes the first rotating member 205 and the second rotating member 206 to each other, the image-reading auxiliary apparatus 200 can further prevent the first rotating member 205 and the second rotating member 206 from entering inside the opening 11 in the opened state. As a result, the opening 11 is not narrowed in the opened state in the image-reading auxiliary apparatus 200, and the photographing range photographed by the image capturing unit 70 can be appropriately secured.

The first angle holding mechanism 211 includes the magnet 215 for applying a magnetic force to the rotating members 31 so that the rotating members 31 (the first rotating member 205 and the second rotating member 206) are fixed to each other when the two inclined cover units 20 are in the opened state. By using the magnetic force to fix the first rotating member 205 and the second rotating member 206 to each other, the first angle holding mechanism 211 can easily switch a fixed state and a released state of the first rotating member 205 and the second rotating member 206. Due to this, the image-reading auxiliary apparatus 200 can also easily switch the folded state and the opened state.

The other one of the two coupling cover units 30, that is, the second coupling cover unit 204 also includes the other rotating members 31 (the third rotating member 207 and the fourth rotating member 208) that are rotatably coupled to each other. The second coupling cover unit 204 enters the space between the two inclined cover units 20 by being deformed with respect to the two inclined cover units 20 when the two inclined cover units 20 are in the folded state. The rotating members 31 are rotated relatively to each other to be parallel with the two inclined cover units 20. The image-reading auxiliary apparatus 200 further includes the second angle holding mechanism 212 that holds the two inclined cover units 20 so that the opening-side end 209 and the opening-side end 210 on the opening 11 side of the two inclined cover units 20 are separated away from each other when the two inclined cover units 20 are in the opened state. The second angle holding mechanism 212 fixes the third rotating member 207 and the fourth rotating member 208 to each other when the two inclined cover units 20 are in the opened state to hold the two inclined cover units 20 so that the opening-side end 209 and the opening-side end 210 are separated away from each other.

The image-reading auxiliary apparatus 200 includes both of the first angle holding mechanism 211 and the second angle holding mechanism 212. Alternatively, any one of the first angle holding mechanism 211 and the second angle holding mechanism 212 may be eliminated. Even when the image-reading auxiliary apparatus 200 includes only one of the first angle holding mechanism 211 and the second angle holding mechanism 212, the first coupling cover unit 203 or the second coupling cover unit 204 can be disposed on the same plane. By disposing the first coupling cover unit 203 or the second coupling cover unit 204 on the same plane, the image-reading auxiliary apparatus 200 can hold the two inclined cover units 20 so that the opening-side end 209 and the opening-side end 210 are separated away from each other.

In the image-reading auxiliary apparatus 200, the first coupling cover unit 203 or the second coupling cover unit 204 are disposed inside the housing 2 in the folded state. Alternatively, the first coupling cover unit 203 or the second coupling cover unit 204 may be disposed outside the housing 2. Even in a case in which the image-reading auxiliary apparatus 200 is folded so that the first coupling cover unit 203 and the second coupling cover unit 204 are disposed outside in the folded state, portability and the photographing range can be secured.

The first angle holding mechanism 211 and the second angle holding mechanism 212 spread the first coupling cover unit 203 and the second coupling cover unit 204 to be parallel with the same plane using the magnetic force. Alternatively, a force other than the magnetic force may be used. Even when the first coupling cover unit 203 and the second coupling cover unit 204 are spread using a force other than the magnetic force, the image-reading auxiliary apparatus 200 can secure the photographing range.

The first angle holding mechanism 211 and the second angle holding mechanism 212 are disposed on a device obtained by eliminating the external device 3 from the image-reading apparatus 1 according to the first embodiment. Alternatively, the first angle holding mechanism 211 and the second angle holding mechanism 212 may be disposed on a device obtained by eliminating the external device 3 from the other image-reading apparatus described above. Examples of such an image-reading apparatus include the image-reading apparatus 80 according to the second embodiment, the image-reading apparatus according to the modification illustrated in FIGS. 23 and 24, and the image-reading apparatus according to the modification illustrated in FIG. 25. The first angle holding mechanism 211 and the second angle holding mechanism 212 may also be disposed on an image-reading auxiliary apparatus obtained by eliminating the external device 3 from the image-reading apparatus according to the modification illustrated in FIGS. 27 and 28 or from the image-reading apparatus according to the modification illustrated in FIGS. 29 and 30. The first angle holding mechanism 211 and the second angle holding mechanism 212 are disposed on the image-reading auxiliary apparatus obtained by eliminating the external device 3 from the image-reading apparatus. Alternatively, the first angle holding mechanism 211 and the second angle holding mechanism 212 may be disposed on the image-reading apparatus including the external device 3. Similarly to the image-reading auxiliary apparatus 200, the image-reading apparatus or the image-reading auxiliary apparatus on which the first angle holding mechanism 211 and the second angle holding mechanism 212 are disposed can also secure the portability, and secure the photographing range of the image capturing unit 70 of the external device 3.

[d] Fourth Embodiment

Figure 35:
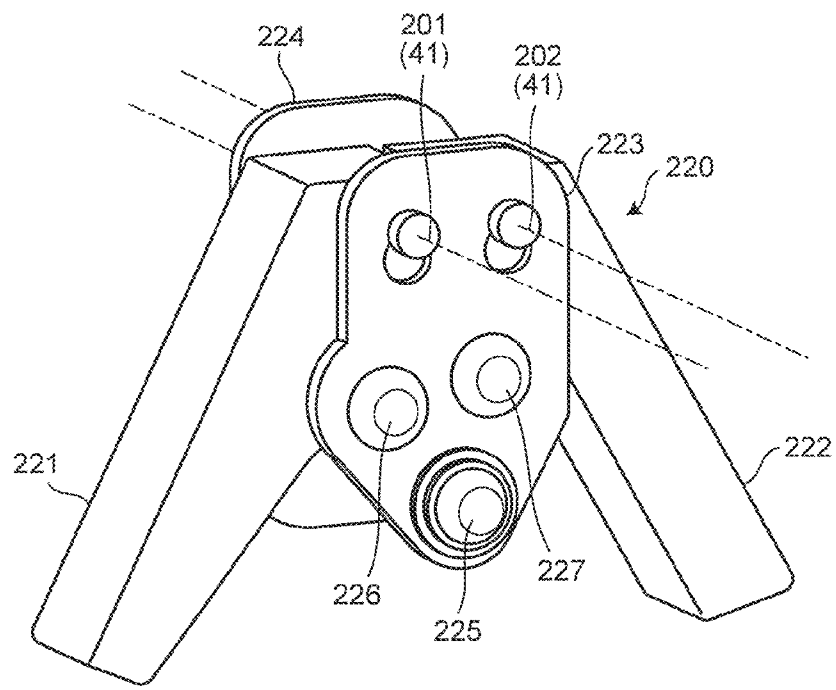
FIG. 35 is a perspective view illustrating an angle holding mechanism of an image-reading auxiliary apparatus according to a fourth embodiment.

The first angle holding mechanism 211 and the second angle holding mechanism 212 may be replaced with other angle holding mechanisms that hold the first inclined cover unit 21 and the second inclined cover unit 26 so that the opening-side end 209 and the opening-side end 210 are separated away from each other. FIG. 35 is a perspective view illustrating the angle holding mechanism of the image-reading auxiliary apparatus according to a fourth embodiment. As illustrated in FIG. 35, an angle holding mechanism 220 includes a first hinge arm 221, a second hinge arm 222, a first hinge plate 223, a second hinge plate 224, and a fixing member 225. The first hinge arm 221 is supported to be rotatable about the first rotating axis 201, and is fixed to the first inclined cover unit 21 (not illustrated). The second hinge arm 222 is supported to be rotatable about the second rotating axis 202, and is fixed to the second inclined cover unit 26 (not illustrated).

The first hinge plate 223 is formed in a plate shape. The first hinge plate 223 is arranged to be orthogonal to the first rotating axis 201 and the second rotating axis 202, and is fixed to the rotating cover unit 40. The second hinge plate 224 is formed in a plate shape. The second hinge plate 224 is arranged to be orthogonal to the two rotating axes 41 so that part of the first hinge arm 221 and part of the second hinge arm 222 are sandwiched between the first hinge plate 223 and the second hinge plate 224. The second hinge plate 224 is fixed to the rotating cover unit 40. The fixing member 225 fixes the first hinge plate 223 to the second hinge plate 224.

The first hinge plate 223 also has a first positioning hole 226 and a second positioning hole 227. The first positioning hole 226 is formed at a position away from the first rotating axis 201 by a predetermined distance such that part of a surface of the first hinge plate 223 facing the second hinge plate 224 is dented. The second positioning hole 227 is formed at a position different from that of the first positioning hole 226, the position being away from the first rotating axis 201 by a predetermined distance, such that part of the surface of the first hinge plate 223 facing the second hinge plate 224 is dented.

Figure 36:
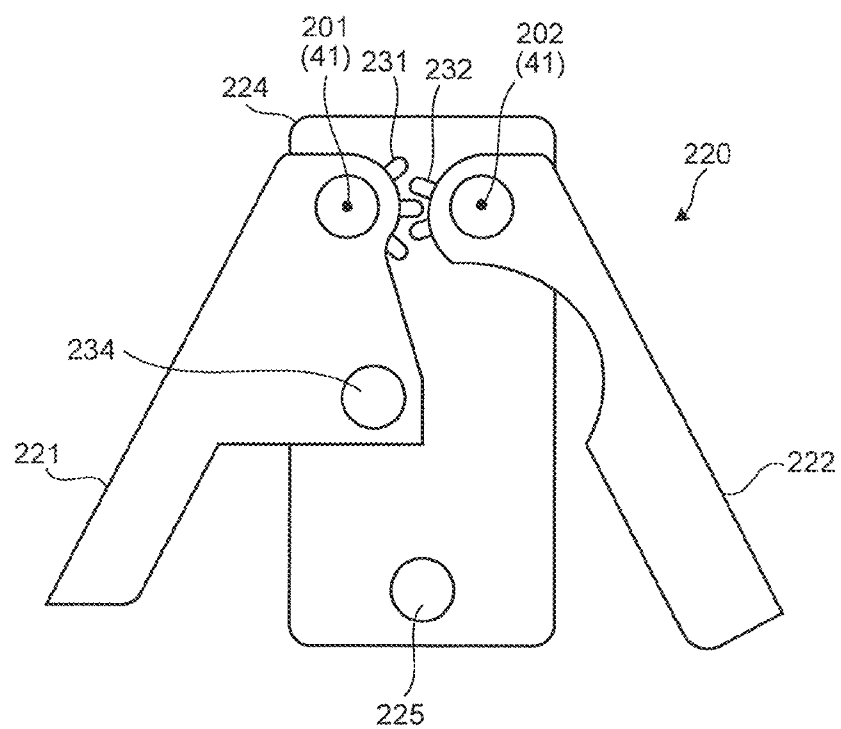
FIG. 36 is a cross-sectional view illustrating the angle holding mechanism in FIG. 35.
Figure 37:
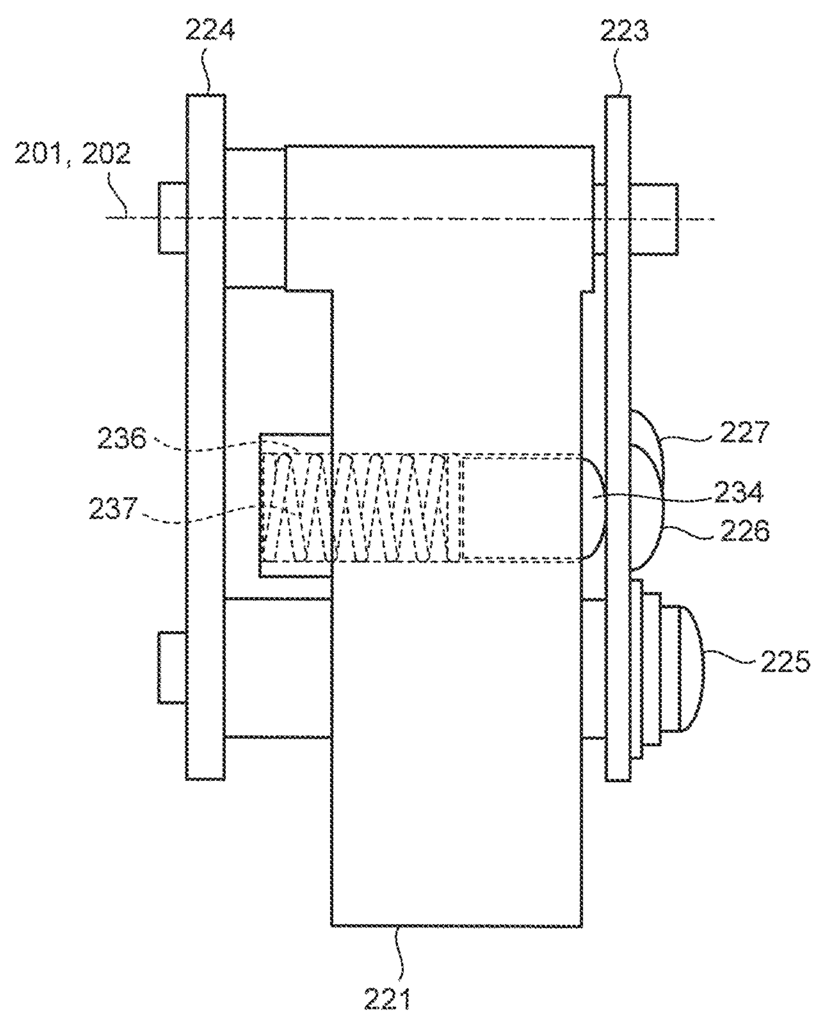
FIG. 37 is a side view illustrating the angle holding mechanism in FIG. 35.

FIG. 36 is a cross-sectional view illustrating the angle holding mechanism 220 in FIG. 35. FIG. 37 is a side view illustrating the angle holding mechanism in FIG. 35. As illustrated in FIG. 36, the first hinge arm 221 includes a gear wheel 231 formed thereon. The second hinge arm 222 includes a gear wheel 232 formed thereon. The gear wheel 232 is arranged to mesh with the gear wheel 231. The gear wheel 231 and the gear wheel 232 are formed so that, when the first hinge arm 221 rotates about the first rotating axis 201, the second hinge arm 222 rotates about the second rotating axis 202 in a direction opposite to the rotational direction of the first hinge arm 221.

The angle holding mechanism 220 further includes a positioning pin 234. As illustrated in FIG. 37, the positioning pin 234 is formed in a stick shape. The first hinge arm 221 has a positioning pin hole 236 for a positioning pin formed on a surface facing the first hinge plate 223. The positioning pin hole 236 is formed along a line that is parallel with the first rotating axis 201 and away from the first rotating axis 201 by a predetermined distance.

The positioning pin 234 is disposed inside the positioning pin hole 236 to be supported by the first hinge arm 221 so that the positioning pin 234 can move in parallel with the first rotating axis 201. The angle holding mechanism 220 further includes a pressurizing spring 237. The pressurizing spring 237 is made of an elastic body. The pressurizing spring 237 is disposed inside the positioning pin hole 236 to be sandwiched between the bottom of the positioning pin hole 236 and the positioning pin 234. The pressurizing spring 237 is sandwiched between the bottom of the positioning pin hole 236 and the positioning pin 234 to apply an elastic force to the positioning pin 234 so that the positioning pin 234 moves toward the first hinge plate 223.

The angle holding mechanism 220 holds the first hinge arm 221 not to be rotated by a force smaller than a predetermined force when the elastic force of the pressurizing spring 237 is applied to the positioning pin 234 in a state in which the positioning pin 234 is fitted in the first positioning hole 226 or the second positioning hole 227. In the angle holding mechanism 220, the gear wheel 231 meshes with the gear wheel 232 when the first hinge arm 221 is held, so that the second hinge arm 222 is held not to be rotated. In the angle holding mechanism 220, when the positioning pin 234 is fitted in the first positioning hole 226 and the first hinge arm 221 is rotated by a force larger than a predetermined force, the positioning pin 234 slips out of the first positioning hole 226. In the angle holding mechanism 220, even when the positioning pin 234 is fitted in the second positioning hole 227, the positioning pin 234 slips out of the second positioning hole 227 if the first hinge arm 221 is rotated by a force larger than a predetermined force.

When slipping out of the first positioning hole 226 or the second positioning hole 227, the positioning pin 234 can slides on the first hinge plate 223. Due to this, when the positioning pin 234 of the first hinge arm 221 slips out of the first positioning hole 226 or the second positioning hole 227, the held first hinge arm 221 and the held second hinge arm 222 are released to be rotatable.

The angle holding mechanism 220 is formed such that the positioning pin 234 is fitted in the first positioning hole 226 of the first hinge plate 223 when the image-reading auxiliary apparatus according to the fourth embodiment is switched to the opened state. That is, the angle holding mechanism 220 is formed so that the positioning pin 234 is fitted in the first positioning hole 226 when the opening-side end 209 of the first inclined cover unit 21 and the opening-side end 210 of the second inclined cover unit 26 are separated away from each other by a predetermined distance.

Figure 38:
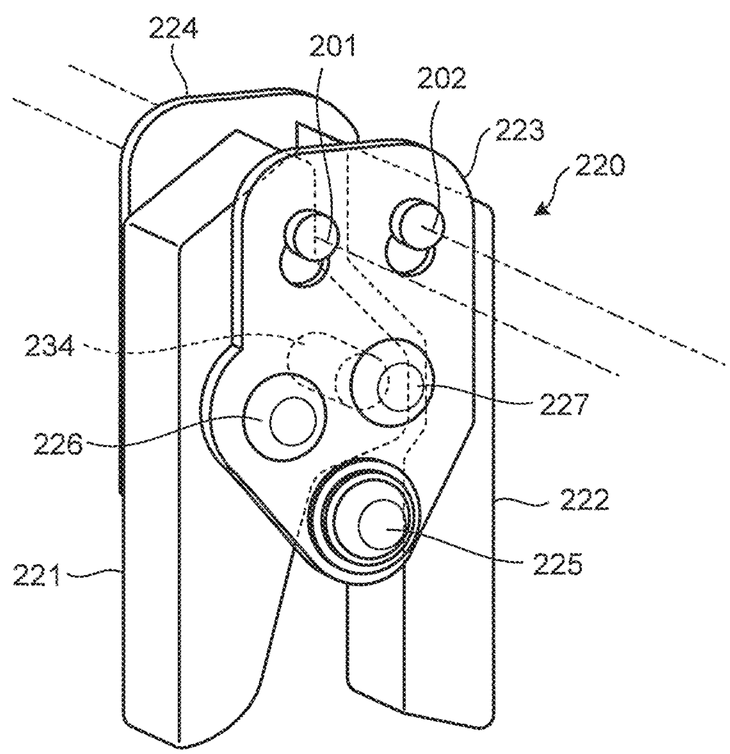
FIG. 38 is a perspective view illustrating the angle holding mechanism in FIG. 35 being switched to a folded state.

FIG. 38 is a perspective view illustrating the angle holding mechanism in FIG. 35 being switched to the folded state. As illustrated in FIG. 38, the angle holding mechanism 220 is formed so that the positioning pin 234 is fitted in the second positioning hole 227 of the first hinge plate 223 when the image-reading auxiliary apparatus is switched to the folded state.

Due to this, the first hinge arm 221 and the second hinge arm 222 of the angle holding mechanism 220 are held when the image-reading auxiliary apparatus is switched to the folded state, so that the first inclined cover unit 21 and the second inclined cover unit 26 are held not to be rotated. Additionally, the first hinge arm 221 and the second hinge arm 222 of the angle holding mechanism 220 are held when the image-reading auxiliary apparatus is switched to the opened state, the first inclined cover unit 21 and the second inclined cover unit 26 are held not to be rotated.

When the image-reading auxiliary apparatus is switched to the opened state, the opening-side end 209 of the first inclined cover unit 21 and the opening-side end 210 of the second inclined cover unit 26 are held by the angle holding mechanism 220 to be separated away from each other by a predetermined distance. In the image-reading auxiliary apparatus, when the opening-side end 209 of the first inclined cover unit 21 and the opening-side end 210 of the second inclined cover unit 26 are separated away from each other by a predetermined distance, the first rotating member 205 and the second rotating member 206 of the first coupling cover unit 203 are spread along the same plane. In the image-reading auxiliary apparatus, when the opening-side end 209 and the opening-side end 210 are separated away from each other by a predetermined distance, the third rotating member 207 and the fourth rotating member 208 of the second coupling cover unit 204 are also spread along the same plane. When the first coupling cover unit 203 and the second coupling cover unit 204 are spread along the same plane, the image-reading auxiliary apparatus can prevent the first coupling cover unit 203 and the second coupling cover unit 204 from entering inside the opening 11. As a result, such an image-reading auxiliary apparatus can appropriately secure the photographing range photographed by the image capturing unit 70 without narrowing the opening 11 in the opened state.

The angle holding mechanism 220 is disposed on the image-reading auxiliary apparatus obtained by eliminating the external device 3 from the image-reading apparatus 1 according to the first embodiment. Alternatively, the angle holding mechanism 220 may be disposed on an image-reading auxiliary apparatus obtained by eliminating the external device 3 from the other image-reading apparatus described above. As such an image-reading apparatus, exemplified are the image-reading apparatus 80 according to the second embodiment, the image-reading apparatus according to the modification illustrated in FIG. 25, the image-reading apparatus according to the modification illustrated in FIGS. 27 and 28, and the image-reading apparatus according to the modification illustrated in FIGS. 29 and 30. Similarly to the image-reading auxiliary apparatus according to the fourth embodiment described above, the image-reading apparatus or the image-reading auxiliary apparatus on which the angle holding mechanism 220 is disposed can secure the portability, and can secure the photographing range of the image capturing unit 70 of the external device 3. Specifically, in the image-reading apparatus according to the modification illustrated in FIG. 26, the coupling cover unit 100 is made of a soft member, and the first angle holding mechanism 211 and the second angle holding mechanism 212 cannot be disposed. However, the angle holding mechanism 220 can be disposed thereon. Even when the image-reading apparatus includes the coupling cover unit 100 formed of a soft member, the angle holding mechanism 220 can spread the coupling cover unit 100 in the opened state, secure the portability, and secure the photographing range of the image capturing unit 70 of the external device 3. The angle holding mechanism 220 may also be added to the image-reading auxiliary apparatus 200 according to the third embodiment.

It is difficult for the angle holding mechanism 220 to increase the force for spreading the first coupling cover unit 203 and the second coupling cover unit 204 on the same plane as compared with the first angle holding mechanism 211 and the second angle holding mechanism 212 described above. Thus, the first angle holding mechanism 211 and the second angle holding mechanism 212 can secure the photographing range more appropriately than the angle holding mechanism 220.

[e] Fifth Embodiment

Figure 39:
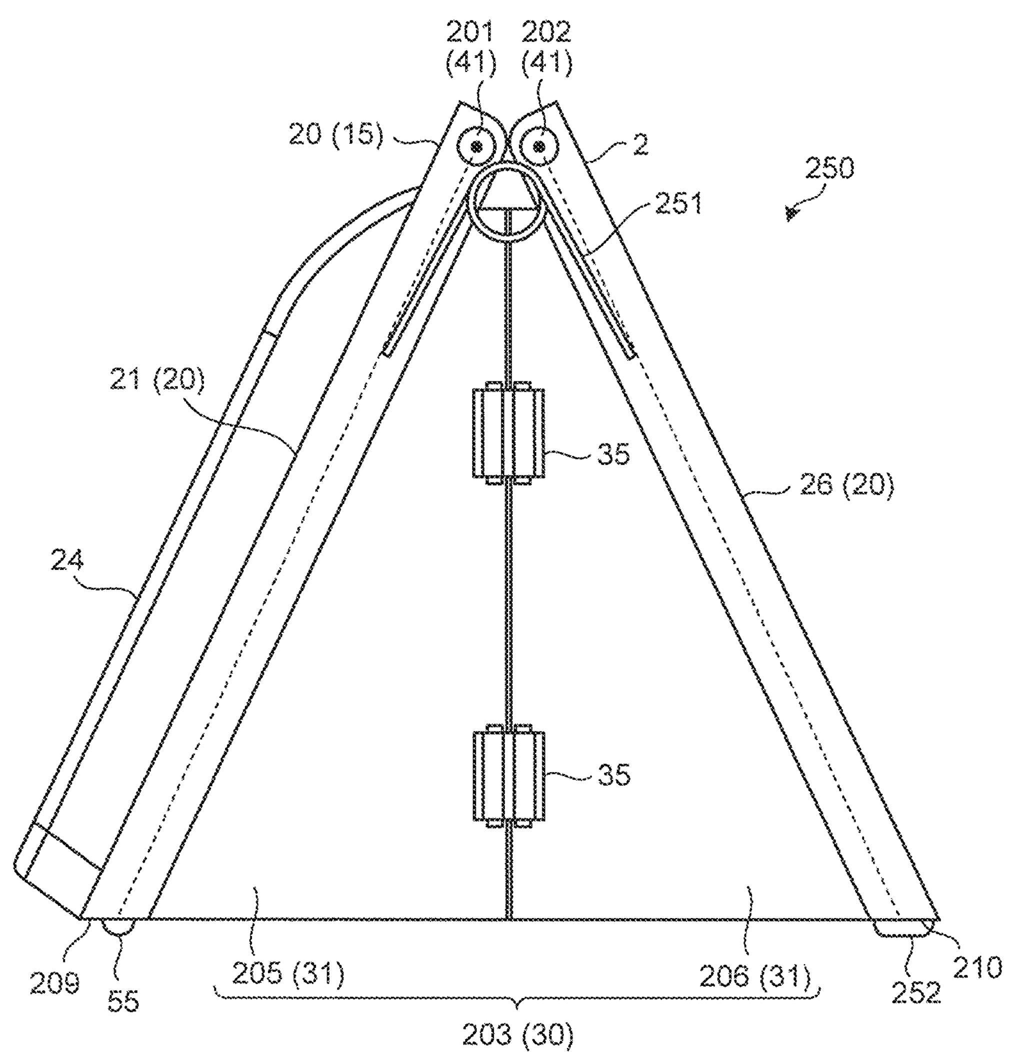
FIG. 39 is a side view illustrating an image-reading auxiliary apparatus according to a fifth embodiment.

FIG. 39 is a side view illustrating the image-reading auxiliary apparatus according to a fifth embodiment. As illustrated in FIG. 39, an image-reading auxiliary apparatus 250 is an apparatus that is obtained by eliminating the first angle holding mechanism 211 and the second angle holding mechanism 212 from the image-reading auxiliary apparatus 200 according to the third embodiment, and includes another angle holding mechanism 251 and a lock mechanism 252 added thereto. The angle holding mechanism 251 is formed of a torsion coil spring made of an elastic body, and disposed in the vicinity of the two rotating axes 41 inside the housing 2. The angle holding mechanism 251 applies an elastic force to the first inclined cover unit 21 and the second inclined cover unit 26 so that the opening-side end 209 of the first inclined cover unit 21 and the opening-side end 210 of the second inclined cover unit 26 are separated away from each other.

Figure 40:
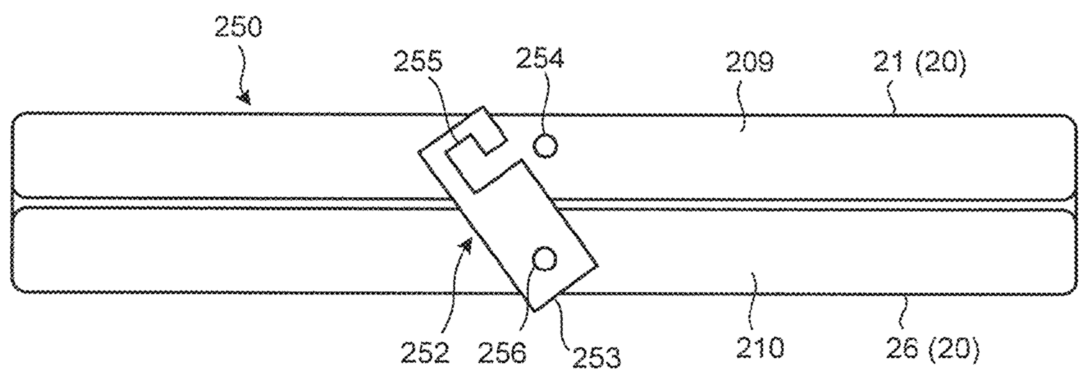
FIG. 40 is a bottom view illustrating a lock mechanism.

FIG. 40 is a bottom view illustrating the lock mechanism 252. As illustrated in FIG. 40, the lock mechanism 252 includes a lock plate 253 and a lock pin 254. The lock plate 253 is formed in a substantially rectangular plate shape, and has a notch 255 formed thereon. The lock plate 253 is supported by the second inclined cover unit 26 to be rotatable about a rotating axis 256. The rotating axis 256 is perpendicular to the second rotating axis 202. The lock pin 254 is formed to project from the opening-side end 209 of the first inclined cover unit 21 toward a side away from the two rotating axes 41. The lock mechanism 252 is formed so that, when the image-reading auxiliary apparatus 250 is switched to the folded state, the lock plate 253 rotates about the rotating axis 256 to cause the lock pin 254 to be caught by the notch 255 of the lock plate 253. When the lock pin 254 is caught by the notch 255 of the lock plate 253, the first inclined cover unit 21 and the second inclined cover unit 26 are held by the lock mechanism 252 so that the opening-side end 209 and the opening-side end 210 are not separated away from each other.

In this case, when the lock pin 254 is caught by the notch 255 of the lock plate 253 in a state in which the opening-side end 209 and the opening-side end 210 are close to each other, the image-reading auxiliary apparatus 250 is switched to the folded state. When being switched to the folded state, the image-reading auxiliary apparatus 250 can be made compact, the portability thereof can be improved, and a space for storing the image-reading auxiliary apparatus 250 can be reduced.

In the image-reading auxiliary apparatus 250, when the lock pin 254 is released from the notch 255 of the lock plate 253, the first inclined cover unit 21 and the second inclined cover unit 26 are opened so that the opening-side end 209 and the opening-side end 210 are separated away from each other due to the elastic force of the angle holding mechanism 251. When the first inclined cover unit 21 and the second inclined cover unit 26 are opened due to the elastic force of the angle holding mechanism 251, the image-reading auxiliary apparatus 250 is switched to the opened state.

When the image-reading auxiliary apparatus 250 is switched to the opened state, the elastic force of the angle holding mechanism 251 is applied to the first inclined cover unit 21 and the second inclined cover unit 26 so that the opening-side end 209 and the opening-side end 210 are separated away from each other. Due to this, the first rotating member 205 and the second rotating member 206 of the first coupling cover unit 203 are spread along the same plane due to the elastic force of the angle holding mechanism 251 when the image-reading auxiliary apparatus 250 is switched to the opened state. The third rotating member 207 and the fourth rotating member 208 of the second coupling cover unit 204 are also spread along the same plane due to the elastic force of the angle holding mechanism 251 when the image-reading auxiliary apparatus 250 is switched to the opened state.

When the first coupling cover unit 203 and the second coupling cover unit 204 are spread along the same plane, the image-reading auxiliary apparatus 250 can prevent the first coupling cover unit 203 and the second coupling cover unit 204 from entering inside the opening 11. As a result, in the image-reading auxiliary apparatus 250, the opening 11 is not narrowed in the opened state, and the photographing range photographed by the image capturing unit 70 can be appropriately secured.

The angle holding mechanism 251 is disposed on the image-reading auxiliary apparatus obtained by eliminating the external device 3 from the image-reading apparatus 1 according to the first embodiment. Alternatively, the angle holding mechanism 251 may be disposed on an image-reading auxiliary apparatus obtained by eliminating the external device 3 from any of all the image-reading apparatuses described above. Also in this case, the angle holding mechanism 251 can open the two inclined cover units 20 so that the opening-side end 209 and the opening-side end 210 are separated away from each other when the image-reading apparatus is in the opened state, and can spread both of the two coupling cover units 30 along the same plane. Due to this, such an image-reading auxiliary apparatus can also secure the photographing range of the image capturing unit 70 of the external device 3. Additionally, the angle holding mechanism 251 may be added to the image-reading auxiliary apparatus 200 according to the third embodiment, or may be added to the image-reading auxiliary apparatus according to the fourth embodiment.

According to an aspect of the disclosure, the image-reading apparatus and the image-reading auxiliary apparatus exhibit an effect of securing portability and a photographing range.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An image-reading apparatus comprising:

a housing that shields environmental light and has an opening on a bottom face;

an image capturing unit that captures an image of a medium exposed to inside of the housing at the opening; and a plurality of light sources that are disposed inside the housing and emit light toward the opening to be emitted onto different regions of a horizontal plane at the opening, wherein the opening is formed in a rectangular shape, the housing includes at least four cover units corresponding to sides of the opening, the four cover units include two inclined cover units that are inclined from a side on which the opening is positioned toward an opposite end in a direction in which the two inclined cover units get closer to each other and two coupling cover units that couple the two inclined cover units to each other, the two inclined cover units include a first inclined cover unit and a second inclined cover unit, the two inclined cover units are switchable between an opened state in which the first inclined cover unit moves relatively to the second inclined cover unit based on an end opposite to a side on which the opening is positioned and ends of the two inclined cover units on the opening side are separated away from each other, and a folded state in which the two inclined cover units are adjacent to each other in parallel, the two coupling cover units are coupled to the two inclined cover units in a deformable manner, and deformed with respect to the two inclined cover units to enter a space between the two inclined cover units when the two inclined cover units are in the folded state, and the image-reading apparatus further comprises an angle holding mechanism that holds the two inclined cover units so that the ends of the two inclined cover units on the opening side are separated away from each other when the two inclined cover units are in the opened state.

2. The image-reading apparatus according to claim 1, wherein the two coupling cover units include a first coupling cover unit and a second coupling cover unit, the first coupling cover unit includes a plurality of rotating members rotatably coupled to each other, and the first coupling cover unit enters the space between the two inclined cover units by being deformed with respect to the two inclined cover units when the two inclined cover units are in the folded state, the rotating members are rotated relatively to each other to be parallel with the two inclined cover units, and the angle holding mechanism fixes the rotating members to each other when the two inclined cover units are in the opened state.

3. The image-reading apparatus according to claim 2, wherein the angle holding mechanism includes a magnet that applies a magnetic force to the rotating members so that the rotating members are fixed to each other when the two inclined cover units are in the opened state.

4. The image-reading apparatus according to claim 2, wherein the second coupling cover unit includes a plurality of other rotating members that are rotatably coupled to each other, and the second coupling cover unit enters the space between the two inclined cover units by being deformed with respect to the two inclined cover units when the two inclined cover units being in the folded state, the other rotating members are rotated relatively to each other to be parallel with the two inclined cover units, and the image-reading apparatus further comprises another angle holding mechanism that fixes the other rotating members to each other to hold the two inclined cover units so that the ends of the two inclined cover units on the opening side are separated away from each other when the two inclined cover units are in the opened state.

5. An image-reading auxiliary apparatus comprising:

a housing that shields environmental light and has an opening;

an external device holding unit that holds an image capturing unit that captures an image of a medium disposed at the opening; and a plurality of light sources that are disposed inside the housing and illuminate the medium, wherein the housing includes at least four cover units corresponding to sides of the opening, the four cover units include two inclined cover units that are inclined from a side on which the opening is positioned toward an opposite end in a direction in which the two inclined cover units get closer to each other and two coupling cover units that couple the two inclined cover units to each other, the two inclined cover units include a first inclined cover unit and a second inclined cover unit, the two inclined cover units are switchable between an opened state in which the first inclined cover unit moves relatively to the second inclined cover unit based on an end opposite to a side on which the opening is positioned and ends of the two inclined cover units on the opening side are separated away from each other, and a folded state in which the two inclined cover units are adjacent to each other in parallel, the two coupling cover units are coupled to the two inclined cover units in a deformable manner, and deformed with respect to the two inclined cover units when the two inclined cover units are in the folded state, and the image-reading auxiliary apparatus further comprises an angle holding mechanism that holds the two inclined cover units so that the ends of the two inclined cover units on the opening side are separated away from each other when the two inclined cover units are in the opened state.

* * * * *